US012748464B2

(12) United States Patent
Jin et al.

(10) Patent No.: US 12,748,464 B2
(45) Date of Patent: Sep. 29, 2026

(54) ROTARY MECHANISM AND ELECTRONIC DEVICE

(71) Applicant: Honor Device Co., Ltd., Shenzhen (CN)

(72) Inventors: Kaifang Jin, Shenzhen (CN); Guimin Chen, Shenzhen (CN); Ruihao Chen, Shenzhen (CN); Shaohong Dong, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 230 days.

(21) Appl. No.: 18/256,272

(22) PCT Filed: Dec. 8, 2022

(86) PCT No.: PCT/CN2022/137675
§ 371 (c)(1),
(2) Date: Aug. 7, 2024

(87) PCT Pub. No.: WO2023/142713
PCT Pub. Date: Aug. 3, 2023

(65) Prior Publication Data

US 2025/0155935 A1 May 15, 2025

(30) Foreign Application Priority Data

Jan. 26, 2022 (CN) ......................... 202210095238.1

(51) Int. Cl.
*G06F 1/16* (2006.01)

(52) U.S. Cl.
CPC .......... *G06F 1/1681* (2013.01); *G06F 1/1652* (2013.01)

(58) Field of Classification Search
CPC ... G06F 1/1652; G06F 1/1681; H04M 1/0268
See application file for complete search history.

(56) References Cited

U.S. PATENT DOCUMENTS 10,677,307 B2 * 6/2020 Aagaard ................. F16F 3/023
2018/0068594 A1 3/2018 Dong
(Continued)

FOREIGN PATENT DOCUMENTS

CN 106744643 A 5/2017
CN 111692196 A 9/2020
(Continued)

*Primary Examiner* — Anthony Q Edwards
(74) *Attorney, Agent, or Firm* — Conley Rose, P.C.

(57) ABSTRACT

A rotary mechanism and an electronic device. The rotary mechanism includes a base, a first swing arm, a first connecting plate, and a first multistable flexible mechanism. Both the first swing arm and the first connecting plate are hinged to one side of the base. The first multistable flexible mechanism is disposed on the first connecting plate, and the first multistable flexible mechanism cooperates with the first swing arm to switch between a first stable state and a second stable state. In the unfolded state of the rotary mechanism, the first multistable flexible mechanism is in the first stable state, so as to lock the first swing arm at a first locking position of the first swing arm with respect to the first connecting plate. In the folded state of the rotary mechanism, the first multistable flexible mechanism is in the second stable state.

20 Claims, 19 Drawing Sheets

(56) References Cited

U.S. PATENT DOCUMENTS

| | | | | |
|---|---|---|---|---|
| 2020/0329178 | A1 | 10/2020 | Moon et al. | |
| 2021/0271294 | A1 | 9/2021 | Liao et al. | |
| 2022/0303371 | A1 | 9/2022 | Liao et al. | |
| 2026/0122165 | A1* | 4/2026 | Wu | H04M 1/022 |

FOREIGN PATENT DOCUMENTS

| | | | |
|---|---|---|---|
| CN | 111818243 | A | 10/2020 |
| CN | 112769986 | A | 5/2021 |
| CN | 113315860 | A | 8/2021 |
| CN | 113833741 | A | 12/2021 |
| CN | 113923279 | A | 1/2022 |
| WO | 2021115462 | A1 | 6/2021 |

* cited by examiner

ROTARY MECHANISM AND ELECTRONIC DEVICE

CROSS-REFERENCE TO RELATED APPLICATIONS

This application is a U.S. National Stage of International Application No. PCT/CN2022/137675 filed on Dec. 8, 2022, which claims priority to Chinese Patent Application No. 202210095238.1, filed with the China National Intellectual Property Administration on Jan. 26, 2022, both of which are incorporated herein by reference in their entireties.

TECHNICAL FIELD

This application relates to the field of electronic technologies, and in particular, to a rotary mechanism and an electronic device.

BACKGROUND

With the development of foldable screen technologies, foldable electronic devices have become a hot technology. At present, a rotary mechanism configured to realize a foldable function of an electronic device is generally provided with a locking member. The locking member may provide damping force for the electronic device in a folded state and an unfolded state, so as to maintain the electronic device in a current state. However, the locking member is generally fixed to a base of the rotary mechanism. Due to a limited mounting space at the base, the disposing of the locking member may increase a thickness of the base, which is not conducive to rationalization and thinning of a structure of the rotary mechanism and is not conducive to thin design of the electronic device.

SUMMARY

An embodiment of this application provides an electronic device and a rotary mechanism, which have simple structures and are conducive to thinning of the electronic device.

To achieve the foregoing objective, the following technical solutions are used in embodiments of this application:

According to a first aspect, this application provides an electronic device, including: a rotary mechanism, a first housing, and a foldable screen, the rotary mechanism being configured to switch between an unfolded state and a folded state. The foldable screen includes a first portion and a third portion connected with each other. The rotary mechanism includes a base, a first swing arm, a first connecting plate, and a first multistable flexible mechanism; the first swing arm being hinged to one side of the base; the first connecting plate being configured to be fixed to the first housing, the first connecting plate and the first swing arm being located on a same side of the base, the first connecting plate being hinged to the one side of the base, and a hinge axis of the first connecting plate with respect to the base and a hinge axis of the first swing arm with respect to the base both extending along a first direction; both the base and the first housing having a supporting surface, the supporting surface of the first housing being configured to support and fix the first portion, and the supporting surface of the base being configured to at least support the third portion in the unfolded state; and the first multistable flexible mechanism being disposed on the first connecting plate, and configured to lock the rotary mechanism in the folded state and the unfolded state.

According to the electronic device in the embodiments of the first aspect of this application, the first multistable flexible mechanism is disposed, and the first multistable flexible mechanism is disposed on the first connecting plate, which can save a space of the rotary mechanism corresponding to the base so as to properly optimize a structural layout of the entire rotary mechanism, thereby being conducive to optimizing a structural layout of the rotary mechanism corresponding to the base, conducive to realizing thin design of the rotary mechanism corresponding to the base, and conducive to thin design of the electronic device. In addition, modular design of the first multistable flexible mechanism and the first connecting plate can also be realized, which facilitates assembly of the first multistable flexible mechanism and the first connecting plate as a whole with other components of the rotary mechanism. Moreover, motion and force transmission of the first multistable flexible mechanism are realized by deformation of some or all members thereof, without friction and wear, which is conducive to prolonging a service life.

In some embodiments of the first aspect of this application, the first swing arm slides with respect to the first connecting plate and perpendicular to the first direction when the rotary mechanism switches between the unfolded state and the folded state.

In some embodiments of the first aspect of this application, the first multistable flexible mechanism has a first stable state and a second stable state, and the first multistable flexible mechanism cooperates with the first swing arm to switch between the first stable state and the second stable state; in the unfolded state of the rotary mechanism, the supporting surface of the base and the supporting surface of the first housing are arranged coplanarly and have a same orientation, and the first multistable flexible mechanism is in the first stable state, so as to lock the first swing arm at a first locking position of the first swing arm with respect to the first connecting plate; and in the folded state of the rotary mechanism, the supporting surface of the first housing is perpendicular to the supporting surface of the base, and the first multistable flexible mechanism is in the second stable state, so as to lock the first swing arm at a second locking position of the first swing arm with respect to the first connecting plate.

According to the electronic device in the embodiments of the first aspect of this application, the first multistable flexible mechanism cooperates with the first swing arm to lock the first swing arm at the second locking position of the first swing arm with respect to the first connecting plate in the folded state of the rotary mechanism and to lock the first swing arm at the first locking position of the first swing arm with respect to the first connecting plate in the unfolded state of the rotary mechanism, which can save a space of the rotary mechanism corresponding to the base while the folded state and the unfolded state of the electronic device are locked by using the first multistable flexible mechanism, so as to properly optimize a structural layout of the entire rotary mechanism, thereby being conducive to optimizing a structural layout of the rotary mechanism corresponding to the base, conducive to realizing thin design of the rotary mechanism corresponding to the base, and conducive to thin design of the electronic device. In addition, modular design of the first multistable flexible mechanism and the first connecting plate can also be realized, which facilitates assembly of the first multistable flexible mechanism and the first connecting plate as a whole with other components of the rotary mechanism. Moreover, motion and force transmission of the first multistable flexible mechanism are realized by deformation of some or all members thereof, without friction and wear, which is conducive to prolonging the service life.

In some embodiments of the first aspect of this application, the first multistable flexible mechanism includes: a first compliant bistable unit, the first compliant bistable unit including two first compliant beam units, the two first compliant beam units being arranged in the first direction and symmetrically disposed in the first direction, end portions of one ends, which are adjacent to each other, of the two first compliant beam units being respectively fixed with respect to the first swing arm, and end portions of the other ends, which are away from each other, of the two first compliant beam units being respectively fixed with respect to the first connecting plate; where a length dimension of an extension trajectory of each of the first compliant beam units is greater than a vertical distance between the end portion of the one end of the first compliant beam unit and the end portion of the other end of the first compliant beam unit in the first direction. In this way, the structure is simple.

In some embodiments of the first aspect of this application, the first compliant beam unit includes: a first compliant beam, a first rigid member, and a first flexible beam; an end portion of one end of the first compliant beam being fixed with respect to the first swing arm, an end portion of one end of the first flexible beam being fixed with respect to the first connecting plate, and the first rigid member being connected between an end portion of the other end of the first compliant beam and an end portion of the other end of the first flexible beam; where rigidity of the first rigid member is greater than that of the first compliant beam, and the rigidity of the first rigid member is greater than that of the first flexible beam. Therefore, it is conducive to improving rigidity of the entire first compliant beam unit. In this way, it is conducive to improving force required to bend the first compliant beam unit and improving reliability of the locking of the first swing arm by the first multistable flexible mechanism.

In some embodiments of the first aspect of this application, a cross-sectional area of the first rigid member is greater than that of the first compliant beam, and the cross-sectional area of the first rigid member is greater than that of the first flexible beam. Therefore, the rigidity of the first rigid member is greater than the rigidity of the first compliant beam and the rigidity of the first flexible beam.

In some embodiments of the first aspect of this application, both the first compliant beam and the first flexible beam are sheet-shaped. In this way, elastic deformation of the first compliant beam and the first flexible beam can be facilitated.

In some embodiments of the first aspect of this application, the first compliant beam unit is in a shape of a sheet with an equal cross-sectional area everywhere. Therefore, the structure is simple, and the elastic deformation of the first compliant beam unit is better facilitated.

In some embodiments of the first aspect of this application, the rotary mechanism has an intermediate hovering state, the intermediate hovering state being on a switching path of the rotary mechanism switching between the unfolded state and the folded state; and the first multistable flexible mechanism further has a third stable state, the third stable state being on a switching path of the first multistable flexible mechanism switching between the first stable state and the second stable state, and in the intermediate hovering state of the rotary mechanism, the first multistable flexible mechanism is in the third stable state so as to lock the first swing arm at a third locking position of the first swing arm with respect to the first connecting plate, the third locking position being on a switching path of the first swing arm switching between the first locking position and the second locking position. In this way, the entire multistable flexible mechanism can have at least three stable states, so that folding, unfolding, and intermediate hovering between the folded state and the unfolded state of the electronic device can be realized.

In some embodiments of the first aspect of this application, the first multistable flexible mechanism further includes a second compliant bistable unit, the second compliant bistable unit and the first compliant bistable unit being arranged in a sliding direction of the first swing arm with respect to the first connecting plate; the second compliant bistable unit including two second compliant beam units, the two second compliant beam units being arranged in the first direction and symmetrically disposed in the first direction, the two second compliant beam units being symmetrically disposed with respect to a symmetry line of the two first compliant beam units, end portions of one ends, which are adjacent to each other, of the two second compliant beam units being respectively fixed with respect to the first swing arm, end portions of the other ends of the two second compliant beam units being respectively fixed with respect to the first connecting plate, and a length dimension of an extension trajectory of each of the second compliant beam units being greater than a vertical distance between the end portion of the one end of the second compliant beam unit and the end portion of the other end of the second compliant beam unit in the first direction; where at least one of a material, a shape, and a size of the second compliant beam unit is different from that of the first compliant beam unit. In this way, the entire first multistable flexible mechanism has at least three stable states, so that folding, unfolding, and intermediate hovering between the folded state and the unfolded state of the electronic device can be realized. Moreover, the entire first multistable flexible mechanism has advantages such as fewer parts, a simple structure, easy assembly, high reliability, no friction and no wear, being conducive to realization of integrated arrangement of the first multistable flexible mechanism and the first connecting plate, and overall flattening of the first multistable flexible mechanism and the first connecting plate, which can facilitate the connection between the first multistable flexible mechanism and the first connecting plate as a whole and the first swing arm, simplify the structure of the rotary mechanism, and facilitate the thin design of the electronic device.

In some embodiments of the first aspect of this application, the second compliant beam unit includes: a second compliant beam, a second rigid member, and a second flexible beam; an end portion of one end of the second compliant beam being fixed with respect to the first swing arm, an end portion of one end of the second flexible beam being fixed with respect to the first connecting plate, and the second rigid member being connected between an end portion of the other end of the second compliant beam and an end portion of the other end of the second flexible beam; where rigidity of the second rigid member is greater than that of the second compliant beam, and the rigidity of the second rigid member is greater than that of the second flexible beam. Therefore, it is conducive to improving rigidity of the entire second compliant beam unit. In this way, it is conducive to improving force required to bend the second compliant beam unit and improving reliability of the locking of the first swing arm by the first multistable flexible mechanism.

In some embodiments of the first aspect of this application, a cross-sectional area of the second rigid member is greater than that of the second compliant beam, and the cross-sectional area of the second rigid member is greater than that of the second flexible beam. Therefore, the rigidity of the second rigid member is greater than the rigidity of the second compliant beam and the rigidity of the second flexible beam.

In some embodiments of the first aspect of this application, both the second compliant beam and the second flexible beam are sheet-shaped. Therefore, the structure is simple.

In some embodiments of the first aspect of this application, the first compliant beam unit includes: a first compliant beam, a first rigid member, and a first flexible beam; an end portion of one end of the first compliant beam being fixed with respect to the first swing arm, an end portion of one end of the first flexible beam being fixed with respect to the first connecting plate, and the first rigid member being connected between an end portion of the other end of the first compliant beam and an end portion of the other end of the first flexible beam; rigidity of the first rigid member being greater than that of the first compliant beam, and the rigidity of the first rigid member being greater than that of the first flexible beam; where a size of the first compliant beam is different from that of the second compliant beam; and/or a size of the first flexible beam is different from that of the second flexible beam; and/or, the first compliant beam is not parallel to the second compliant beam; and/or, the first flexible beam is not parallel to the second flexible beam. In this way, the entire first multistable flexible mechanism has at least three stable states, so that folding, unfolding, and intermediate hovering between the folded state and the unfolded state of the electronic device can be realized.

In some embodiments of the first aspect of this application, the first compliant beam and the second compliant beam have different length dimensions and/or thickness dimensions.

In some embodiments of the first aspect of this application, the length dimension of the first compliant beam ranges from 5 mm to 30 mm.

In some embodiments of the first aspect of this application, the length dimension of the second compliant beam ranges from 5 mm to 30 mm.

In some embodiments of the first aspect of this application, an absolute value of a difference between the length dimension of the first compliant beam and the length dimension of the second compliant beam ranges from 0.5 mm to 10 mm.

In some embodiments of the first aspect of this application, the thickness dimension of the first compliant beam ranges from 0.1 mm to 2 mm.

In some embodiments of the first aspect of this application, the thickness dimension of the second compliant beam ranges from 0.1 mm to 2 mm.

In some embodiments of the first aspect of this application, an absolute value of a difference between the thickness dimension of the first compliant beam and the thickness dimension of the second compliant beam ranges from 0.1 mm to 1 mm.

In some embodiments of the first aspect of this application, the first flexible beam and the second flexible beam have different length dimensions and/or thickness dimensions.

In some embodiments of the first aspect of this application, the length dimension of the first flexible beam ranges from 5 mm to 30 mm.

In some embodiments of the first aspect of this application, the length dimension of the second flexible beam ranges from 5 mm to 30 mm.

In some embodiments of the first aspect of this application, an absolute value of a difference between the length dimension of the first flexible beam and the length dimension of the second flexible beam ranges from 0.5 mm to 10 mm.

In some embodiments of the first aspect of this application, the thickness dimension of the first flexible beam ranges from 0.1 mm to 2 mm.

In some embodiments of the first aspect of this application, the thickness dimension of the second flexible beam ranges from 0.1 mm to 2 mm.

In some embodiments of the first aspect of this application, an absolute value of a difference between the thickness dimension of the first flexible beam and the thickness dimension of the second flexible beam ranges from 0.1 mm to 1 mm.

In some embodiments of the first aspect of this application, the thickness dimension of the first flexible beam is the same as that of the second flexible beam.

In some embodiments of the first aspect of this application, the length dimension of the first flexible beam is the same as that of the first compliant beam.

In some embodiments of the first aspect of this application, the length dimension of the second flexible beam is the same as that of the second compliant beam.

In some embodiments of the first aspect of this application, the first compliant beam is not parallel to the second compliant beam.

In some embodiments of the first aspect of this application, the first flexible beam is not parallel to the second flexible beam.

In some embodiments of the first aspect of this application, a length of the first rigid member is different from that of the second rigid member.

In some embodiments of the first aspect of this application, the first rigid member is not parallel to the second rigid member.

In some embodiments of the first aspect of this application, the second compliant beam unit is in a shape of a sheet with an equal cross-sectional area everywhere. Therefore, the elastic deformation of the second compliant beam unit can be facilitated, and the structure is simple.

In some embodiments of the first aspect of this application, the first compliant beam unit is in a shape of a sheet with an equal cross-sectional area everywhere; where a length dimension of the second compliant beam unit is different from that of the first compliant beam unit. Therefore, the elastic deformation of the first compliant beam unit can be facilitated, and the structure is simple. In addition, the entire first multistable flexible mechanism has at least three stable states, so that folding, unfolding, and intermediate hovering between the folded state and the unfolded state of the electronic device can be realized.

In some embodiments of the first aspect of this application, the first multistable flexible mechanism includes: a connecting block, the connecting block being fixed to the first swing arm, the two first compliant beam units of the first compliant bistable unit being symmetrically disposed with respect to a central axis of the connecting block extending in the sliding direction of the first swing arm, and the end portions of the one ends, which are adjacent to each other, of the two first compliant beam units being fixedly connected to the connecting block. In this way, the two first compliant beam units can be spaced apart from the first connecting plate, so as to facilitate the elastic deformation of the two first compliant beam units.

Specifically, the two second compliant beam units of the second compliant bistable unit are symmetrically disposed with respect to a central axis of the connecting block extending in the sliding direction of the first swing arm, and the end portions of the one ends, which are adjacent to each other, of the two second compliant beam units are fixedly connected to the connecting block. In this way, the two second compliant beam units can be spaced apart from the second connecting plate, so as to facilitate the elastic deformation of the two second compliant beam units.

In some embodiments of the first aspect of this application, the two first compliant beam units of the first compliant bistable unit are respectively located on two sides of the connecting block in the first direction. Therefore, the structure is simple.

In some embodiments of the first aspect of this application, the two second compliant beam units of the second compliant bistable unit are respectively located on two sides of the connecting block in the first direction. Therefore, the structure is simple.

In some embodiments of the first aspect of this application, the two first compliant beam units of the first compliant bistable unit are symmetrically disposed with respect to a central axis of the first swing arm extending in the sliding direction of the first swing arm. In this way, the first compliant bistable unit is evenly stressed.

In some embodiments of the first aspect of this application, the two second compliant beam units of the second compliant bistable unit are symmetrically disposed with respect to the central axis of the first swing arm extending in the sliding direction of the first swing arm. In this way, the second compliant bistable unit is evenly stressed.

In some embodiments of the first aspect of this application, the first multistable flexible mechanism includes: two fixed portions, the two fixed portions being oppositely disposed in the first direction and respectively fixed to the first connecting plate so as to define a sliding space with the first connecting plate, a portion of the first swing arm and at least a portion of the first compliant bistable unit being both located in the sliding space, the two first compliant beam units of the first compliant bistable unit being in one-to-one correspondence to the two fixed portions, and each of the first compliant beam units being connected with the first connecting plate through the corresponding fixed portion. In this way, the two first compliant beam units can be spaced apart from the first connecting plate, so as to facilitate the elastic deformation of the two first compliant beam units.

Specifically, the two second compliant beam units of the second compliant bistable unit are in one-to-one correspondence to the two fixed portions, and each of the second compliant beam units is connected with the first connecting plate through the corresponding fixed portion. In this way, the two second compliant beam units can be spaced apart from the first connecting plate, so as to facilitate the elastic deformation of the two second compliant beam units.

In some embodiments of the first aspect of this application, guide chutes are respectively formed on opposite surfaces of the two fixed portions, and two ends of the first swing arm along the first direction respectively fit into the guide chutes. Therefore, the movement of the first swing arm is guided, and reliability of the sliding of the first swing arm is improved.

In some embodiments of the first aspect of this application, the foldable screen further includes a second portion, the second portion being connected to one side of the third portion away from the first portion. The electronic device further includes a second housing, and the rotary mechanism further includes: a second swing arm, a second connecting plate, and a second multistable flexible mechanism. The second swing arm is hinged to the other side of the base. A second connecting plate, the second connecting plate is configured to be fixed to the second housing, the second connecting plate and the second swing arm are located on a same side of the base and hinged to the other side of the base, a hinge axis of the second connecting plate with respect to the base and a hinge axis of the second swing arm with respect to the base both extend along the first direction, and the second swing arm slides with respect to the second connecting plate and perpendicular to the first direction when the rotary mechanism switches between the unfolded state and the folded state. The second housing has a supporting surface, and the supporting surface of the second housing is configured to support and fix the second portion. The second multistable flexible mechanism is disposed on the second connecting plate, and the second multistable flexible mechanism has a first stable state and a second stable state. The second multistable flexible mechanism cooperates with the second swing arm to switch between the first stable state and the second stable state. In the folded state of the rotary mechanism, the supporting surface of the second housing is perpendicular to the supporting surface of the base, and the second multistable flexible mechanism is in the second stable state, so as to lock the second swing arm at a second lock position of the second swing arm with respect to the second connecting plate. In the unfolded state of the rotary mechanism, the supporting surface of the base and the supporting surface of the first housing are arranged coplanarly and have the same orientation, and the second multistable flexible mechanism is in the first stable state, so as to lock the second swing arm at a first lock position of the second swing arm with respect to the second connecting plate.

In some embodiments of the first aspect of this application, a structure of the second multistable flexible mechanism is the same as that of the first multistable flexible mechanism, a cooperation relationship between the second multistable flexible mechanism and the second swing arm is the same as that between the first multistable flexible mechanism and the first swing arm, and a cooperation relationship between the second multistable flexible mechanism and the second connecting plate is the same as that between the first multistable flexible mechanism and the first connecting plate.

In a possible implementation of this application, the rotary mechanism further includes: a first connector, one end of the first connector being hinged to one side of the base, the first connecting plate being hinged to the other end of a second connector.

In a possible implementation of this application, the rotary mechanism further includes: a second connector, one end of the second connector being hinged to the other side of the base, the second connecting plate being hinged to the other end of the second connector.

According to a second aspect, this application provides a rotary mechanism, the rotary mechanism including a base, a first swing arm, a first connecting plate, and a first multistable flexible mechanism; the first swing arm being hinged to one side of the base; the first connecting plate and the first swing arm being located on a same side of the base, the first connecting plate being hinged to the one side of the base, and a hinge axis of the first connecting plate with respect to the base and a hinge axis of the first swing arm with respect to the base both extending along a first direction; and the first multistable flexible mechanism being disposed on the first connecting plate, and configured to lock the rotary mechanism in the folded state and the unfolded state.

In some embodiments of the second aspect of this application, the first swing arm slides with respect to the first connecting plate and perpendicular to the first direction when the rotary mechanism switches between the unfolded state and the folded state.

In some embodiments of the second aspect of this application, the first multistable flexible mechanism has a first stable state and a second stable state, and the first multistable flexible mechanism cooperates with the first swing arm to switch between the first stable state and the second stable state; in the folded state of the rotary mechanism, the first multistable flexible mechanism is in the second stable state, so as to lock the first swing arm at a second locking position of the first swing arm with respect to the first connecting plate; and in the unfolded state of the rotary mechanism, the first multistable flexible mechanism is in the first stable state, so as to lock the first swing arm at a first locking position of the first swing arm with respect to the first connecting plate.

In some embodiments of the second aspect of this application, the first connecting plate is configured to be fixed to the first housing. Both the base and the first housing have a supporting surface, the supporting surface of the first housing is configured to support and fix a first portion of the foldable screen, the supporting surface of the base is configured to at least support the third portion of the foldable screen in an unfolded state, in the folded state of the rotary mechanism, the supporting surface of the first housing is perpendicular to the supporting surface of the base, and in the unfolded state of the rotary mechanism, the supporting surface of the base and the supporting surface of the first housing are arranged coplanarly and have the same orientation.

In some embodiments of the second aspect of this application, the first multistable flexible mechanism includes: a first compliant bistable unit, the first compliant bistable unit including two first compliant beam units, the two first compliant beam units being arranged in the first direction and symmetrically disposed in the first direction, end portions of one ends, which are adjacent to each other, of the two first compliant beam units being respectively fixed with respect to the first swing arm, and end portions of the other ends, which are away from each other, of the two first compliant beam units being respectively fixed with respect to the first connecting plate; where a length dimension of an extension trajectory of each of the first compliant beam units is greater than a vertical distance between the end portion of the one end of the first compliant beam unit and the end portion of the other end of the first compliant beam unit in the first direction. In this way, the structure is simple.

In some embodiments of the second aspect of this application, the first compliant beam unit includes: a first compliant beam, a first rigid member, and a first flexible beam; an end portion of one end of the first compliant beam being fixed with respect to the first swing arm, an end portion of one end of the first flexible beam being fixed with respect to the first connecting plate, and the first rigid member being connected between an end portion of the other end of the first compliant beam and an end portion of the other end of the first flexible beam; where rigidity of the first rigid member is greater than that of the first compliant beam, and the rigidity of the first rigid member is greater than that of the first flexible beam. Therefore, it is conducive to improving rigidity of the entire first compliant beam unit. In this way, it is conducive to improving force required to bend the first compliant beam unit and improving reliability of the locking of the first swing arm by the first multistable flexible mechanism.

In some embodiments of the second aspect of this application, a cross-sectional area of the first rigid member is greater than that of the first compliant beam, and the cross-sectional area of the first rigid member is greater than that of the first flexible beam. Therefore, the rigidity of the first rigid member is greater than the rigidity of the first compliant beam and the rigidity of the first flexible beam.

In some embodiments of the second aspect of this application, both the first compliant beam and the first flexible beam are sheet-shaped. In this way, elastic deformation of the first compliant beam and the first flexible beam can be facilitated.

In some embodiments of the second aspect of this application, the first compliant beam unit is in a shape of a sheet with an equal cross-sectional area everywhere. Therefore, the structure is simple.

In some embodiments of the second aspect of this application, the rotary mechanism has an intermediate hovering state, the intermediate hovering state being on a switching path of the rotary mechanism switching between the unfolded state and the folded state; and the first multistable flexible mechanism further has a third stable state, the third stable state being on a switching path of the first multistable flexible mechanism switching between the first stable state and the second stable state, and in the intermediate hovering state of the rotary mechanism, the first multistable flexible mechanism is in the third stable state so as to lock the first swing arm at a third locking position of the first swing arm with respect to the first connecting plate, the third locking position being on a switching path of the first swing arm switching between the first locking position and the second locking position. In this way, the entire first multistable flexible mechanism can have at least three stable states, so that folding, unfolding, and intermediate hovering between the folded state and the unfolded state of the electronic device can be realized.

In some embodiments of the second aspect of this application, the first multistable flexible mechanism further includes a second compliant bistable unit, the second compliant bistable unit and the first compliant bistable unit being arranged in a sliding direction of the first swing arm with respect to the first connecting plate; the second compliant bistable unit including two second compliant beam units, the two second compliant beam units being arranged in the first direction, the two second compliant beam units being symmetrically disposed with respect to a symmetry line of the two first compliant beam units, end portions of one ends, which are adjacent to each other, of the two second compliant beam units being respectively fixed with respect to the first swing arm, end portions of the other ends of the two second compliant beam units being respectively fixed with respect to the first connecting plate, and a length dimension of an extension trajectory of each of the second compliant beam units being greater than a vertical distance between the end portion of the one end of the second compliant beam unit and the end portion of the other end of the second compliant beam unit in the first direction; where at least one of a material, a shape, and a size of the second compliant beam unit is different from that of the first compliant beam unit. In this way, the entire first multistable flexible mechanism has at least three stable states, so that folding, unfolding, and intermediate hovering between the folded state and the unfolded state of the electronic device can be realized.

Moreover, the entire first multistable flexible mechanism has advantages such as fewer parts, a simple structure, easy assembly, high reliability, no friction and no wear, being conducive to realization of integrated arrangement of the first multistable flexible mechanism and the first connecting plate, and overall flattening of the first multistable flexible mechanism and the first connecting plate, which can facilitate the connection between the first multistable flexible mechanism and the first connecting plate as a whole and the first swing arm, simplify the structure of the rotary mechanism, and facilitate the thin design of the electronic device.

In some embodiments of the second aspect of this application, the second compliant beam unit includes: a second compliant beam, a second rigid member, and a second flexible beam; an end portion of one end of the second compliant beam being fixed with respect to the first swing arm, an end portion of one end of the second flexible beam being fixed with respect to the first connecting plate, and the second rigid member being connected between an end portion of the other end of the second compliant beam and an end portion of the other end of the second flexible beam; where rigidity of the second rigid member is greater than that of the second compliant beam, and the rigidity of the second rigid member is greater than that of the second flexible beam. Therefore, it is conducive to improving rigidity of the entire second compliant beam unit. In this way, it is conducive to improving force required to bend the second compliant beam unit and improving reliability of the locking of the first swing arm by the first multistable flexible mechanism.

In some embodiments of the second aspect of this application, a cross-sectional area of the second rigid member is greater than that of the second compliant beam, and the cross-sectional area of the second rigid member is greater than that of the second flexible beam. Therefore, the rigidity of the second rigid member is greater than the rigidity of the second compliant beam and the rigidity of the second flexible beam.

In some embodiments of the second aspect of this application, both the second compliant beam and the second flexible beam are sheet-shaped. Therefore, the structure is simple.

In some embodiments of the second aspect of this application, the first compliant beam unit includes: a first compliant beam, a first rigid member, and a first flexible beam; an end portion of one end of the first compliant beam being fixed with respect to the first swing arm, an end portion of one end of the first flexible beam being fixed with respect to the first connecting plate, and the first rigid member being connected between an end portion of the other end of the first compliant beam and an end portion at the other end of the first flexible beam; rigidity of the first rigid member being greater than that of the first compliant beam, and the rigidity of the first rigid member being greater than that of the first flexible beam; where a size of the first compliant beam is different from that of the second compliant beam; and/or a size of the first flexible beam is different from that of the second flexible beam; and/or, the first compliant beam is not parallel to the second compliant beam; and/or, the first flexible beam is not parallel to the second flexible beam. In this way, the entire first multistable flexible mechanism has at least three stable states, so that folding, unfolding, and intermediate hovering between the folded state and the unfolded state of the electronic device can be realized.

In some embodiments of the second aspect of this application, the first compliant beam and the second compliant beam have different length dimensions and/or thickness dimensions.

In some embodiments of the second aspect of this application, the length dimension of the first compliant beam ranges from 5 mm to 30 mm.

In some embodiments of the second aspect of this application, the length dimension of the second compliant beam ranges from 5 mm to 30 mm.

In some embodiments of the second aspect of this application, an absolute value of a difference between the length dimension of the first compliant beam and the length dimension of the second compliant beam ranges from 0.5 mm to 10 mm.

In some embodiments of the second aspect of this application, the thickness dimension of the first compliant beam ranges from 0.1 mm to 2 mm.

In some embodiments of the second aspect of this application, the thickness dimension of the second compliant beam ranges from 0.1 mm to 2 mm.

In some embodiments of the second aspect of this application, an absolute value of a difference between the thickness dimension of the first compliant beam and the thickness dimension of the second compliant beam ranges from 0.1 mm to 1 mm.

In some embodiments of the second aspect of this application, the first flexible beam and the second flexible beam have different length dimensions and/or thickness dimensions.

In some embodiments of the second aspect of this application, the length dimension of the first flexible beam ranges from 5 mm to 30 mm.

In some embodiments of the second aspect of this application, the length dimension of the second flexible beam ranges from 5 mm to 30 mm.

In some embodiments of the second aspect of this application, an absolute value of a difference between the length dimension of the first flexible beam and the length dimension of the second flexible beam ranges from 0.5 mm to 10 mm.

In some embodiments of the second aspect of this application, the thickness dimension of the first flexible beam ranges from 0.1 mm to 2 mm.

In some embodiments of the second aspect of this application, the thickness dimension of the second flexible beam ranges from 0.1 mm to 2 mm.

In some embodiments of the second aspect of this application, an absolute value of a difference between the thickness dimension of the first flexible beam and the thickness dimension of the second flexible beam ranges from 0.1 mm to 1 mm.

In some embodiments of the second aspect of this application, the thickness dimension of the first flexible beam is the same as that of the second flexible beam.

In some embodiments of the second aspect of this application, the first compliant beam is not parallel to the second compliant beam.

In some embodiments of the second aspect of this application, the first flexible beam is not parallel to the second flexible beam.

In some embodiments of the second aspect of this application, a length of the first rigid member is different from that of the second rigid member.

In some embodiments of the second aspect of this application, the first rigid member is not parallel to the second rigid member.

In some embodiments of the second aspect of this application, the second compliant beam unit is in a shape of a sheet with an equal cross-sectional area everywhere. Therefore, the elastic deformation of the second compliant beam unit can be facilitated, and the structure is simple.

In some embodiments of the second aspect of this application, the first compliant beam unit is in a shape of a sheet with an equal cross-sectional area everywhere; where a length dimension of the second compliant beam unit is different from that of the first compliant beam unit. Therefore, the elastic deformation of the first compliant beam unit can be facilitated, and the structure is simple. In addition, the entire first multistable flexible mechanism has at least three stable states, so that folding, unfolding, and intermediate hovering between the folded state and the unfolded state of the electronic device can be realized.

In some embodiments of the second aspect of this application, the first multistable flexible mechanism includes: a connecting block, the connecting block being fixed to the first swing arm, the two first compliant beam units of the first compliant bistable unit being symmetrically disposed with respect to a central axis of the connecting block extending in the sliding direction of the first swing arm, and the end portions of the one ends, which are adjacent to each other, of the two first compliant beam units being fixedly connected to the connecting block. In this way, the two first compliant beam units can be spaced apart from the first connecting plate, so as to facilitate the elastic deformation of the two first compliant beam units.

Specifically, the two second compliant beam units of the second compliant bistable unit are symmetrically disposed with respect to a central axis of the connecting block extending in the sliding direction of the first swing arm, and the end portions of the one ends, which are adjacent to each other, of the two second compliant beam units are fixedly connected to the connecting block. In this way, the two second compliant beam units can be spaced apart from the second connecting plate, so as to facilitate the elastic deformation of the two second compliant beam units.

In some embodiments of the second aspect of this application, the two first compliant beam units of the first compliant bistable unit are respectively located on two sides of the connecting block in the first direction. Therefore, the structure is simple.

In some embodiments of the second aspect of this application, the two second compliant beam units of the second compliant bistable unit are respectively located on two sides of the connecting block in the first direction. Therefore, the structure is simple.

In some embodiments of the second aspect of this application, the two first compliant beam units of the first compliant bistable unit are symmetrically disposed with respect to a central axis of the first swing arm extending in the sliding direction of the first swing arm. In this way, the first compliant bistable unit is evenly stressed.

In some embodiments of the second aspect of this application, the two second compliant beam units of the second compliant bistable unit are symmetrically disposed with respect to the central axis of the first swing arm extending in the sliding direction of the first swing arm. In this way, the second compliant bistable unit is evenly stressed.

In some embodiments of the second aspect of this application, the first multistable flexible mechanism includes: two fixed portions, the two fixed portions being oppositely disposed in the first direction and respectively fixed to the first connecting plate so as to define a sliding space with the first connecting plate, a portion of the first swing arm and at least a portion of the first compliant bistable unit being both located in the sliding space, the two first compliant beam units of the first compliant bistable unit being in one-to-one correspondence to the two fixed portions, and each of the first compliant beam units being connected with the first connecting plate through the corresponding fixed portion. In this way, the two first compliant beam units can be spaced apart from the first connecting plate, so as to facilitate the elastic deformation of the two first compliant beam units.

Specifically, the two second compliant beam units of the second compliant bistable unit are in one-to-one correspondence to the two fixed portions, and each of the second compliant beam units is connected with the first connecting plate through the corresponding fixed portion. In this way, the two second compliant beam units can be spaced apart from the first connecting plate, so as to facilitate the elastic deformation of the two second compliant beam units.

In some embodiments of the second aspect of this application, guide chutes are respectively formed on opposite surfaces of the two fixed portions, and two ends of the first swing arm along the first direction respectively fit into the guide chutes. Therefore, the movement of the first swing arm is guided, and reliability of the sliding of the first swing arm is improved.

In some embodiments of the second aspect of this application, the rotary mechanism further includes: a second swing arm, a second connecting plate, and a second multistable flexible mechanism. The second swing arm is hinged to the other side of the base. The second connecting plate and the second swing arm are located on a same side of the base and hinged to the other side of the base, a hinge axis of the second connecting plate with respect to the base and a hinge axis of the second swing arm with respect to the base both extend along the first direction, and the second swing arm slides with respect to the second connecting plate and perpendicular to the first direction when the rotary mechanism switches between the unfolded state and the folded state. The second multistable flexible mechanism is disposed on the second connecting plate, and the second multistable flexible mechanism has a first stable state and a second stable state. The second multistable flexible mechanism cooperates with the second swing arm to switch between the first stable state and the second stable state. In the folded state of the rotary mechanism, the second multistable flexible mechanism is in the second stable state, so as to lock the second swing arm at a second lock position of the second swing arm with respect to the second connecting plate. In the unfolded state of the rotary mechanism, the second multistable flexible mechanism is in the first stable state, so as to lock the second swing arm at a first lock position of the second swing arm with respect to the second connecting plate.

Exemplarily, the second connecting plate is configured to be fixed to the second housing, the second housing has a supporting surface, the supporting surface of the second housing is configured to support a second portion of the foldable screen, in the folded state of the rotary mechanism, the supporting surface of the second housing is perpendicular to the supporting surface of the base, and in the unfolded state of the rotary mechanism, the supporting surface of the base and the supporting surface of the second housing are arranged coplanarly and have the same orientation.

In some embodiments of the second aspect of this application, a structure of the second multistable flexible mechanism is the same as that of the first multistable flexible mechanism, a cooperation relationship between the second multistable flexible mechanism and the second swing arm is the same as that between the first multistable flexible mechanism and the first swing arm, and a cooperation relationship between the second multistable flexible mechanism and the second connecting plate is the same as that between the first multistable flexible mechanism and the first connecting plate.

In a possible implementation of this application, the rotary mechanism further includes: a first connector, one end of the first connector being hinged to one side of the base, the first connecting plate being hinged to the other end of a second connector.

In a possible implementation of this application, the rotary mechanism further includes: a second connector, one end of the second connector being hinged to the other side of the base, the second connecting plate being hinged to the other end of the second connector.

For the technical effects brought by any one of the design manners in the second aspect, reference may be made to the technical effects brought by different design manners in the first aspect, and details are not described herein again.

DESCRIPTION OF EMBODIMENTS

Figure 1A:
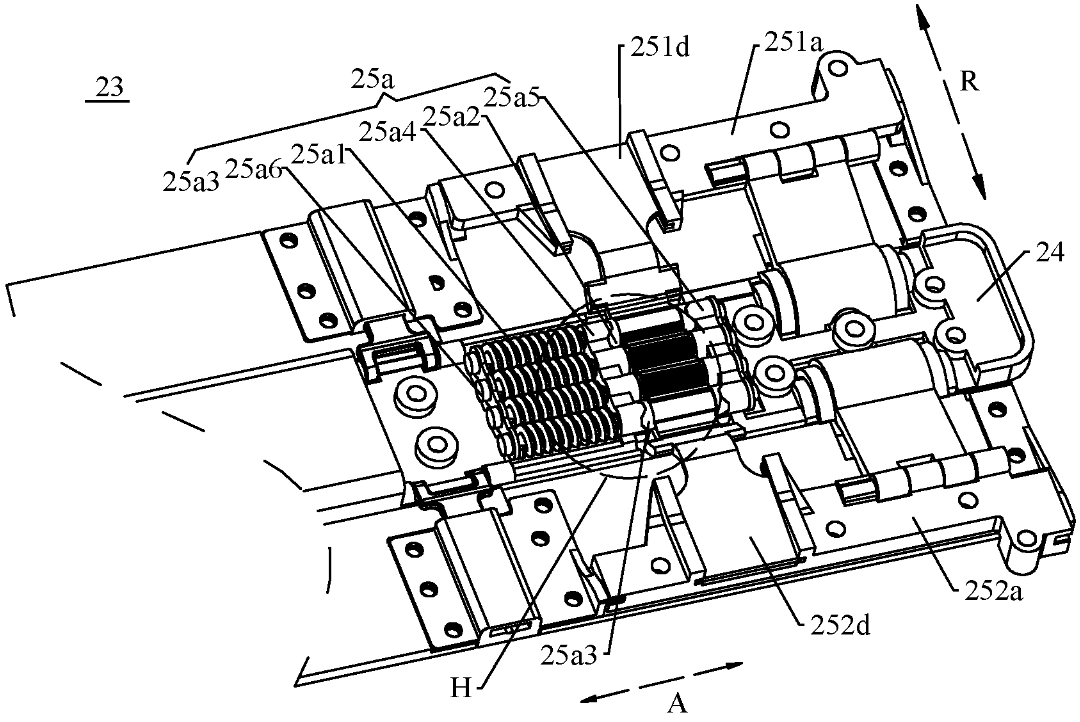
FIG. 1*a* is a schematic diagram of a partial structure of a first rotary mechanism according to an embodiment of this application.

In the embodiments of this application, terms “first”, “second”, and “third” are used merely for the purpose of description, and shall not be construed as indicating or implying relative importance or implying a quantity of indicated technical features. Therefore, a feature limited by “first”, “second”, or “third” may explicitly or implicitly include one or more of the features.

In the descriptions of the embodiments of this application, it should be noted that, unless otherwise explicitly specified or defined, the term “mounting”, “joining”, and “connection” should be understood in a broad sense. For example, the “connection” may be a detachable connection or a non-detachable connection; may be a direct electrical connection, or an indirect connection through an intermediary. “Fixed connection” means that components are connected to each other and a relative position relationship remains unchanged after the connection. “Rotatable connection” means that components are connected to each other and can be rotated with respect to each other after the connection.

"Slidable connection" means that components are connected to each other and can be slid with respect to each other after the connection.

In the descriptions of the embodiments of this application, terms "include", "comprise", and any variants thereof are intended to cover a non-exclusive inclusion. Therefore, a process, method, item, or apparatus that includes a series of elements not only includes such elements, but also includes other elements not specified expressly, or may include inherent elements of the process, method, item, or apparatus. Without more limitations, elements defined by the sentence "including one . . . " does not exclude that there are still other same elements in the process, method, item, or apparatus which includes the element.

This application provides an electronic device. The electronic device is a foldable electronic device. The foldable electronic device may include various electronic devices that have a foldable screen and can change unfolded states or folded states of the foldable screen and the electronic devices. Under different usage requirements, the foldable electronic device may be unfolded to the unfolded state, or folded to the folded state, or in an intermediate hovering state between the unfolded state and the folded state. That is, the intermediate hovering state is on a switching path of the electronic device switching between the folded state and the unfolded state. Therefore, the foldable electronic device has at least two states, i.e., an unfolded state and a folded state. In some cases, a third state may be further included, that is, an intermediate hovering state between the unfolded state and the folded state. It may be understood that the intermediate hovering state is not merely a unique state, but may be any one or more states on the switching path of the electronic device between the unfolded state and the folded state.

The foldable electronic device includes a foldable screen, a first housing, a second housing, and a rotary mechanism. The first housing, the second housing, and the rotary mechanism are configured to fix the foldable screen. Moreover, the rotary mechanism is configured to realize relative unfolding and folding of the first housing and the second housing, so as to realize folding and unfolding of the electronic device. Specifically, referring to FIG. T a, FIG. T a is a schematic diagram of a partial structure of a first rotary mechanism 23 according to an embodiment of this application. In this embodiment, the rotary mechanism 23 may include: a base 24, a first swing arm 251*d*, a second swing arm 252*d*, a first connecting plate 251*a*, a second connecting plate 252*a*, and a locking member 25*a*. Specifically, the first connecting plate 251*a* and the second connecting plate 252*a* are respectively hinged to two opposite sides of the base 24. Moreover, the first connecting plate 251*a* is fixed to the first housing, and the second connecting plate 252*a* is fixed to the second housing. In this way, the first connecting plate 251*a* can be unfolded and folded with the first housing and with respect to the base 24, and the second connecting plate 252*a* can be unfolded and folded with the second housing and with respect to the base 24.

As shown in FIG. 1*a*, the first connecting plate 251*a* and the second connecting plate 252*a* extend with respect to a hinge axis of the base 24 and along a first direction A.

In the unfolded state, an angle between the first housing and the base is approximately 180°, and an angle between the second housing and the base is approximately 180°. In the folded state, the angle between the first housing and the base is approximately 90°, the angle between the second housing and the base is approximately 90°, and the first housing is opposite the second housing.

To enable the electronic device 100 to be maintained in a current state when currently in the unfolded state or the folded state, the first swing arm 251*d* is hinged to the base 24 and the first swing arm 251*d* is in sliding fit with the first connecting plate 251*a* (in a direction indicated by a dotted arrow R in FIG. Ta), and the second swing arm 252*d* is hinged to the base 24 and the second swing arm 252*d* is in sliding fit with the second connecting plate 252*a* (in the direction indicated by the dotted arrow R in FIG. 1*a*). Moreover, the locking member 25*a* provides damping force for the hinging of the first swing arm 251*d* with respect to the base 24. In this way, when a user does not exert force on the first housing, the first housing and the base can be maintained at a current angle. In other words, the first housing no longer rotates with respect to the base. The locking member 25*a* provides damping force for the hinging of the second swing arm 252*d* with respect to the base 24. In this way, when the user does not exert force on the second housing, the second housing and the base can be maintained at a current angle. In other words, the second housing no longer rotates with respect to the base.

Specifically, the locking member 25*a* is fixed to the base 24. Moreover, the locking member 25*a* may include a spring member 25*al*, a first cam 25*a*2 disposed on the first swing arm 251*d*, a second cam 25*a*3 disposed on the second swing arm 252*d*, a concave wheel 25*a*4, a circlip 25*a*5, and a baffle 25*a*6.

The circlip 25*a*5 and the baffle 25*a*6 are disposed on the base 24 and fixed with respect to the base 24. The circlip 25*a*5 and the baffle 25*a*6 are spaced apart in the first direction A.

The first cam 25*a*2 corresponds to a concave wheel 25*a*4 and a spring member 25*a*1. The second cam 25*a*3 corresponds to a concave wheel 25*a*4 and a spring member 25*al*. An end portion of the first swing arm 251*d* away from the first cam 25*a*2 and an end portion of the second swing arm 252*d* away from the second concave wheel 25*a*2 both abut against and limit the 25*a*6.

Figure 1B:
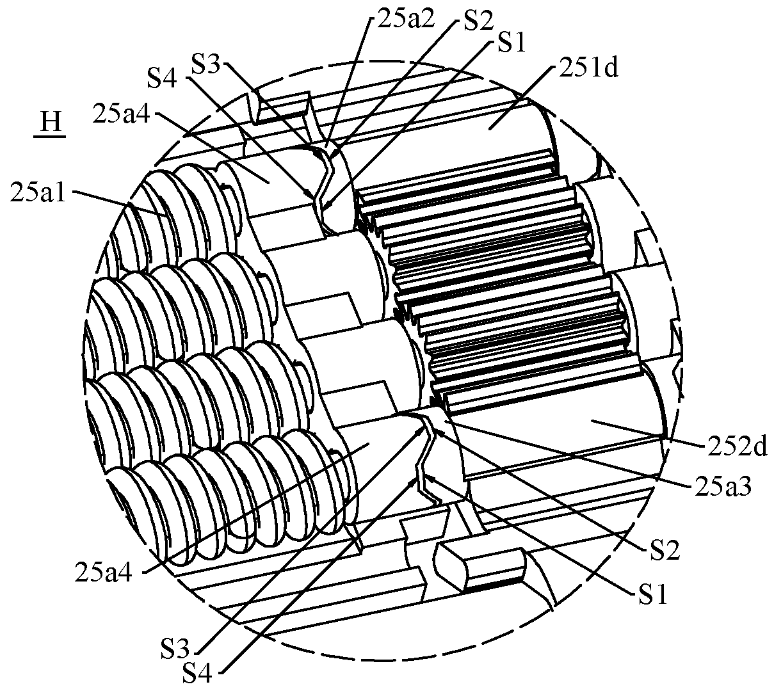
FIG. 1*b* is a partially enlarged view circled at H according to the rotary mechanism shown in FIG. 1*a;*

Specifically, referring to FIG. 1*b* together, FIG. 1*b* is a partially enlarged view circled at H according to the rotary mechanism 23 shown in FIG. 1*a*. A surface of the first cam 25*a*2 on the first swing arm 251*d* and facing the corresponding concave wheel 25*a*4 has a convex surface S1 and a concave surface S2 recessed with respect to the convex surface S1. A surface of the second cam 25*a*3 on the second swing arm 252*d* and facing the corresponding concave wheel 25*a*4 has a convex surface S1 and a concave surface S2 recessed with respect to the convex surface S1. The convex surface S1 and the concave surface S2 on each cam are alternately arranged in a circumferential direction of the cam. A surface of each concave wheel 25*a*4 facing the corresponding cam also has a concave surface S4 and a convex surface S3 alternately arranged along a circumferential direction of the concave wheel 25*a*4. The spring member 25*al* is pre-stressed between the baffle 25*a*6 and the corresponding concave wheel 25*a*4. In the folded state and the unfolded state, the convex surface S3 on the concave wheel 25*a*4 fits different concave surface S2 on the cam, and similarly, the convex surface S1 on the cam fits different concave surface S4 on the concave wheel 25*a*4.

When the user drives the first housing and the second housing to cause the first swing arm 251*d* to rotate with respect to the base 24 and the second swing arm 252*d* to rotate with respect to the base 24, the convex surface S3 on the concave wheel 25*a*4 gradually switches from fitting with one concave surface S2 on the cam to fitting with another concave surface S2. In this process, pressure on the spring member 251*al* gradually increases first and then is gradually released. At the same time, the concave wheel 25*a*4 produces axial displacement with a change in the pressure on the spring member 251*al*. In this way, the rotary mechanism 23 can be facilitated to switch between the folded state and the unfolded state. When there is no external force exerted by the user, damping force can be provided for the rotation of the first swing arm 251*d* with respect to the base 24 and the rotation of the second swing arm 252*d* with respect to the base 24 by using elastic force of the spring member 25*al*, thereby facilitating the rotary mechanism 23 to be maintained in the current folded state or unfolded state.

Therefore, the locking member 25*a* has more parts, and the locking member 25*a* having more parts causes an assembly process to be complicated and cumbersome, which is not conducive to operations of workers. In addition, the more parts also increase manufacturing costs. Moreover, during the operation of the locking member 25*a*, there is friction in the fitting between the concave wheel and the cam. After long-term use, the concave wheel and the cam are severely worn, which results in friction attenuation, affects damping feel, and may shorten the service life of the locking member 25*a*. In addition, the entire locking member 25*a* is disposed on the base 24. The locking member 25*a* has more parts, and a mounting space at the base 24 is limited. The disposing of the locking member 25*a* causes an overall thickness of the rotary mechanism 23 corresponding to the base 24 to be thicker, which is not conducive to design of overall thinning of the rotary mechanism 23 corresponding to the base 24, and is not conducive to the thinning of the electronic device 100.

In order to address the above technical problems, an improved idea of this application is that the locking member 25*a*, which provides damping force for the rotation of the first swing arm 251*d* with respect to the base 24, is disposed on the first connecting plate 251*a*. Moreover, the locking member 25*a* is replaced with the first multistable flexible mechanism. That is, in the rotary mechanism according to this embodiment of this application, the first multistable flexible mechanism is disposed. Moreover, the first multistable flexible mechanism is disposed on the first connecting plate 251*a*, and the first multistable flexible mechanism cooperates with the first swing arm 251*d*, so as to lock the first swing arm 251*d* at a second locking position of the first swing arm 251*d* with respect to the first connecting plate 251*a* in the folded state of the rotary mechanism 23. The first swing arm 251*d* is locked at a first locking position of the first swing arm 251*d* with respect to the first connecting plate 251*a* in the unfolded state of the rotary mechanism 23. In this way, the space of the rotary mechanism 23 corresponding to the base 24 can be saved while the folded state and the unfolded state of the electronic device are locked by using the first multistable flexible mechanism, so as to properly optimize a structural layout of the entire rotary mechanism 23. Moreover, compared with the locking member 25*a*, the first multistable flexible mechanism has a simple structure, which is conducive to optimizing a structural layout of the rotary mechanism 23 corresponding to the base 24 and conducive to realizing thin design of the rotary mechanism 23 corresponding to the base 24, thereby facilitating the thin design of the electronic device. In addition, modular design of the first multistable flexible mechanism and the first connecting plate 251*a* can also be realized, which facilitates assembly of the first multistable flexible mechanism and the first connecting plate 251*a* as a whole with other components of the rotary mechanism 23. Moreover, motion and force transmission of the first multistable flexible mechanism are realized by deformation of some or all members thereof, without friction and wear, which is conducive to prolonging the service life.

Based on the above improved idea, technical solutions related to the embodiments of this application will be introduced below.

Prior to the introduction to the embodiments of this application, some technical terms that will be mentioned in the embodiments of this application are introduced first. Specifically, A flexible mechanism (also known as a compliant mechanism) refers to a mechanism that realizes transfer and conversion of force, motion or energy by flexible deformation of member elements. Specifically, the flexible mechanism refers to a mechanical structure. Part or all of the mechanical structure is formed by a flexible member. When the above flexible member deforms, the mechanical structure may cause displacement of a structure connected to the flexible member due to the deformation of the flexible member.

A multistable flexible mechanism refers to a mechanism in which a flexible member of the flexible mechanism has two or more stable states with minimum local potential energy (that is, has at least a first stable state and a second stable state) during deformation, and the mechanism may pass through an unstable state with maximum local potential energy when switching between two adjacent stable states. When there are two stable states (i.e., the first stable state and the second stable state) in the multistable flexible mechanism, the multistable flexible mechanism is a bistable flexible mechanism. The bistable flexible mechanism refers to a mechanism having two stable states with minimum local potential energy during the deformation of the flexible member of the flexible mechanism. The first stable state refers to an initial state of the multistable flexible mechanism. In the state, the flexible member of the multistable flexible mechanism does not deform. When the flexible member of the multistable flexible mechanism deforms under external force exerted by the user, deformation energy may be continuously stored. When the deformation of the multistable flexible mechanism reaches a certain degree, the unstable state with maximum local potential energy may be reached. When the unstable state is passed, the flexible member may automatically deform to next stable state. It may be understood that, when the user exerts no external force on the flexible member of the multistable flexible mechanism, in the stable state, the multistable flexible mechanism can be maintained in the current state by using its own structural configuration and bending deformation of the flexible member.

A central axis refers to a center line of an axisymmetric structure, and all axisymmetric structures may overlap when folded through this line. The central axis represents an axis of a rotating body and a symmetry line of a non-rotating body.

The foldable electronic device provided in this application includes, but is not limited to, a mobile phone, a tablet personal computer (tablet personal computer), a laptop computer (laptop computer), a personal digital assistant (personal digital assistant, PDA), a personal computer, a notebook computer, an onboard device, a wearable device, a walkman, a radio, a TV, a speaker, and the like. The wearable device includes, but is not limited to, a smart bracelet, a smartwatch, a smart head-mounted display, a smart glass, and the like.

Figure 2:
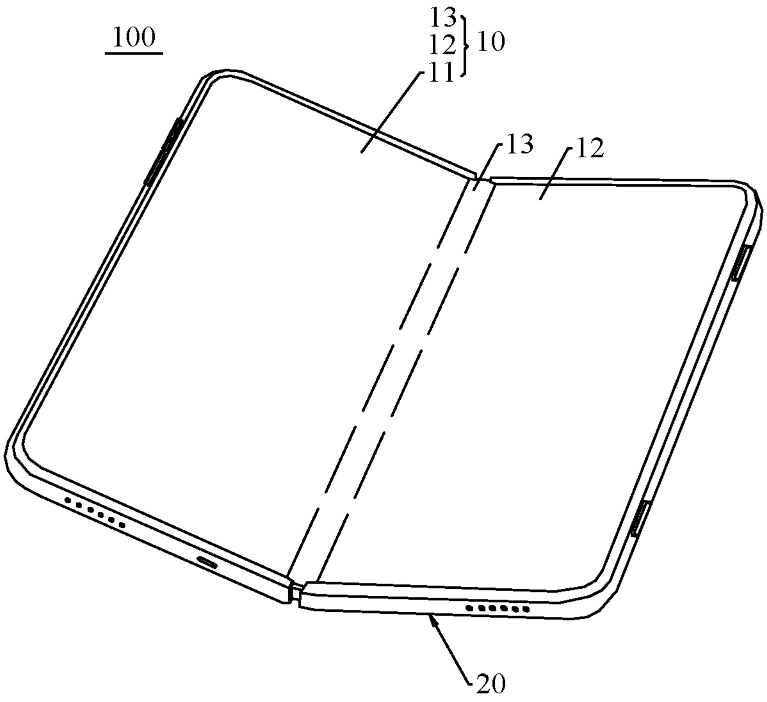
FIG. 2 is a three-dimensional view of a first electronic device according to an embodiment of this application.

Referring to FIG. 2, FIG. 2 is a three-dimensional view of a first electronic device 100 according to an embodiment of this application. In this embodiment, the electronic device 100 includes a foldable screen 10 and a support apparatus 20. It may be understood that FIG. 2 only schematically shows some components included in the electronic device 100. Actual shapes, actual sizes, actual positions, and actual structures of these components are not limited in FIG. 2.

The foldable screen 10 can be configured to display information and provide an interaction interface for a user. In embodiments of this application, the foldable screen 10 may be, but is not limited to, an organic light-emitting diode (organic light-emitting diode, OLED) display screen, an active-matrix organic light-emitting diode (active-matrix organic light-emitting diode, AMOLED) display screen, a mini light-emitting diode (mini organic light-emitting diode) display screen, a micro light-emitting diode (micro organic light-emitting diode) display screen, a micro organic light-emitting diode (micro organic light-emitting diode) display screen, a quantum dot light-emitting diode (quantum dot light emitting diodes, QLED) display screen, and/or the like.

The foldable screen 10 can switch between an unfolded state and a folded state. In the folded state, the foldable screen 10 may be folded into a first portion 11 and a second portion 12. The foldable screen 10 further includes a third portion 13 located between the first portion 11 and the second portion 12. At least the third portion 13 of the foldable screen 10 is made of a flexible material. The first portion 11 and the second portion 12 may be made of a flexible material or a rigid material, or partially made of a rigid material and partially made of a flexible material, which is not specifically limited herein.

Figure 3:
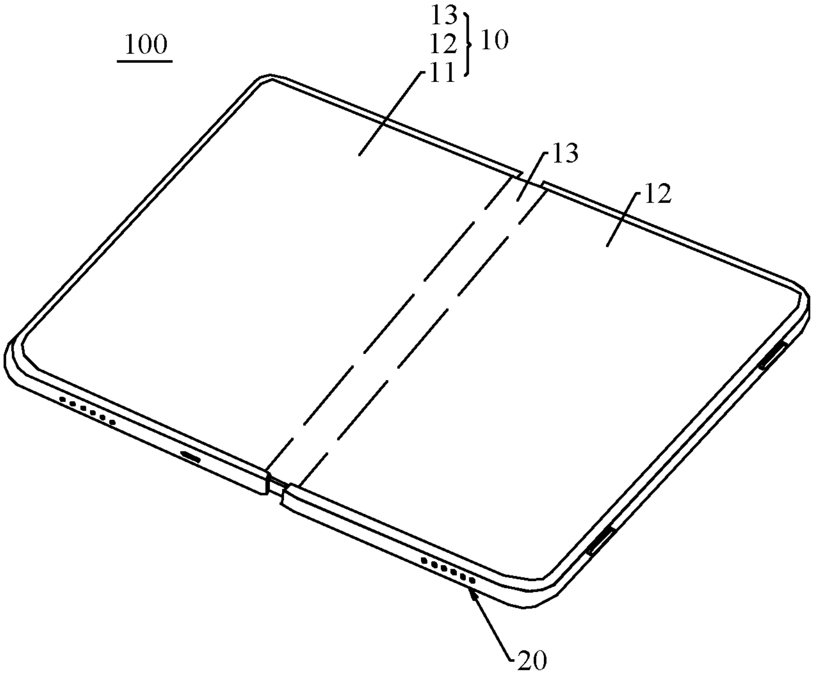
FIG. 3 is a three-dimensional view of the first electronic device in an unfolded state according to an embodiment of this application.

Referring to FIG. 3, FIG. 3 is a three-dimensional view of the first electronic device 100 in an unfolded state according to an embodiment of this application. In a case that the foldable screen 10 is in the unfolded state, the first portion 11, the second portion 12, and the third portion 13 are arranged coplanarly and have a same orientation. In this state, a large-screen display can be implemented, which may provide a user with richer information and bring better user experience.

Figure 4:
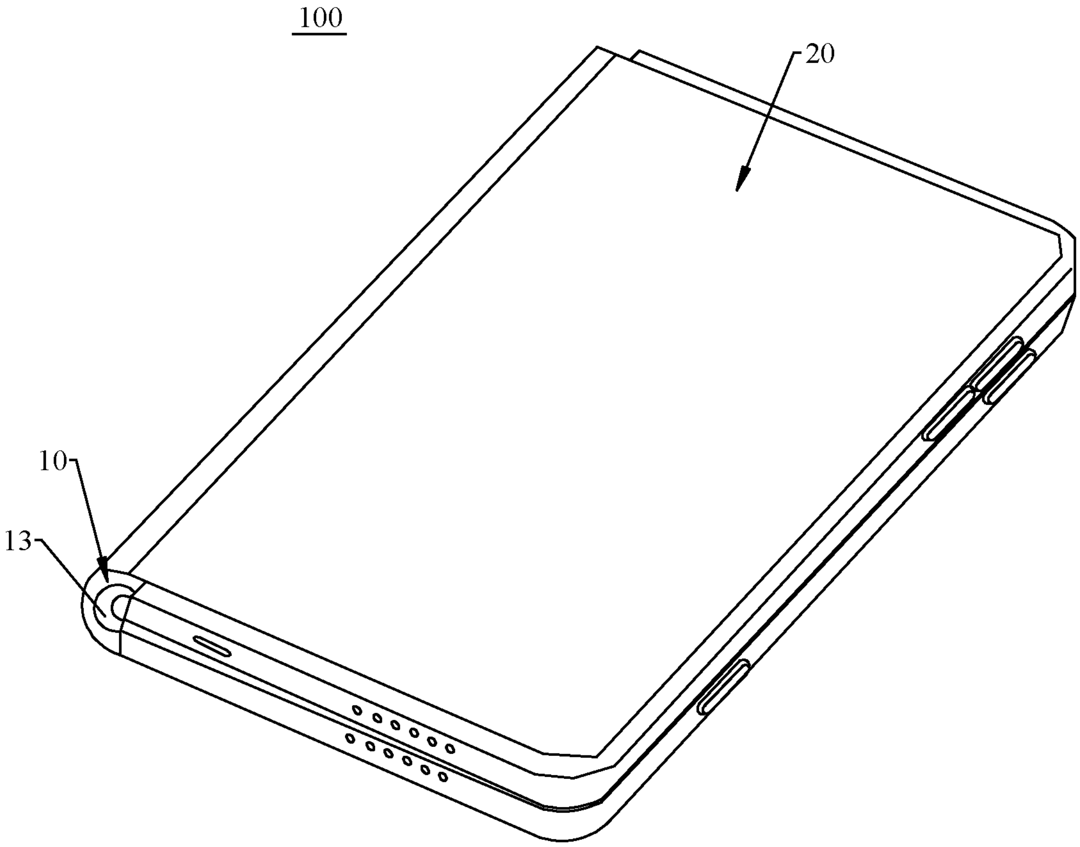
FIG. 4 is a three-dimensional view of the first electronic device in a folded state according to an embodiment of this application.

Referring to FIG. 4, FIG. 4 is a three-dimensional view of the first electronic device 100 in a folded state according to an embodiment of this application. When the foldable screen 10 is in the folded state, the third portion 13 is in a bent state, and the first portion 11 (not shown in FIG. 4) is opposite the second portion 12 (not shown in FIG. 4). In this state, the foldable screen 10 is invisible to the user. The support apparatus 20 is located outside the foldable screen 10 to protect the foldable screen 10 from being scratched by a hard object. In addition, in this state, a volume of the foldable electronic device 100 can be reduced to facilitate storage of the foldable electronic device 100.

Figure 5:
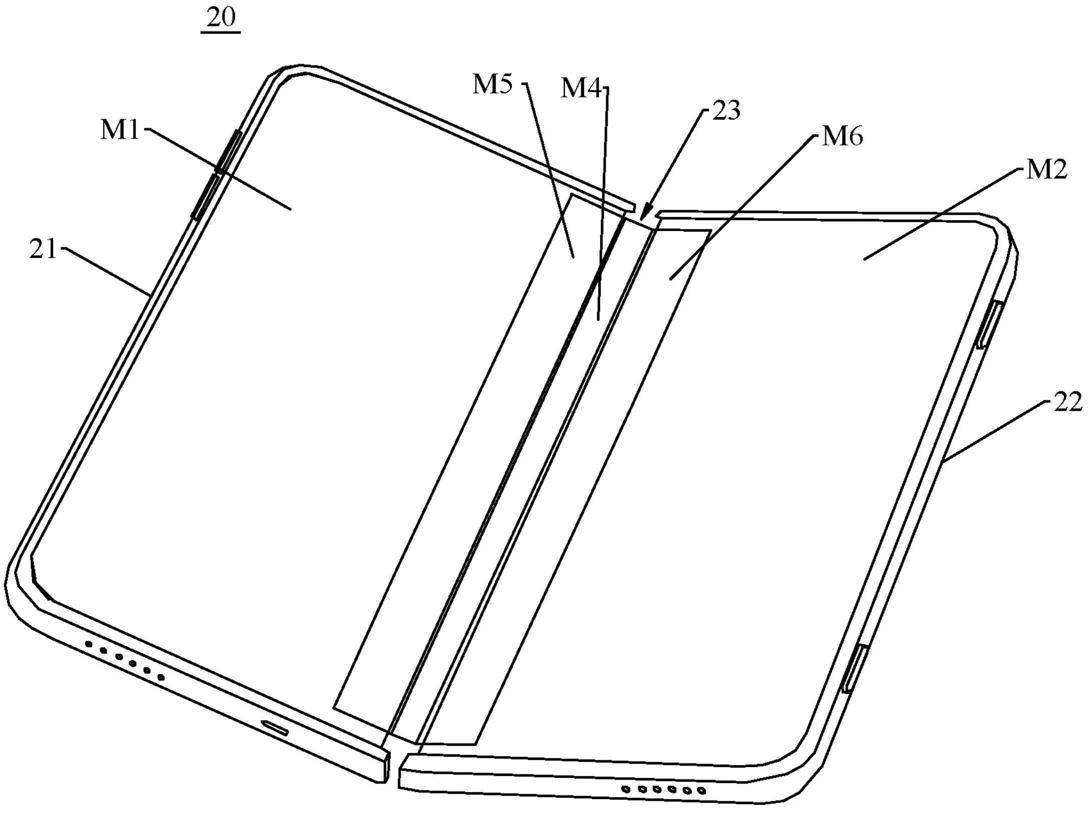
FIG. 5 is a three-dimensional view of a support apparatus in the electronic device shown in FIG. 2 to FIG. 4.

The support apparatus 20 is configured to support the foldable screen 10 and allow the foldable screen 10 to switch between the unfolded state and the folded state. Referring to FIG. 5, FIG. 5 is a three-dimensional view of the support apparatus 20 in the electronic device 100 shown in FIG. 2 to FIG. 4. In this embodiment, the support apparatus 20 includes a first housing 21, a second housing 22, and a rotary mechanism 23. It may be understood that FIG. 5 only schematically shows some components included in the support apparatus 20. Actual shapes, sizes, positions, and configurations of these components are not limited in FIG. 5.

The support apparatus 20 has a supporting surface. The supporting surface may be configured to support the foldable screen 10. Through the support of the supporting surface, in the unfolded state, the foldable screen 10 can be flat, and a display surface of the foldable screen 10 is flat.

The first housing 21 is configured to fix and support the first portion 11 of the foldable screen 10 in FIG. 2. Specifically, the first housing 21 has a supporting surface M1. The first housing 21 fixes and supports the first portion 11 of the foldable screen 10 in FIG. 2 by using the supporting surface M1. Exemplarily, a connection relationship between the supporting surface M1 and the first portion 11 includes, but is not limited to, gluing.

The second housing 22 is configured to fix and support the second portion 12 of the foldable screen 10 in FIG. 2. Specifically, the second housing 22 has a supporting surface M2. The second housing 22 fixes and supports the second portion 12 of the foldable screen 10 in FIG. 2 by using the supporting surface M2. Exemplarily, a connection relationship between the supporting surface M2 and the second portion 12 includes, but is not limited to, gluing.

The first housing 21 and/or the second housing 22 may respectively form a mounting space for mounting electronic components such as a circuit board, a battery, a receiver, a speaker, and a camera of the electronic device 100. The circuit board may integrate electronic components such as a main controller, a storage unit, an antenna module, and a power management module of the electronic device 100. The battery may supply power to the electronic components such as the foldable screen 10, the circuit board, the receiver, the speaker, and the camera. The first housing 21 and the second housing 22 may have equal thicknesses, or may have thicknesses that are not equal, which is not limited in this embodiment of this application.

In some embodiments, the mounting space may be disposed in both the first housing 21 and the second housing 22, to distribute the electronic components of the above electronic device 100 in the housings on the two sides. In some other embodiments, the mounting space may be disposed in only the first housing 21, to centrally distribute the electronic components of the above electronic device 100 in the first housing 21. Alternatively, the mounting space may be disposed in both the first housing 21 and the second housing 22, but most of the components of the above electronic device 100 are disposed in the second housing 22, and a small part is disposed in the first housing 21, so that the first housing 21 is lighter, to better facilitate folding and unfolding.

The first housing 21 may be a structural whole, or may be assembled by a plurality of portions. Similarly, the second housing 22 may be a structural whole or may be assembled by a plurality of portions.

Figure 6:
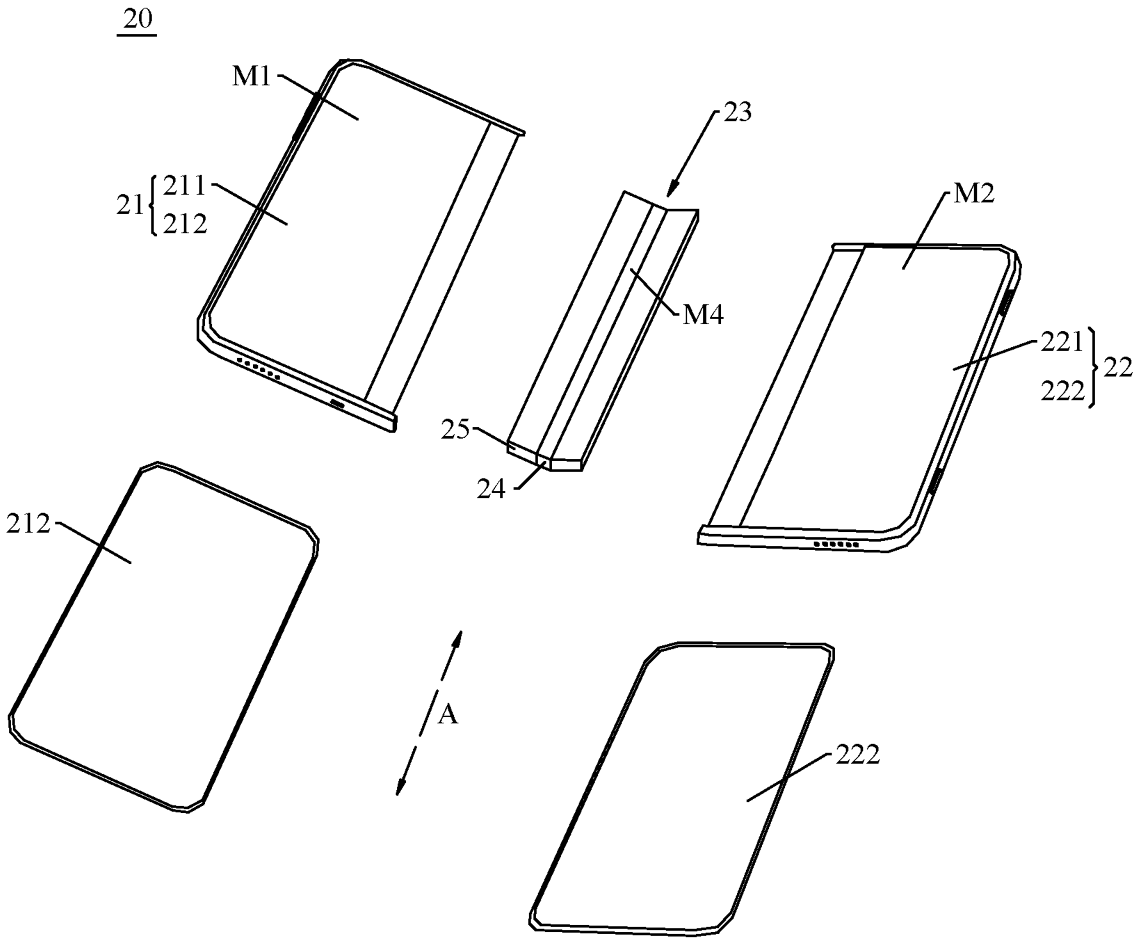
FIG. 6 is a schematic exploded view of the support apparatus in the electronic device shown in FIG. 5.

In some embodiments, referring to FIG. 6, FIG. 6 is a schematic exploded view of the support apparatus 20 in the electronic device 100 shown in FIG. 5. The first housing 21 includes a first intermediate frame 211 and a first back cover 212. The supporting surface M1 is located on the first intermediate frame 211. The first back cover 212 is fixed to one side of the first intermediate frame 211 away from the supporting surface M1. A surface of the first back cover 212 away from the supporting surface M1 of the first intermediate frame 211 is an exterior surface. The mounting space on the first housing 21 is defined by the first intermediate frame 211 and the first back cover 212.

The second housing 22 includes a second intermediate frame 221 and a second back cover 222. The supporting surface M2 is located on the second intermediate frame 221. The second back cover 222 is fixed to one side of the second intermediate frame 221 away from the supporting surface M2. A surface of the second back cover 222 away from the supporting surface M2 of the second intermediate frame 221 is an exterior surface. The mounting space on the second housing 22 is defined by the second intermediate frame 221 and the second back cover 222.

The rotary mechanism 23 is configured to support the third portion 13 of the foldable screen 10. Moreover, the rotary mechanism 23 is connected between the first housing 21 and the second housing 22. The first housing 21 and the second housing 22 are rotatably connected by using the rotary mechanism 23, so as to realize relative rotation between the first housing 21 and the second housing 22. Specifically, as shown in FIG. 6, a rotation axis of rotation of the first housing 21 with respect to the second housing 22 extends along the first direction A. In some embodiments, the rotary mechanism 23 is connected between the first intermediate frame 211 of the first housing 21 and the second intermediate frame 221 of the second housing 22. In other embodiments, the rotary mechanism 23 may be alternatively connected between the first back cover 212 of the first housing 21 and the second back cover 222 of the second housing 22.

The rotary mechanism 23 may be configured to switch between an unfolded state and a folded state. The rotary mechanism 23 switches between the unfolded state and the folded state, so as to allow the entire electronic device 100 to switch between the unfolded state and the folded state.

Figure 7:
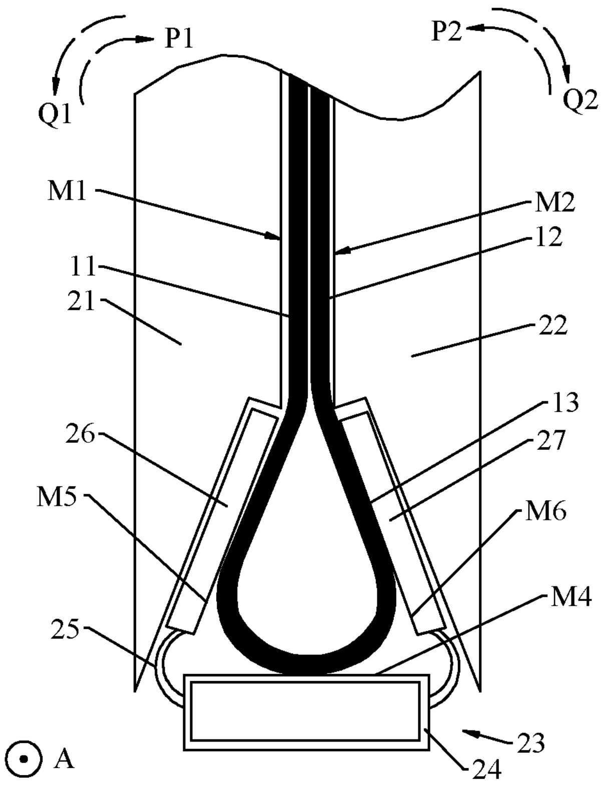
FIG. 7 is a partial side view of the support apparatus shown in FIG. 5 to FIG. 6.

Specifically, referring to FIG. 7, FIG. 7 is a partial side view of the support apparatus 20 shown in FIG. 5 to FIG. 6. During the switching from the unfolded state to the folded state, the rotary mechanism 23 can drive the first housing 21 and the second housing 22 to rotate toward each other. In this process, a rotation direction of the first housing 21 (a direction as indicated by an arrow P1 in FIG. 7) is opposite a rotation direction of the second housing 22 (a direction as indicated by an arrow P2 in FIG. 7). When the rotary mechanism 23 switches to the folded state, the first housing 21 and the second housing 22 face each other, and the supporting surface M1 of the first housing 21 and the supporting surface M2 of the second housing 22 face each other. In this case, the supporting surface M1 of the first housing 21 and the supporting surface M2 of the second housing 22 may be at a slight angle or parallel to each other to enable the two housings to be completely closed, thereby realizing the folding of the first housing 21 and the second housing 22, so that the first portion 11 and the second portion 12 of the foldable screen 10 can be oppositely arranged to switch the electronic device 100 to the folded state as a whole.

In addition, during the switching from the folded state to the unfolded state, the rotary mechanism 23 can drive the first housing 21 and the second housing 22 to rotate away from each other. In this process, a rotation direction of the first housing 21 (a direction as indicated by an arrow Q1 in FIG. 7) is opposite a rotation direction of the second housing 22 (a direction as indicated by an arrow Q2 in FIG. 7). When the rotary mechanism 23 switches to the unfolded state, the supporting surface M1 of the first housing 21 and the supporting surface M2 of the second housing 22 are coplanar and have a same orientation. In this way, the first housing 21 and the second housing 22 can be unfolded, so that the first portion 11 and the second portion 12 of the foldable screen 10 are coplanar and have a same orientation, and the electronic device 100 is switched to the unfolded state as a whole.

"The supporting surface M1 of the first housing 21 and the supporting surface M2 of the second housing 22 are coplanar and have a same orientation" means that the supporting surface M1 of the first housing 21 and the supporting surface M2 of the second housing 22 may be at 180°. Certainly, a tolerance of a specific angle is also allowed, for example, a tolerance within +10°. In other words, an angle between the supporting surface M1 of the first housing 21 and the supporting surface M2 of the second housing 22 ranges from 1700 to 190°.

Still referring to FIG. 6 and FIG. 7, the rotary mechanism 23 includes: a base 24, a first door panel 26, a second door panel 27, and a rotary assembly 25. FIG. 7 only schematically shows some components included in the rotary mechanism 23. Actual shapes, sizes, positions, and structures of these components are not limited in FIG. 7. The first direction A shown in FIG. 7 is a direction perpendicular to paper.

The base 24 has a supporting surface M4. In the unfolded state, the supporting surface M4 on the base 24 is suitable for supporting the third portion 13 of the foldable screen 10, so as to ensure flatness of the foldable screen 10 in the unfolded state. In the folded state, the third portion 13 of the foldable screen 10 is in a bent state, and a certain gap may be maintained between the third portion 13 and the base 24, so as to prevent damage caused by extrusion with the base 24 due to elastic deformation of the foldable screen 10 in the case of falling. Certainly, it may be understood that, in other examples, in the folded state, the supporting surface M4 of the base 24 may alternatively support the third portion 13. For example, a middle region of the supporting surface M4 of the base 24 is connected to the third portion 13 by gluing so as to fit and support the third portion 13.

Specifically, in the folded state of the electronic device 100, the supporting surface M4 of the base 24 is perpendicular to the supporting surface M1 of the first housing 21 (however, in an actual scenario, a tolerance of a specific angle is also allowed, and an angle between the supporting surface M1 of the first housing 21 and the supporting surface M4 of the base 24 ranges, for example, from 800 to 100°). The supporting surface M4 of the base 24 is perpendicular to the supporting surface M2 of the second housing 22 (however, in an actual scenario, a tolerance of a specific angle is also allowed, and an angle between the supporting surface M2 of the second housing 22 and the supporting surface M4 of the base 24 ranges, for example, from 800 to 100°).

The base 24 extends in the first direction A. In other words, a length direction of the base 24 is the first direction A. In this way, the length direction of the base 24 is consistent with that of the electronic device 100 in the folded state, which is conducive to increasing a length of the supporting surface M4 on the base 24, thereby increasing an area of the supporting surface M4. So, the supporting surface M4 can reliably support the third portion 13 of the foldable screen 10. Certainly, it may be understood that, in another example, alternatively, a width direction of the base 24 may be the first direction A.

To enable the foldable screen 10 to be folded into a water drop shape when the electronic device 100 is in the folded state, an inward folding angle (R angle) of the third portion 13 is increased to prolong a service life of the foldable screen 10. The first door panel 26 and the second door panel are arranged on two sides of the supporting surface M4 of the base 24 in the width direction. The first door panel 26 and the second door panel 27 are respectively formed in a flat-panel shape.

Specifically, the first door panel 26 has a supporting surface M5, and the second door panel 27 has a supporting surface M6. Both the supporting surface M5 and the supporting surface M6 fit the third portion 13 of the foldable screen 10 to support the third portion 13 of the foldable screen 10. The supporting surface M5 is located between the supporting surface M4 and the supporting surface M1 (see FIG. 5), and the supporting surface M6 is located between the supporting surface M4 and the supporting surface M2 (see FIG. 5). Moreover, the rotary assembly 25 can allow the first door panel 26 to rotate with respect to the base 24 and the second door panel 27 to rotate also with respect to the base 24.

During the switching of the electronic device 100 from the unfolded state to the folded state, as shown in FIG. 7, the first door panel 26 rotates with respect to the base 24 along the rotation direction P1, and the second door panel 27 rotates with respect to the base 24 along the direction P2 opposite the direction P1. That is, end portions of the first door panel 26 and the second door panel 27 away from the base 24 are close to each other, and end portions of the first door panel 26 and the second door panel 27 near the base 24 are far away from each other, so that the foldable screen 10 is bent between the first door panel 26 and the second door panel 27. Therefore, the first door panel 26, the base 24, and the second door panel 27 form a nearly triangular accommodating cavity, and the third portion 13 of the foldable screen 10 is accommodated in the triangular accommodating cavity and may be in a shape of a water drop. In this way, the inward folding angle (R angle) of the third portion 13 can be increased, and the service life of the foldable screen 10 can be prolonged.

Conversely, when the electronic device 100 switches from the folded state to the unfolded state, the first door panel 26 rotates with respect to the base 24 in a direction opposite the rotation direction P1 (the direction as indicated by Q1 in FIG. 7), and the second door panel 27 rotates with respect to the base 24 in a direction opposite the direction P2 (the direction as indicated by Q2 in FIG. 7). That is, the first door panel 26 and the second door panel 27 deviate from each other until the supporting surface M5 of the first door panel 26, the supporting surface M4 of the base 24, and the supporting surface M6 of the second door panel 27 are coplanar and have a same orientation, so that the foldable screen 10 is unfolded and the foldable screen 10 is supported.

It may be understood that "the supporting surface M5 of the first door panel 26, the supporting surface M4 of the base 24, and the supporting surface M6 of the second door panel 27 are coplanar" means that an angle between any two of the supporting surface M5 of the first door panel 26, the supporting surface M4 of the base 24, and the supporting surface M6 of the second door panel 27 is 180°. Certainly, in an actual scenario, a certain error is also allowed. For example, the angle between any two ranges from 800 to 100°.

It may be understood that, in some other examples, alternatively, the rotary mechanism 23 may not be provided with the first door panel 26 and the second door panel 27, but the supporting surface M5 is provided on the first connecting plate 251*a* described hereinafter, and the supporting surface M6 is provided on the second connecting plate 252*a*.

Figure 8:
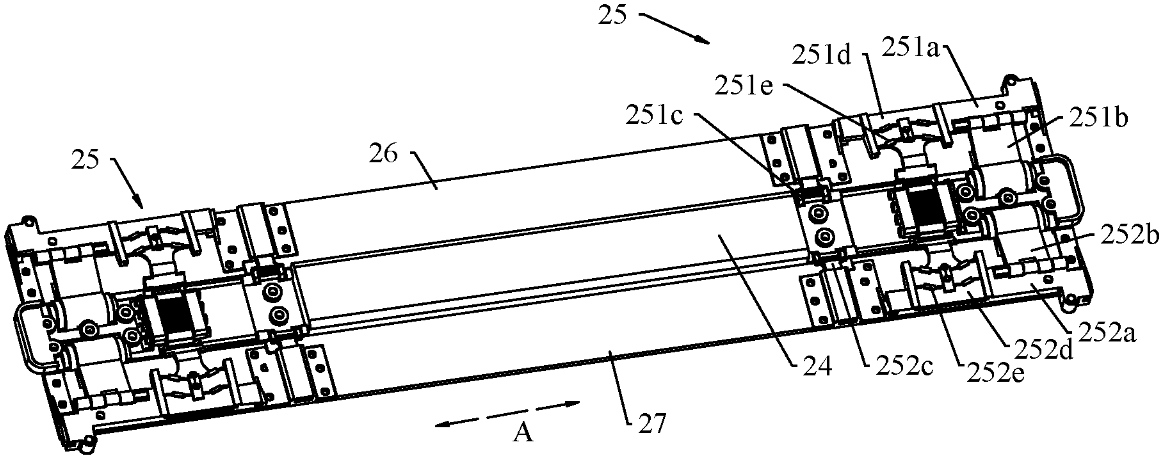
FIG. 8 is a three-dimensional view of the rotary mechanism shown in FIG. 5 to FIG. 6, in which the rotary mechanism is in the unfolded state.
Figure 9:
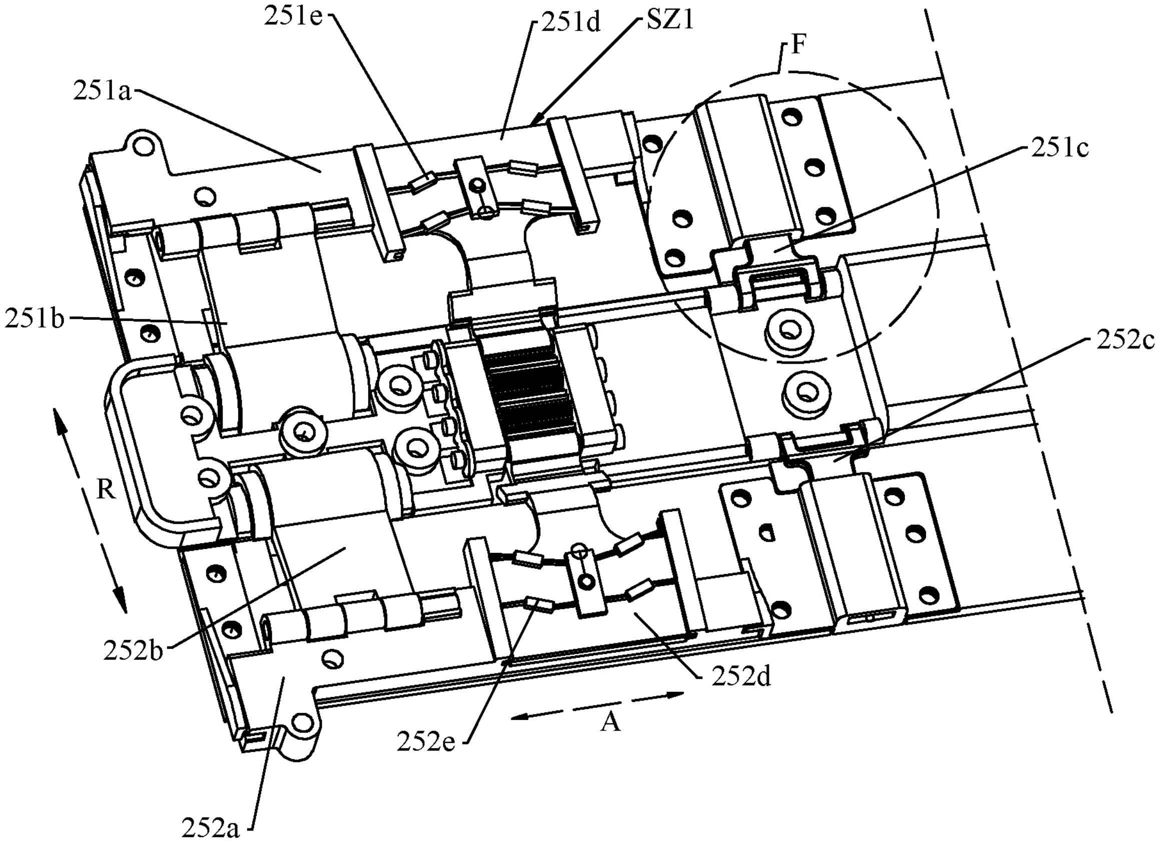
FIG. 9 is a partially enlarged view of the rotary mechanism shown in FIG. 8, in which the rotary mechanism is in the unfolded state.

To realize folding and unfolding of the electronic device 100, referring to FIG. 8 and FIG. 9, FIG. 8 is a three-dimensional view of the rotary mechanism 23 shown in FIG. 5 to FIG. 6, in which the rotary mechanism 23 is in the unfolded state. FIG. 9 is a partially enlarged view of the rotary mechanism 23 shown in FIG. 8, in which the rotary mechanism 23 is in the unfolded state. Specifically, the rotary assembly 25 includes the first connecting plate 251*a*, a first connector 251*b*, the first swing arm 251*d*, a first hinge 251*c*, a first multistable flexible mechanism 251*e*, the second connecting plate 252*a*, a second connector 252*b*, the second swing arm 252*d*, a second hinge 252*c*, and a second multistable flexible mechanism 252*e*. It may be understood that FIG. 8 and FIG. 9 only schematically show some components included in the rotary assembly 25. Actual shapes, sizes, positions, and structures of these components are not limited in FIG. 8 and FIG. 9. There may be one or more rotary assemblies 25. In the specific examples shown in FIG. 8 and FIG. 9, there are two rotary assemblies 25, but this does not constitute a special limitation on this application.

The first connecting plate 251*a* is fixed to the first housing 21. Specifically, the first connecting plate 251*a* is fixed to the first intermediate frame 211. Exemplarily, the first connecting plate 251*a* may be fixed to the first intermediate frame 211 in a manner such as threaded connection, riveting, or bonding, or may be integrally formed with the first intermediate frame 211.

The first connecting plate 251*a* is hinged to one side of the base 24 (e.g., one side in the width direction). Specifically, the first connecting plate 251*a* is hinged to the one side of the base 24 by using the first connector 251*b*. In other words, one end of the first connector 251*b* is hinged to the one side of the base 24. The first connector 251*b* extends along the first direction A with respect to a hinge axis of the base 24. The first connecting plate 251*a* is hinged to the other end of the first connector 251*b*, and the first connecting plate 251*a* extends along the first direction A with respect to a hinge axis of the first connector 251*b*.

The first swing arm 251*d* and the first connecting plate 251*a* are located on a same side of the base 24. Moreover, the first swing arm 251*d* is hinged to the one side of the base 24. The first swing arm 251*d* extends along the first direction A with respect to the hinge axis of the base 24. The first swing arm 251*d* and the first connecting plate 251*a* are spaced apart in the first direction A. During the switching of the rotary mechanism 23 between the unfolded state and the folded state, the first swing arm 251*d* may slide with respect to the first connecting plate 251*a* in a direction perpendicular to the first direction A (the direction indicated by the dotted arrow R in FIG. 9).

Figure 10:
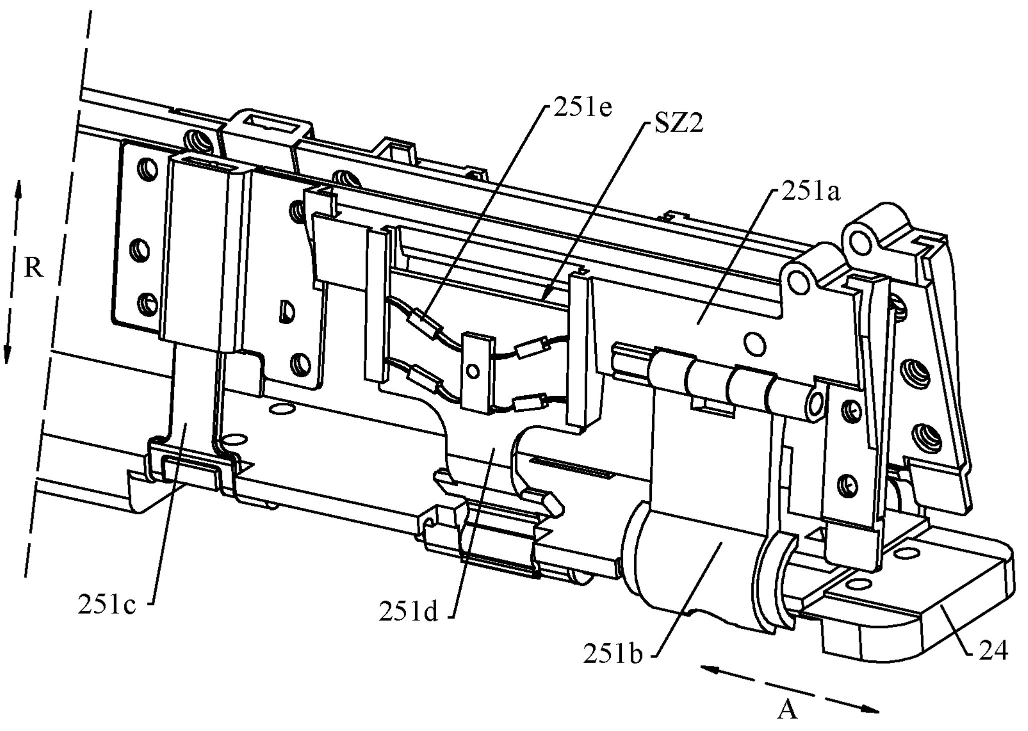
FIG. 10 is a partially enlarged view of the rotary mechanism shown in FIG. 8, in which the rotary mechanism is in the folded state.

Referring to FIG. 9 and FIG. 10, FIG. 10 is a partially enlarged view of the rotary mechanism 23 shown in FIG. 8, in which the rotary mechanism23 is in the folded state. The first swing arm 251*d*, when sliding with respect to the first connecting plate 251*a* in the direction perpendicular to the first direction A, may slide to a first locking position of the first swing arm 251*d* with respect to the first connecting plate 251*a* (SZ1 as marked in FIG. 9 is a location of the first swing arm 251*d*) and a second locking position of the first swing arm 251*d* with respect to the first connecting plate 251*a* (SZ2 as marked in FIG. 10 is a location of the first swing arm 251*d*). When the first swing arm 251*d* slides to the first locking position with respect to the first connecting plate 251*a*, the rotary mechanism 23 is in the unfolded state. When the first swing arm 251*d* slides to the second locking position with respect to the first connecting plate 251*a*, the rotary mechanism 23 is in the folded state.

The first multistable flexible mechanism 251*e* is disposed on the first connecting plate 251*a*. Moreover, the first multistable flexible mechanism 251*e* has a first stable state and a second stable state. The first multistable flexible mechanism 251*e* cooperates with the first swing arm 251*d*. Moreover, the first multistable flexible mechanism 251*e* switches between the first stable state and the second stable state as the first swing arm 251*d* slides with respect to the first connecting plate 251*a*.

As shown in FIG. 9, in the unfolded state of the rotary mechanism 23, the first multistable flexible mechanism 251*e* is in the first stable state, so as to lock the first swing arm 251*d* at the first locking position (the position as indicated by SZ1 in FIG. 9). Alternatively, as shown in FIG. 10, in the folded state of the rotary mechanism 23, the first multistable flexible mechanism 251*e* is in the second stable state, so as to lock the first swing arm 251*d* at the second locking position (the position as indicated by SZ2 in FIG. 10). In other words, in the unfolded state of the rotary mechanism 23, the first multistable flexible mechanism 251*e* can restrict the sliding of the first swing arm 251*d* with respect to the first connecting plate 251*a*, so as to lock the first swing arm 251*d* at the first locking position. In the folded state of the rotary mechanism 23, the first multistable flexible mechanism 251*e* can also restrict the sliding of the first swing arm 251*d* with respect to the first connecting plate 251*a*, so as to lock the first swing arm 251*d* at the second locking position. A degree of deformation of a flexible member in the first multistable flexible mechanism 251*e* in the second stable state is greater than that of the flexible member in the first multistable flexible mechanism 251*e* in the first stable state.

In this way, when the first multistable flexible mechanism 251*e* locks the first swing arm 251*d* at the first locking position and no external force is exerted by the user on the first housing 21, the first swing arm 251*d* no longer slides along the first connecting plate 251*a*, so that the rotary mechanism 23 can be maintained in the current unfolded state. When the first multistable flexible mechanism 251*e* locks the first swing arm 251*d* at the second locking position and no external force is exerted by the user on the first housing 21, the first swing arm 251*d* no longer slides along the first connecting plate 251*a*, so that the rotary mechanism 23 can be maintained in the current folded state.

Specifically, due to the hinging of the first connector 251*b* to the base 24, the hinging of the first connecting plate 251*a* to the first connector 251*b*, the hinging of the first swing arm 251*d* to the base 24, and the sliding connection between the first connecting plate 251*a* and the first swing arm 251*d*, the first connector 251*b*, the first swing arm 251*d*, the first connecting plate 251*a*, and the base 24 can constitute a slider-crank mechanism. When the force exerted by the user on the first housing 21 causes the first connecting plate 251*a* to rotate with respect to the base 24, under mechanical linkage among the base 24, the first connecting plate 251*a*, the first connector 251*b*, the first swing arm 251*d*, and the like, relative sliding between the first swing arm 251*d* and the first connecting plate 251*a* may be synchronously driven, so as to realize the folding or unfolding of the electronic device 100. When the first multistable flexible mechanism 251*e* disposed on the first connecting plate 251*a* locks the first swing arm 251*d* at the first locking position or the second locking position to restrict the sliding of the first swing arm 251*d* with respect to the first connecting plate 251*a*, the rotation of the first connecting plate 251*a* with respect to the base 24 is also restricted under the mechanical linkage among the base 24, the first connecting plate 251*a*, the first connector 251*b*, the first swing arm 251*d*, and the like. Therefore, at the first locking position and the second locking position, the first connecting plate 251*a* no longer rotates with respect to the base 24, so that a purpose of maintaining the electronic device 100 in the current unfolded state or folded state is realized.

In the rotary mechanism 23 according to the embodiments of this application, the first multistable flexible mechanism 251*e* is disposed. Moreover, the first multistable flexible mechanism 251*e* is disposed on the first connecting plate 251*a*, and the first multistable flexible mechanism 251*e* cooperates with the first swing arm 251*d*, so as to lock the first swing arm 251*d* at the second locking position of the first swing arm 251*d* with respect to the first connecting plate 251*a* in the folded state of the rotary mechanism 23. The first swing arm 251*d* is locked at the first locking position of the first swing arm 251*d* with respect to the first connecting plate 251*a* in the unfolded state of the rotary mechanism 23. In this way, the space of the rotary mechanism 23 corresponding to the base 24 can be saved while the folded state and the unfolded state of the electronic device 100 are locked by using the first multistable flexible mechanism 251*e*, so as to properly optimize a structural layout of the entire rotary mechanism 23, thereby being conducive to optimizing a structural layout of the rotary mechanism 23 corresponding to the base 24. Moreover, compared with the locking member 25*a* in FIG. 1*a*, the first multistable flexible mechanism 251*e* has a simple structure and is conducive to realizing thin design of the rotary mechanism 23 corresponding to the base 24, thereby facilitating thin design of the electronic device 100. In addition, modular design of the first multistable flexible mechanism 251*e* and the first connecting plate 251*a* can also be realized, which facilitates assembly of the first multistable flexible mechanism 251*e* and the first connecting plate 251*a* as a whole with other components of the rotary mechanism 23. Moreover, motion and force transmission of the first multistable flexible mechanism 251*e* are realized by deformation of some or all members thereof, without friction and wear, which is conducive to prolonging the service life.

In some examples, the first swing arm 251*d*, when sliding with respect to the first connecting plate 251*a* in the direction perpendicular to the first direction A, may slide to a third locking position of the first swing arm 251*d* with respect to the first connecting plate 251*a*. The third locking position is between the first locking position and the second locking position. That is, the third locking position is on a switching path of the first swing arm 251*d* switching between the first locking position and the second locking position. The first multistable flexible mechanism 251*e* further has a third stable state, and the third stable state is on a switching path of the first multistable flexible mechanism 251*e* switching between the first stable state and the second stable state. The first multistable flexible mechanism 251*e* cooperates with the first swing arm 251*d*, and the first multistable flexible mechanism 251*e* switches among the first stable state, the second stable state, and the third stable state as the first swing arm 251*d* slides with respect to the first connecting plate 251*a*. When the rotary mechanism 23 is in an intermediate hovering state, the first multistable flexible mechanism 251*e* is in the third stable state, so as to lock the first swing arm 251*d* at the third locking position. In this way, when no external force is exerted by the user, the first swing arm 251*d* no longer slides along the first connecting plate 251*a*, so that the rotary mechanism 23 can be maintained in the current intermediate hovering state.

It may be understood that "the third locking position is on a switching path of the first swing arm 251*d* switching between the first locking position and the second locking position" refers to a motion trajectory of the first swing arm 251*d* moving between the first locking position and the second locking position with respect to the first connecting plate 251*a*. Similar descriptions in the following may be used for same understanding.

It may be understood that the intermediate hovering state is on a switching path of the rotary mechanism 23 between the folded state and the unfolded state. In other words, the rotary mechanism 23 may pass through the intermediate hovering state during the switching between the folded state and the unfolded state. In the intermediate hovering state, an angle between the supporting surface M1 of the first housing 21 and the supporting surface M4 of the base 24 is greater than 90° and less than 180°. For example, in the intermediate hovering state, the angle between the supporting surface M1 of the first housing 21 and the supporting surface M4 of the base 24 may be any value greater than 125° and less than 165°. In this way, different usage requirements of the user can be met.

Moreover, there may be one or more intermediate hovering states. When there are a plurality of intermediate hovering states, in different intermediate hovering states, the angle between the supporting surface M1 of the first housing 21 and the supporting surface M4 of the base 24 varies. Certainly, it may be understood that, in another example, alternatively, the electronic device 100 may not have the intermediate hovering state. In this way, there is no need to use the first multistable flexible mechanism 251*e* to lock the first swing arm 251*d* at the third locking position.

A structure of the electronic device 100 is described in detail below with two examples regarding whether the electronic device 100 has an intermediate hovering state.

Figure 11:
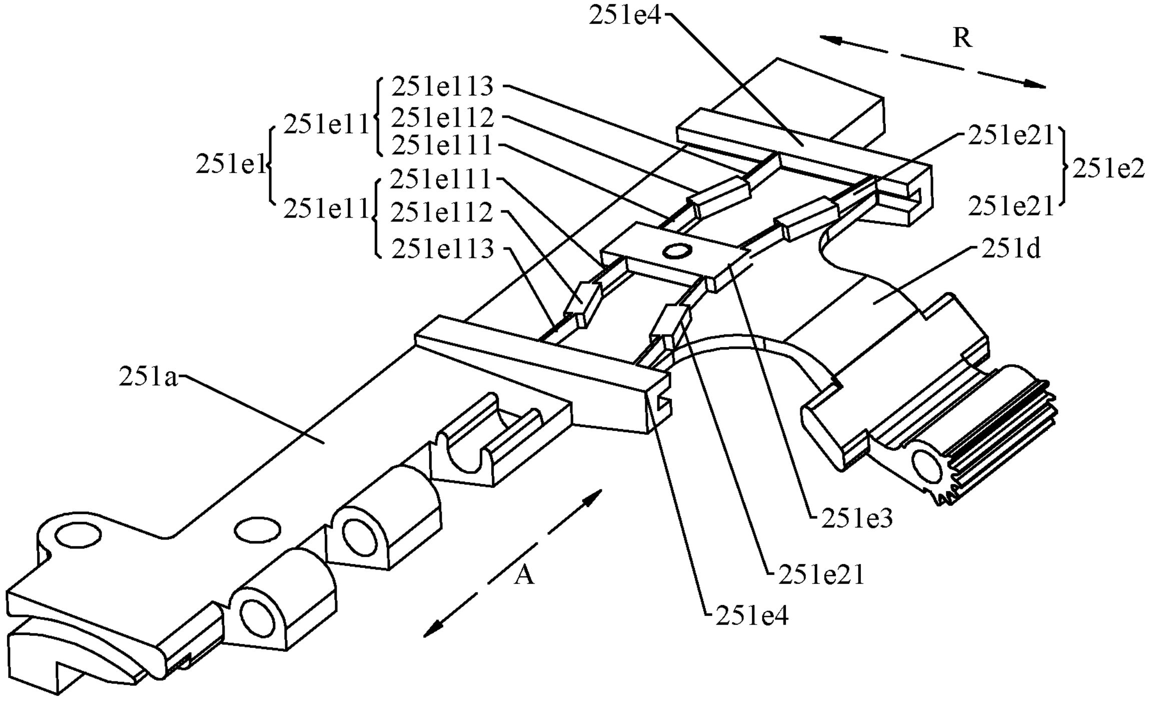
FIG. 11 is a schematic diagram of cooperation among a first connecting plate, a first swing arm, and a first multistable flexible mechanism shown in FIG. 8.
Figure 12:
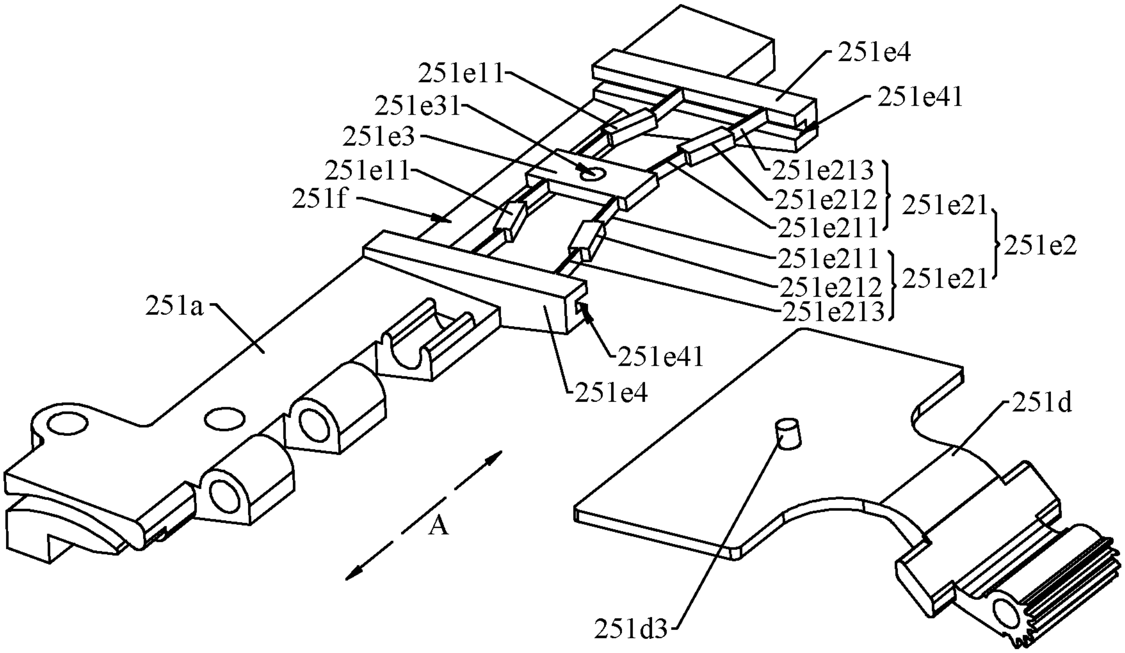
FIG. 12 is a schematic exploded view of the first connecting plate, the first swing arm, and the first multistable flexible mechanism shown in FIG. 8.

Referring to FIG. 11 and FIG. 12, FIG. 11 is a schematic diagram of cooperation among the first connecting plate 251*a*, the first swing arm 251*d*, and the first multistable flexible mechanism 251*e* shown in FIG. 8. FIG. 12 is a schematic exploded view of the first connecting plate 251*a*, the first swing arm 251*d*, and the first multistable flexible mechanism 251*e* shown in FIG. 8. The first multistable flexible mechanism 251*e* includes: a connecting block 251*e*3, a fixed portion 251*e*4, a first compliant bistable unit 251*e*1, and a second compliant bistable unit 251*e*2.

The connecting block 251*e*3 is fixed to the first swing arm 251*d*. The connecting block 251*e*3 and the first swing arm 251*d* are connected by, but not limited to, clamping, welding, gluing, or screwing. Exemplarily, referring to FIG. 11 and FIG. 12, a positioning hole 251*e*31 is formed in the connecting block 251*e*3, a positioning column 251*d*3 is formed on the first swing arm 251*d*, and the positioning column 251*d*3 fits into the positioning hole 251*e*31. In another example, the positioning hole may be disposed in the first swing arm 251*d*, and the positioning column may be disposed on the connecting block 251*e*3. In another example, alternatively, the connecting block 251*e*3 and the first swing arm 251*d* may be integrally formed.

Specifically, the connecting block 251*e*3 may be located in a middle region of the first swing arm 251*d* in the first direction A. In this way, when the connecting block 251*e*3 moves with the first swing arm 251*d*, it is beneficial to ensure uniformity of the force on the connecting block 251*e*3, so as to balance force on two first compliant beam units connected to the connecting block 251*e*3 as described below. Exemplarily, the connecting block 251*e*3 is symmetrically disposed with respect to a central axis of the first swing arm 251*d* extending in a sliding direction of the first swing arm 251*d*.

The connecting block 251*e*3 is made of, but not limited to, metal or plastic. The connecting block 251*e*3 may be formed in a shape of a cube, a cylinder, or a triangular prism.

There are two fixed portions 251*e*4. The two fixed portions 251*e*4 are oppositely disposed in the first direction A and respectively fixed to the first connecting plate 251*a*. Moreover, the two fixed portions 251*e*4 may define a sliding space 251*f* with the first connecting plate 251*a*. A portion of the first swing arm 251*d*, the first compliant bistable unit 251*e*1, and the second compliant bistable unit 251*e*2 may be accommodated in the sliding space 251*f*.

Exemplarily, the fixed portions 251*e*4 may protrude from a surface of the first connecting plate 251*a*, and a portion of the first connecting plate 251*a* between the two fixed portions 251*e*4 is recessed so that the first connecting plate 251*a* and the two fixed portions 251*e*4 define the sliding space 251*f* with a larger depth dimension to accommodate the first swing arm 251*d*, the first compliant bistable unit 251*e*1, and the second compliant bistable unit 251*e*2. In another example, the surface of the first connecting plate 251*a* is recessed to form the sliding space 251*f*, and sidewalls on two sides of the sliding space 251*f* along the first direction A respectively form the two fixed portions 251*e*4. In yet another example, the fixed portions 251*e*4 may protrude from the surface of the first connecting plate 251*a*, so as to define the sliding space 251*f* with the surface of the first connecting plate 251*a*.

The fixed portions 251*e*4 and the first connecting plate 251*a* are connected by, but not limited to, gluing, welding, clamping, or screwing. In another example, alternatively, the fixed portions 251*e*4 and the first connecting plate 251*a* may be integrally formed. In this way, it is beneficial to improve strength of the connection between the fixed portions 251*e*4 and the first connecting plate 251*a* and improve reliability of the connection between the fixed portions 251*e*4 and the first connecting plate 251*a*.

Guide chutes 251*e*41 are respectively formed on opposite surfaces of the two fixed portions 251*e*4. Two ends of the first swing arm 251*d* along the first direction A fit into the guide chutes 251*e*41 respectively. The guide chutes 251*e*41 are disposed, and the sliding of the first swing arm 251*d* with respect to the first connecting plate 251*a* can be guided by using the guide chutes 251*e*41, which improves reliability of operation of the first swing arm 251*d* and can also realize cooperation between the first swing arm 251*d* and the first connecting plate 251*a*.

Still referring to FIG. 11 and FIG. 12, the first compliant bistable unit 251*e*1 includes two first compliant beam units 251*e*11. The two first compliant beam units 251*e*11 are arranged in the first direction A.

Specifically, the two first compliant beam units 251*e*11 are respectively located on two sides of the connecting block 251*e*3 in the first direction A, and the two first compliant beam units 251*e*11 are symmetrically disposed with respect to the connecting block 251*e*3. Since the connecting block 251*e*3 is symmetrically disposed with respect to the central axis of the first swing arm 251*d* extending in the sliding direction of the first swing arm 251*d*, the two first compliant beam units 251*e*11 can be symmetrically disposed with respect to the central axis of the first swing arm 251*d* extending in the sliding direction of the first swing arm 251*d*. Therefore, the force on the two first compliant beam units 251*e*11 can be balanced, and the two can synchronously deform.

It may be understood that, in another example, alternatively, the two first compliant beam units 251*e*11 may not be located on the two sides of the connecting block 251*e*3 in the first direction A, provided that the two first compliant beam units 251*e*11 are symmetrically disposed with respect to a central axis of the connecting block 251*e*3 extending in the sliding direction of the first swing arm 251*d*.

End portions of one ends, which are adjacent to each other, of the two first compliant beam units 251*e*11 are respectively connected to the connecting block 251*e*3. Specifically, each of the end portions of the one ends, which are adjacent to each other, of the first compliant beam units

**251*e*11 and the connecting block 251*e*3 are connected by, but not limited to, welding, gluing, or clamping. Alternatively, the two first compliant beam units 251*e*11 and the connecting block 251*e*3 are integrally formed. In this way, it is beneficial to improve strength of the connection between the connecting block 251*e*3 and each of the first compliant beam units 251*e*11** and ensure reliability of the connection.

It may be understood that, in another example, alternatively, the first multistable flexible mechanism **251*e* may not include the connecting block 251*e*3, and the end portions of the one ends, which are adjacent to each other, of the two first compliant beam units 251*e*11 are directly connected to the first swing arm 251*d*, provided that the end portions of the one ends, which are adjacent to each other, of the two first compliant beam units 251*e*11 are relatively fixed to the first swing arm 251*d***.

Herein, "the end portions of the one ends, which are adjacent to each other, of the two first compliant beam units **251*e*11 are relatively fixed to the first swing arm 251*d*" means that the end portions of the one ends, which are adjacent to each other, of the two first compliant beam units 251*e*11 and the first swing arm 251*d*** cannot move with respect to each other, and a relative position relationship between the two remains unchanged. Similar descriptions in the following may be used for same understanding.

The two first compliant beam units **251*e*11 are in one-to-one correspondence to the two fixed portions 251*e*4. Each of the first compliant beam units 251*e*11 is located between the corresponding fixed portion 251*e*4 and the connecting block 251*e*3. An end portion at the other end of each of the first compliant beam units 251*e*11 is connected to a surface of the corresponding fixed portion 251*e*4 facing the other fixed portion 251*e*4, so as to be connected to the first connecting plate 251*a* through the corresponding fixed portion 251*e*4. Each of the first compliant beam units 251*e*11 and the corresponding fixed portion 251*e*4 are connected by, but not limited to, welding, gluing, or clamping. Alternatively, the first compliant beam unit 251*e*11 and the corresponding fixed portion 251*e*4 may be integrally formed. In this way, it is beneficial to improve strength of the connection between the fixed portion 251*e*4 and the corresponding first compliant beam unit 251*e*11** and ensure reliability of the connection.

In this embodiment of this application, each of the first compliant beam units **251*e*11 is located between the corresponding fixed portion 251*e*4 and the connecting block 251*e*3, which helps to space the first compliant beam unit 251*e*11 apart from the first connecting plate 251*a*, thereby facilitating elastic deformation of the first compliant beam unit 251*e*11**.

It may be understood that, in another example, alternatively, the first multistable flexible mechanism **251*e* may not include the fixed portion 251*e*4, and end portions of the other ends, which are away from each other, of the two first compliant beam units 251*e*11 are directly connected to the first connecting plate 251*a*, provided that the end portions of the other ends, which are away from each other, of the two first compliant beam units 251*e*11 are relatively fixed to the first connecting plate 251*a***.

Specifically, a length dimension of an extension trajectory of the first compliant beam unit **251*e*11 from the end portion of the one end of the first compliant beam unit 251*e*11 and the end portion of the other end of the first compliant beam unit 251*e*11 is greater than a vertical distance between the end portion of the one end of the first compliant beam unit 251*e*11 and the end portion of the other end of the first compliant beam unit 251*e*11 in the first direction A. Therefore, when external force is applied to the first compliant beam unit 251*e*11, the deformation of the first compliant beam unit 251*e*11** can be facilitated.

Still referring to FIG. 11 and FIG. 12, the first compliant beam unit **251*e*11 includes: a first compliant beam 251*e*111, a first rigid member 251*e*112, and a first flexible beam 251*e*113**.

An end portion of one end of the first compliant beam **251*e*111 is connected to the connecting block 251*e*3. The first compliant beam 251*e*111 is in a shape of a sheet. That is, the first compliant beam 251*e*111 is a sheet-shaped elastic piece structure. The first compliant beam 251*e*111 is disposed in the shape of the sheet, which can facilitate bending elastic deformation of the first compliant beam 251*e*111**.

An end portion of one end of the first flexible beam **251*e*113 is connected to the corresponding fixed portion 251*e*4. The first flexible beam 251*e*113 is also in a shape of a sheet. That is, the first flexible beam 251*e*113 is a sheet-shaped elastic piece structure. The first flexible beam 251*e*113 is disposed in the shape of the sheet, which can facilitate bending elastic deformation of the first flexible beam 251*e*113**.

The first rigid member **251*e*112 is connected between an end portion of the other end of the first compliant beam 251*e*111 and an end portion of the other end of the first flexible beam 251*e*113. Rigidity of the first rigid member 251*e*112 is greater than rigidity of the first compliant beam 251*e*111 and rigidity of the first flexible beam 251*e*113. The rigidity of the first rigid member 251*e*112 is greater than the rigidity of the first flexible beam 251*e*113 and greater than the rigidity of the first compliant beam 251*e*111, so as to help to improve rigidity of the entire first compliant beam unit 251*e*11. In this way, it is conducive to improving force required to bend the first compliant beam unit 251*e*11 and improving reliability of the locking of the first swing arm 251*d* by the first multistable flexible mechanism 251*e*. Certainly, this application is not limited thereto. In another example, alternatively, the rigidity of the first rigid member 251*e*112 may be equal to the rigidity of the first compliant beam 251*e*111 and the rigidity of the first flexible beam 251*e*113**.

Further, a cross-sectional area of the first rigid member **251*e*112 is greater than a cross-sectional area of the first compliant beam 251*e*111 and greater than a cross-sectional area of the first flexible beam 251*e*113, so that the rigidity of the first rigid member 251*e*112 is greater than the rigidity of the first compliant beam 251*e*111 and greater than the rigidity of the first flexible beam 251*e*113. Exemplarily, the first rigid member 251*e*112, the first compliant beam 251*e*111, and the first flexible beam 251*e*113 are made of a same material, and the cross-sectional area of the first rigid member 251*e*112 is greater than the cross-sectional area of the first compliant beam 251*e*111 and greater than the cross-sectional area of the first flexible beam 251*e*113. Certainly, this application is not limited thereto. In another example, alternatively, the first rigid member 251*e*112 may be made of a material with relatively high rigidity, and the first compliant beam 251*e*111 and the first flexible beam 251*e*113 may be made of a material with relatively low rigidity. In this case, the cross-sectional area of the first rigid member 251*e*112 may be greater than, equal to, or less than the cross-sectional area of the first compliant beam 251*e*11 and the cross-sectional area of the first flexible beam 251*e*113**, provided that the rigidity of the first rigid member

251*e*112 is greater than the rigidity of the first compliant beam 251*e*111 and greater than the rigidity of the first flexible beam 251*e*113.

Exemplarily, the first rigid member 251*e*112 is in a shape of a cube, a cylinder, or a triangular prism. The first rigid member 251*e*112 is made of, but not limited to, metal, plastic, or a combination thereof.

The first rigid member 251*e*112 and the first compliant beam 251*e*111 may be connected by gluing, clamping, welding, or screwing. Alternatively, the first rigid member 251*e*112 and the first compliant beam 251*e*111 may be integrally formed. In this way, it is beneficial to simplify a processing technology of the first compliant beam unit 251*e*11 and reduce manufacturing costs of the first compliant beam unit 251*e*11.

The first rigid member 251*e*112 and the first flexible beam 251*e*113 may be connected by gluing, clamping, welding, or screwing. Alternatively, the first rigid member 251*e*112 and the first flexible beam 251*e*113 may be integrally formed. In this way, it is beneficial to simplify the processing technology of the first compliant beam unit 251*e*11 and reduce the manufacturing costs of the first compliant beam unit 251*e*11. Specifically, the first rigid member 251*e*112, the first compliant beam 251*e*111, and the first flexible beam 251*e*113 are integrally formed. In this way, it is beneficial to simplify the processing technology of the first compliant beam unit 251*e*11 and reduce the manufacturing costs of the first compliant beam unit 251*e*11.

Still referring to FIG. 11 and FIG. 12, the second compliant bistable unit 251*e*2 and the first compliant bistable unit 251*e*1 are arranged in a sliding direction of the first swing arm 251*d* with respect to the first connecting plate 251*a*.

Specifically, the second compliant bistable unit 251*e*2 includes two second compliant beam units 251*e*21. The two second compliant beam units 251*e*21 are arranged in the first direction A, and the two second compliant beam units 251*e*21 are symmetrically disposed with respect to a symmetry line of the two first compliant beam units 251*e*11, so as to realize reliability of operation of the first multistable flexible mechanism 251*e*. Specifically, the two second compliant beam units 251*e*21 are respectively located on two sides of the connecting block 251*e*3 in the first direction A, and the two second compliant beam units 251*e*21 are symmetrically disposed with respect to the connecting block 251*e*3. Since the connecting block 251*e*3 is in the middle region of the first swing arm 251*d* in the first direction, the two second compliant beam units 251*e*21 can be symmetrically disposed with respect to the central axis of the first swing arm 251*d* extending in the sliding direction of the first swing arm 251*d*. Therefore, the force on the two second compliant beam units 251*e*21 can be balanced, and the two can synchronously deform.

It may be understood that, in another example, alternatively, the two second compliant beam units 251*e*21 may not be located on the two sides of the connecting block 251*e*3 in the first direction A, provided that the two second compliant beam units 251*e*21 are symmetrically disposed with respect to the symmetry line of the two first compliant beam units 251*e*11.

End portions of one ends, which are adjacent to each other, of the two second compliant beam units 251*e*21 are respectively connected to the connecting block 251*e*3. Specifically, each of the end portions of the one ends, which are adjacent to each other, of the second compliant beam units 251*e*21 and the connecting block 251*e*3 are connected by, but not limited to, welding, gluing, or clamping. Alternatively, the two second compliant beam units 251*e*21 and the connecting block 251*e*3 are integrally formed. In this way, it is beneficial to improve strength of the connection between the connecting block 251*e*3 and each of the second compliant beam units 251*e*21 and ensure reliability of the connection.

It may be understood that, in another example, alternatively, the first multistable flexible mechanism 251*e* may not include the connecting block 251*e*3, and the end portions of the one ends, which are adjacent to each other, of the two second compliant beam units 251*e*21 are directly connected to the first swing arm 251*d*, provided that the end portions of the one ends, which are adjacent to each other, of the two second compliant beam units 251*e*21 are relatively fixed to the first swing arm 251*d*.

The two second compliant beam units 251*e*21 are in one-to-one correspondence to the two fixed portions 251*e*4. Each of the second compliant beam units 251*e*21 is located between the corresponding fixed portion 251*e*4 and the connecting block 251*e*3. An end portion of the other end of each of the second compliant beam units 251*e*21 is connected to the corresponding fixed portion 251*e*4, so as to be connected to the first connecting plate 251*a* through the corresponding fixed portion 251*e*4. Each of the second compliant beam units 251*e*21 and the corresponding fixed portion 251*e*4 are connected by, but not limited to, welding, gluing, or clamping. Alternatively, the second compliant beam unit 251*e*21 and the corresponding fixed portion 251*e*4 may be integrally formed. In this way, it is beneficial to improve strength of the connection between the fixed portion 251*e*4 and the corresponding second compliant beam unit 251*e*21 and ensure reliability of the connection.

In this embodiment of this application, each of the second compliant beam units 251*e*21 is located between the corresponding fixed portion 251*e*4 and the connecting block 251*e*3, which helps to space the second compliant beam unit 251*e*21 apart from the first connecting plate 251*a*, thereby facilitating elastic deformation of the second compliant beam unit 251*e*21.

It may be understood that, in another example, when the first multistable flexible mechanism 251*e* does not include the fixed portion 251*e*4, end portions at the other ends, which are away from each other, of the two second compliant beam units 251*e*21 are directly connected to the first connecting plate 251*a*, provided that the end portions at the other ends, which are away from each other, of the two second compliant beam units 251*e*21 are relatively fixed to the first connecting plate 251*a*.

Specifically, a length dimension of an extension trajectory of the second compliant beam unit 251*e*21 from the end portion of the one end of the second compliant beam unit 251*e*21 and the end portion of the other end of the second compliant beam unit 251*e*21 is greater than a vertical distance between the end portion of one end of the second compliant beam unit 251*e*21 and the end portion of the other end of the second compliant beam unit 251*e*21 in the first direction A. Therefore, when external force is applied to the second compliant beam unit 251*e*21, the deformation of the second compliant beam unit 251*e*21 can be facilitated.

Still referring to FIG. 11 and FIG. 12, the second compliant beam unit 251*e*21 includes: a second compliant beam 251*e*211, a second rigid member 251*e*212, and a second flexible beam 251*e*213.

An end portion of one end of the second compliant beam 251*e*211 is connected to the connecting block 251*e*3. The second compliant beam 251*e*211 is in a shape of a sheet. That is, the second compliant beam 251*e*211 is a sheet-shaped elastic piece structure. The second compliant beam 251*e*211 is disposed in the shape of the sheet, which can facilitate bending elastic deformation of the second compliant beam 251*e*211.

An end portion of one end of the second flexible beam 251*e*213 is connected to the corresponding fixed portion 251*e*4. The second flexible beam 251*e*213 is in a shape of a sheet. That is, the second flexible beam 251*e*213 is a sheet-shaped elastic piece structure. The second flexible beam 251*e*213 is disposed in the shape of the sheet, which can facilitate bending elastic deformation of the second flexible beam 251*e*213.

The second rigid member 251*e*212 is connected between an end portion of the other end of the second compliant beam 251*e*211 and an end portion of the other end of the second flexible beam 251*e*213. Rigidity of the second rigid member 251*e*212 is greater than rigidity of the second compliant beam 251*e*211 and rigidity of the second flexible beam251*e*213. The rigidity of the second rigid member 251*e*212 is greater than the rigidity of the second flexible beam 251*e*213 and greater than the rigidity of the second compliant beam 251*e*211, so as to help to improve rigidity of the entire second compliant beam unit 251*e*21. In this way, it is conducive to improving force required to bend the second compliant beam unit 251*e*21 and improving reliability of the locking of the first swing arm 251*d* by the first multistable flexible mechanism 251*e*. Certainly, this application is not limited thereto. In another example, alternatively, the rigidity of the second rigid member 251*e*212 may be equal to the rigidity of the second compliant beam 251*e*211 and the rigidity of the second flexible beam 251*e*213.

Further, a cross-sectional area of the second rigid member 251*e*212 is greater than a cross-sectional area of the second compliant beam 251*e*211 and greater than a cross-sectional area of the second flexible beam 251*e*213, so that the rigidity of the second rigid member 251*e*212 is greater than the rigidity of the second compliant beam 251*e*211 and greater than the rigidity of the second flexible beam 251*e*213. Exemplarily, the second rigid member 251*e*212, the second compliant beam 251*e*211, and the second flexible beam 251*e*213 are made of a same material, and the cross-sectional area of the second rigid member 251*e*212 is greater than the cross-sectional area of the second compliant beam 251*e*211 and greater than the cross-sectional area of the second flexible beam 251*e*213. Certainly, this application is not limited thereto. In another example, alternatively, the second rigid member 251*e*212 may be made of a material with relatively high rigidity, and the second compliant beam 251*e*211 and the second flexible beam 251*e*213 may be made of a material with relatively low rigidity. In this case, the cross-sectional area of the second rigid member 251*e*212 may be greater than, equal to, or less than the cross-sectional area of the second compliant beam 251*e*211 and the cross-sectional area of the second flexible beam 251*e*213, provided that the rigidity of the second rigid member 251*e*212 is greater than the rigidity of the second compliant beam 251*e*211 and greater than the rigidity of the second flexible beam 251*e*213.

Exemplarily, the second rigid member 251*e*212 is in a shape of a cube, a cylinder, or a triangular prism. The second rigid member 251*e*212 is made of, but not limited to, metal, plastic, or a combination thereof.

The second rigid member 251*e*212 and the second compliant beam 251*e*211 may be connected by gluing, clamping, welding, or screwing. Alternatively, the second rigid member 251*e*212 and the second compliant beam 251*e*211 may be integrally formed. In this way, it is beneficial to simplify a processing technology of the second compliant beam unit 251*e*21 and reduce manufacturing costs of the second compliant beam unit 251*e*21.

The second rigid member 251*e*212 and the second flexible beam 251*e*213 may be connected by gluing, clamping, welding, or screwing. Alternatively, the second rigid member 251*e*212 and the second flexible beam 251*e*213 may be integrally formed. In this way, it is beneficial to simplify the processing technology of the second compliant beam unit 251*e*21 and reduce the manufacturing costs of the second compliant beam unit 251*e*21. Specifically, the second rigid member 251*e*212, the second compliant beam 251*e*211, and the second flexible beam 251*e*213 are integrally formed. In this way, it is beneficial to simplify the processing technology of the second compliant beam unit 251*e*21 and reduce the manufacturing costs of the second compliant beam unit 251*e*21.

The second compliant bistable unit 251*e*2 is different from the first compliant bistable unit 251*e*1. Specifically, at least one of a material, a shape, and a size of the second compliant beam unit 251*e*21 is different from that of the first compliant beam unit 251*e*11. In other words, the material of the second compliant beam unit 251*e*21 may be different from that of the first compliant beam unit 251*e*11, the shape of the second compliant beam unit 251*e*21 may be different from that of the first compliant beam unit 251*e*11, the size of the second compliant beam unit 251*e*21 may be different from that of the first compliant beam unit 251*e*11, any two of the material, the shape, and the size of the second compliant beam unit 251*e*21 may be different from those of the first compliant beam unit 251*e*11, or the material, the shape, and the size of the second compliant beam unit 251*e*21 may all be different from those of the first compliant beam unit 251*e*11. At least one of the material, the shape, and the size of the second compliant beam unit 251*e*21 is different from that of the first compliant beam unit 251*e*11, so that the first multistable flexible mechanism 251*e* can have at least three stable states, to enable the electronic device 100 to switch among the unfolded state, the folded state, and the intermediate hovering state.

Differences between the first compliant beam unit 251*e*11 and the second compliant beam unit 251*e*21 in the first multistable flexible mechanism 251*e* are described below with different embodiments. The following descriptions about size parameters of the first multistable flexible mechanism 251*e* and parallelism or non-parallelism between related components are all descriptions about the first multistable flexible mechanism 251*e* in the first stable state (i.e., the initial state). Herein, the first stable state (i.e., the initial state) is a stable state in the different stable states of the first multistable flexible mechanism 251*e* in which the first compliant beam unit 251*e*11 and the second compliant beam unit 251*e*21 do not deform.

In some embodiments, the first compliant beam 251*e*111 and the second compliant beam 251*e*211 are different in size. In this way, the structure is simple and easy to be implemented, and the first compliant beam unit 251*e*11 and the second compliant beam unit 251*e*21 can have at least different sizes, so that the first multistable flexible mechanism 251*e* can have at least three stable states, to enable the electronic device 100 to switch among the unfolded state, the folded state, and the intermediate hovering state.

Figure 13:
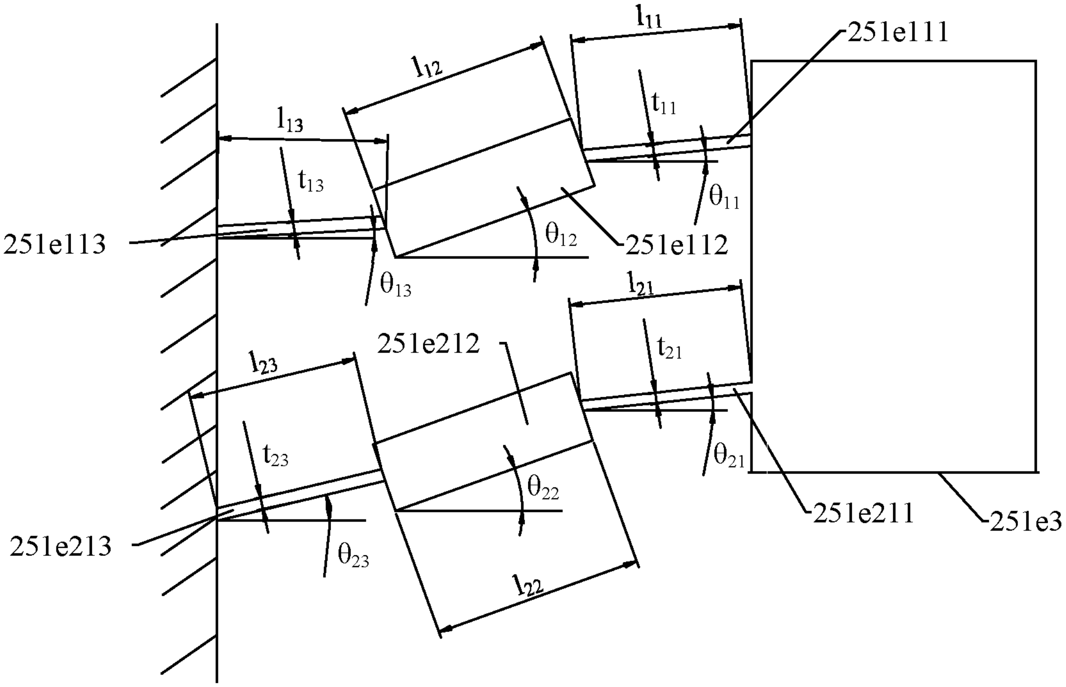
FIG. 13 is a partial schematic diagram of the first multistable flexible mechanism shown in FIG. 8.

In some embodiments in which the first compliant beam 251*e*111 and the second compliant beam 251*e*211 are different in size, referring to FIG. 13, FIG. 13 is a partial schematic diagram of the first multistable flexible mechanism 251*e* shown in FIG. 8. A length dimension $l_{11}$ of the first compliant beam 251*e*111 and a length dimension $l_{21}$ of the second compliant beam 251*e*211 are different. Certainly, it may be understood that, when the second compliant bistable unit 251*e*2 and the first compliant bistable unit 251*e*1 are different in another aspect such as shape, size, or material, the length dimension $l_{11}$ of the first compliant beam 251*e*111 and the length dimension $l_{21}$ of the second compliant beam 251*e*211 may be alternatively the same.

Specifically, the length dimension $l_{11}$ of the first compliant beam 251*e*111 ranges from 5 mm to 30 mm. Exemplarily, the length dimension $l_{11}$ of the first compliant beam 251*e*111 is 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, or 28 mm.

Specifically, the length dimension $l_{21}$ of the second compliant beam 251*e*211 ranges from 5 mm to 30 mm. Exemplarily, the length dimension 121 of the second compliant beam 251*e*211 is 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, or 28 mm.

Specifically, when the length dimension $l_{11}$ of the first compliant beam 251*e*111 and the length dimension $l_{21}$ of the second compliant beam 251*e*211 are different, an absolute value of a difference between the length dimension $l_{11}$ of the first compliant beam 251*e*11 and the length dimension $l_{21}$ of the second compliant beam 251*e*211 ranges from 0.5 mm to 10 mm. Exemplarily, the absolute value of the difference between the length dimension $l_{11}$ of the first compliant beam 251*e*111 and the length dimension 121 of the second compliant beam 251*e*211 is 1 mm, 1.5 mm, 2 mm, 2.5 mm, 3 mm, 3.5 mm, 4 mm, 4.5 mm, 5 mm, 5.5 mm, 6 mm, 6.5 mm, or 7 mm.

In some other embodiments in which the first compliant beam 251*e*111 and the second compliant beam 251*e*211 are different in size, a thickness dimension $t_{11}$ of the first compliant beam 251*e*111 and a thickness dimension $t_{21}$ of the second compliant beam 251*e*211 are different. Certainly, it may be understood that, when the second compliant bistable unit 251*e*2 and the first compliant bistable unit 251*e*1 are different in another aspect such as shape, size, or material, the thickness dimension $t_{11}$ of the first compliant beam 251*e*111 and the thickness dimension $t_{21}$ of the second compliant beam 251*e*211 may be alternatively the same.

Specifically, the thickness dimension $t_1$ of the first compliant beam 251*e*11 ranges from 0.1 mm to 2 mm. Exemplarily, the thickness dimension $t_{11}$ of the first compliant beam 251*e*111 is 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, or 1.9 mm.

Specifically, the thickness dimension $t_{21}$ of the second compliant beam 251*e*211 ranges from 0.1 mm to 2 mm. Exemplarily, the thickness dimension $t_{21}$ of the second compliant beam 251*e*211 is 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, or 1.9 mm.

Specifically, when the thickness dimension $t_{11}$ of the first compliant beam 251*e*111 and the thickness dimension $t_{21}$ of the second compliant beam 251*e*211 are different, an absolute value of a difference between the thickness dimension $t_{11}$ of the first compliant beam 251*e*111 and the thickness dimension $t_{21}$ of the second compliant beam 251*e*211 ranges from 0.1 mm to 1 mm. Exemplarily, the absolute value of the difference between the thickness dimension $t_{11}$ of the first compliant beam 251*e*111 and the thickness dimension $l_{21}$ of the second compliant beam 251*e*211 is 0.2 mm, 0.3 mm, 0.4 mm, 0.5 mm, 0.6 mm, 0.7 mm, 0.8 mm, or 0.9 mm.

In still other embodiments in which the first compliant beam 251*e*111 and the second compliant beam 251*e*211 are different in size, a width dimension of the first compliant beam 251*e*111 and a width dimension of the second compliant beam 251*e*211 are different. Certainly, it may be understood that, when the second compliant bistable unit 251*e*2 and the first compliant bistable unit 251*e*1 are different in another aspect such as shape, size, or material, the width dimension of the first compliant beam 251*e*111 and the width dimension of the second compliant beam 251*e*211 may be alternatively the same.

In some other embodiments, the first flexible beam 251*e*113 and the second flexible beam 251*e*213 are different in size. In this way, the structure is simple and easy to be implemented, and the first compliant beam unit 251*e*11 and the second compliant beam unit 251*e*21 can have at least different sizes, so that the first multistable flexible mechanism 251*e* can have at least three stable states, to enable the electronic device 100 to switch among the unfolded state, the folded state, and the intermediate hovering state.

In some embodiments in which the first flexible beam 251*e*113 and the second flexible beam 251*e*213 are different in size, a length dimension 113 of the first flexible beam 251*e*113 and a length dimension $l_{23}$ of the second flexible beam 251*e*213 are different. Certainly, it may be understood that, when the second compliant bistable unit 251*e*2 and the first compliant bistable unit 251*e*1 are different in another aspect such as shape, size, or material, the length dimension $l_{13}$ of the first flexible beam 251*e*113 and the length dimension $l_{23}$ of the second flexible beam 251*e*213 may be alternatively the same.

Specifically, the length dimension $l_{13}$ of the first flexible beam 251*e*113 ranges from 5 mm to 30 mm. Exemplarily, the length dimension $l_{13}$ of the first flexible beam 251*e*113 is 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, or 28 mm.

To prevent impossible realization of a plurality of stable states caused by impossible simultaneous deformation of the first flexible beam 251*e*113 and the first compliant beam 251*e*111 during the sliding of the connecting block 251*e*3 with the first swing arm 251*d* due to a large difference between the length dimensions of the first flexible beam 251*e*113 and the first compliant beam 251*e*111, the length dimension 113 of the first flexible beam 251*e*113 and the length dimension $l_{11}$ of the first compliant beam 251*e*111 are the same. Certainly, a certain difference between the length dimension $l_{13}$ of the first flexible beam 251*e*113 and the length dimension $l_{11}$ of the first compliant beam 251*e*111 is also allowed. For example, an absolute value of a difference between the length dimensions of the two ranges from 0 to 5 mm. For example, the absolute value of the difference between the length dimensions of the two is 0.5 mm, 1 mm, 1.5 mm, 2.5 mm, 3 mm, 3.5 mm, 4 mm, or 4.5 mm.

Specifically, the length dimension $l_{23}$ of the second flexible beam 251*e*213 ranges from 5 mm to 30 mm. Exemplarily, the length dimension $l_{23}$ of the second flexible beam 251*e*213 is 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, or 28 mm.

To prevent impossible realization of a plurality of stable states caused by impossible simultaneous deformation of the second flexible beam 251*e*213 and the second compliant beam 251*e*211 during the sliding of the connecting block

251e3 with the first swing arm 251d due to a large difference between the length dimensions of the second flexible beam 251e213 and the second compliant beam 251e211, the length dimension $l_{23}$ of the second flexible beam 251e213 and the length dimension $l_{21}$ of the second compliant beam 251e211 are the same. Certainly, a certain difference between the length dimension 123 of the second flexible beam 251e213 and the length dimension 121 of the second compliant beam 251e211 is also allowed. For example, an absolute value of a difference between the length dimensions of the two ranges from 0 to 5 mm. For example, the absolute value of the difference between the length dimensions of the two is 0.5 mm, 1 mm, 1.5 mm, 2.5 mm, 3 mm, 3.5 mm, 4 mm, or 4.5 mm.

Specifically, when the length dimension $l_{13}$ of the first flexible beam 251e113 and the length dimension $l_{23}$ of the second flexible beam 251e213 are different, an absolute value of a difference between the length dimension $l_{13}$ of the first flexible beam 251e113 and the length dimension $l_{23}$ of the second flexible beam 251e213 ranges from 0.5 mm to 10 mm. Exemplarily, the absolute value of the difference between the length dimension 113 of the first flexible beam 251e113 and the length dimension 123 of the second flexible beam 251e213 is 1 mm, 1.5 mm, 2 mm, 2.5 mm, 3 mm, 3.5 mm, 4 mm, 4.5 mm, 5 mm, 5.5 mm, 6 mm, 6.5 mm, or 7 mm.

In some other embodiments in which the first flexible beam 251e113 and the second flexible beam 251e213 are different in size, a thickness dimension $t_{13}$ of the first flexible beam 251e113 and a thickness dimension $t_{23}$ of the second flexible beam 251e213 are different. Certainly, it may be understood that, when the second compliant bistable unit 251e2 and the first compliant bistable unit 251e1 are different in another aspect such as shape, size, or material, the thickness dimension $t_{13}$ of the first flexible beam 251e113 and the thickness dimension $t_{23}$ of the second flexible beam 251e213 may be alternatively the same.

Specifically, the thickness dimension $t_{13}$ of the first flexible beam 251e113 ranges from 0.1 mm to 2 mm. Exemplarily, the thickness dimension $t_{13}$ of the first flexible beam 251e113 is 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, or 1.9 mm.

Specifically, the thickness dimension $t_{13}$ of the first flexible beam 251e113 and the thickness dimension $t_{11}$ of the first compliant beam 251e111 may be the same. In this way, the structure is simple. Certainly, the thickness dimension $t_{13}$ of the first flexible beam 251e113 and the thickness dimension $t_{11}$ of the first compliant beam 251e11 may be different. In this case, an absolute value of a difference between the thickness dimensions of the two ranges from 0.1 mm to 1 mm. Exemplarily, the absolute value of the difference between the thickness dimension $t_{11}$ of the first compliant beam 251e111 and the thickness dimension $t_{13}$ of the first flexible beam 251e113 is 0.2 mm, 0.3 mm, 0.4 mm, 0.5 mm, 0.6 mm, 0.7 mm, 0.8 mm, or 0.9 mm.

Specifically, the thickness dimension $t_{23}$ of the second flexible beam 251e213 ranges from 0.1 mm to 2 mm. Exemplarily, the thickness dimension $t_{23}$ of the second flexible beam 251e213 is 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, or 1.9 mm.

Specifically, the thickness dimension $t_{23}$ of the second flexible beam 251e213 and the thickness dimension $t_{21}$ of the second compliant beam 251e211 may be the same. In this way, the structure is simple. Certainly, the thickness dimension $t_{23}$ of the second flexible beam 251e213 and the thickness dimension $t_{21}$ of the second compliant beam 251e211 may be different. In this case, an absolute value of a difference between the thickness dimensions of the two ranges from 0.1 mm to 1 mm. Exemplarily, the absolute value of the difference between the thickness dimension $t_{23}$ of the second flexible beam 251e213 and the thickness dimension $t_{21}$ of the second compliant beam 251e211 is 0.2 mm, 0.3 mm, 0.4 mm, 0.5 mm, 0.6 mm, 0.7 mm, 0.8 mm, or 0.9 mm.

Specifically, when the thickness dimension $t_{13}$ of the first flexible beam 251e113 and the thickness dimension $t_{23}$ of the second flexible beam 251e213 are different, an absolute value of a difference between the thickness dimension $t_{13}$ of the first flexible beam 251e113 and the thickness dimension $t_{23}$ of the second flexible beam 251e213 ranges from 0.1 mm to 1 mm. Exemplarily, the absolute value of the difference between the thickness dimension $l_{13}$ of the first flexible beam 251e113 and the thickness dimension $t_{23}$ of the second flexible beam 251e213 is 0.2 mm, 0.3 mm, 0.4 mm, 0.5 mm, 0.6 mm, 0.7 mm, 0.8 mm, or 0.9 mm.

In some embodiments, the first compliant beam 251e111 is not parallel to the second compliant beam 251e211. In other words, an angle $\theta_{11}$ between the first compliant beam 251e111 and the first direction A is different from an angle $\theta_{21}$ between the second compliant beam 251e211 and the first direction A. In this way, the second compliant beam unit 251e21 and the first compliant beam unit 251e11 can have different shapes, the structure is simple and easy to be implemented, and the first multistable flexible mechanism 251e can have at least three stable states, to enable the electronic device 100 to switch among the unfolded state, the folded state, and the intermediate hovering state.

Certainly, it may be understood that, in another example, alternatively, the first compliant beam 251e111 and the second compliant beam 251e211 may be parallel.

Specifically, the angle $\theta_{11}$ between the first compliant beam 251e111 and the first direction A ranges from 0 to 45°. Exemplarily, the angle $\theta_{11}$ between the first compliant beam 251e111 and the first direction A is 2°, 5°, 7° 8°, 10°, 14°, 15°, 18°, 20°, 25°, 28°, 30°, 32°, or 35°.

Specifically, the angle $\theta_{21}$ between the second compliant beam 251e211 and the first direction A ranges from 0 to 45°. Exemplarily, the angle $\theta_{21}$ between the first compliant beam 251e111 and the first direction A is 2°, 5°, 7°, 8°, 10°, 14°, 15°, 18°, 20°, 25°, 28°, 30°, 32°, or 35°.

Specifically, an angle between the first compliant beam 251e111 and the second compliant beam 251e211 (i.e., $|\theta_{21}-\theta_{11}|$) ranges from 0 to 35°. Exemplarily, the angle between the first compliant beam 251e111 and the second compliant beam 251e211 (i.e., $|\theta\theta_{21}-\theta_{11}|$) is 2°, 3°, 4°, 5°, 6°, 7°, 8°, 9°, 10°, 14°, 15°, 18°, or 20°.

In still other embodiments, the first flexible beam 251e113 is not parallel to the second flexible beam 251e213. In other words, an angle $\theta_{13}$ between the first flexible beam 251e113 and the first direction A is different from an angle $\theta_{23}$ between the second flexible beam 251e213 and the first direction A. In this way, the second compliant beam unit 251e21 and the first compliant beam unit 251e11 can have different shapes, the structure is simple and easy to be implemented, and the first multistable flexible mechanism 251e can have at least three stable states, to enable the electronic device 100 to switch among the unfolded state, the folded state, and the intermediate hovering state. Certainly, it may be understood that, in another example, alternatively, the first flexible beam 251e113 and the second flexible beam 251e213 may be parallel.

Specifically, the angle θ13 between the first flexible beam 251_e_113 and the first direction A ranges from 0 to 45°. Exemplarily, the angle $\theta_{13}$ between the first flexible beam 251_e_113 and the first direction A is 2°, 5°, 7°, 8°, 10°, 14°, 15°, 18°, 20°, 25°, 28°, 30°, 32°, or 35°.

Specifically, the angle $\theta_{23}$ between the second flexible beam 251_e_213 and the first direction A ranges from 0 to 45°. Exemplarily, the angle $\theta_{23}$ between the first flexible beam 251_e_113 and the first direction Ais 2° 30, 4, 50, 60, 7°, 8°, 10°, 14°, 15°, 18°, 20°, 25°, 28°, 30°, 32°, or 35°.

Specifically, an angle between the first flexible beam 251_e_113 and the second flexible beam 251_e_213 (i.e., $|\theta_{23}-\theta_{13}|$) ranges from 0 to 35°. Exemplarily, the angle between the first flexible beam 251_e_113 and the second flexible beam 251_e_213 (i.e., $|\theta_{23}-\theta_{13}|$) is 2°, 3°, 4°, 5°, 6°, 7°, 8°, 9°, 10°, 14°, 15°, 18°, or 20°.

In still other embodiments, a length $l_{12}$ of the first rigid member 251_e_112 is different from a length of the second rigid member 251_e_2121$_{22}$. In this way, the structure is simple and easy to be implemented, and the first compliant beam unit 251_e_11 and the second compliant beam unit 251_e_21 can have at least different sizes, so that the first multistable flexible mechanism 251_e_ can have at least three stable states, to enable the electronic device 100 to switch among the unfolded state, the folded state, and the intermediate hovering state.

Certainly, it may be understood that the length dimension $l_{12}$ of the first rigid member 251_e_112 and the length dimension $l_{22}$ of the second rigid member 251_e_212 may be alternatively the same.

Specifically, the length dimension $l_{12}$ of the first rigid member 251_e_112 ranges from 5 mm to 30 mm. Exemplarily, the length dimension 112 of the first rigid member 251_e_112 is 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, mm, or 28 mm.

Specifically, the length dimension $l_{22}$ of the second rigid member 251_e_212 ranges from 5 mm to 30 mm. Exemplarily, the length dimension $l_{22}$ of the second rigid member 251_e_212 is 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, mm, or 28 mm.

Specifically, when the length dimension $l_{12}$ of the first rigid member 251_e_112 and the length dimension $l_{22}$ of the second rigid member 251_e_212 are different, an absolute value of a difference between the length dimension $l_{12}$ of the first rigid member 251_e_112 and the length dimension $l_{22}$ of the second rigid member 251_e_212 ranges from 0.5 mm to 10 mm. Exemplarily, the absolute value of the difference between the length dimension $l_{12}$ of the first rigid member 251_e_112 and the length dimension $l_{22}$ of the second rigid member 251_e_212 is 1 mm, 1.5 mm, 2 mm, 2.5 mm, 3 mm, 3.5 mm, 4 mm, 4.5 mm, 5 mm, 5.5 mm, 6 mm, 6.5 mm, or 7 mm.

In still other embodiments, the first rigid member 251_e_112 is not parallel to the second rigid member 251_e_212. In other words, an angle $\theta_{12}$ between the first rigid member 251_e_112 and the first direction A is different from an angle $\theta_{22}$ between the second rigid member 251_e_212 and the first direction A. In this way, the second compliant beam unit 251_e_21 and the first compliant beam unit 251_e_11 can have different shapes, the structure is simple and easy to be implemented, and the first multistable flexible mechanism 251_e_ can have at least three stable states, to enable the electronic device 100 to switch among the unfolded state, the folded state, and the intermediate hovering state. Certainly, it may be understood that, in another example, alternatively, the first rigid member 251_e_112 and the second rigid member 251_e_212 may be parallel.

Specifically, the angle $\theta_{12}$ between the first rigid member 251_e_112 and the first direction A ranges from 0 to 45°. Exemplarily, the angle $\theta_{12}$ between the first rigid member 251_e_112 and the first direction A is 2°, 5°, 7° 8°, 10°, 14°, 15°, 18°, 20°, 25°, 28°, 30°, 32°, or 35°.

Specifically, the angle $\theta_{22}$ between the second rigid member 251_e_212 and the first direction A ranges from 0 to 45°. Exemplarily, the angle $\theta_{22}$ between the first rigid member 251_e_112 and the first direction A is 2°, 5°, 7°, 8°, 10°, 14°, 15°, 18°, 20°, 25°, 28°, 30°, 32°, or 35°.

Specifically, an angle between the first rigid member 251_e_112 and the second rigid member 251_e_212 (i.e., $|\theta_{22}-\theta_{12}|$) ranges from 0 to 35°. Exemplarily, the angle between the first rigid member 251_e_112 and the second rigid member 251_e_212 (i.e., $|\theta_{23}-\theta_{13}|$) is 2°, 3°, 4°, 5°, 6°, 7°, 8°, 9°, 10°, 14°, 15°, 18°, or 20°.

In still other embodiments, the first compliant beam 251_e_111 and the second compliant beam 251_e_211 are made of materials with different rigidity, so that rigidity of the first compliant beam 251_e_111 is different from that of the second compliant beam 251_e_211. The first flexible beam 251_e_113 and the second flexible beam 251_e_213 are made of materials with different rigidity, so that rigidity of the first flexible beam 251_e_113 is different from that of the second flexible beam 251_e_213.

An operating principle of the first multistable flexible mechanism 251_e_ is described below based on a structure of the first multistable flexible mechanism 251_e_.

Figure 14:
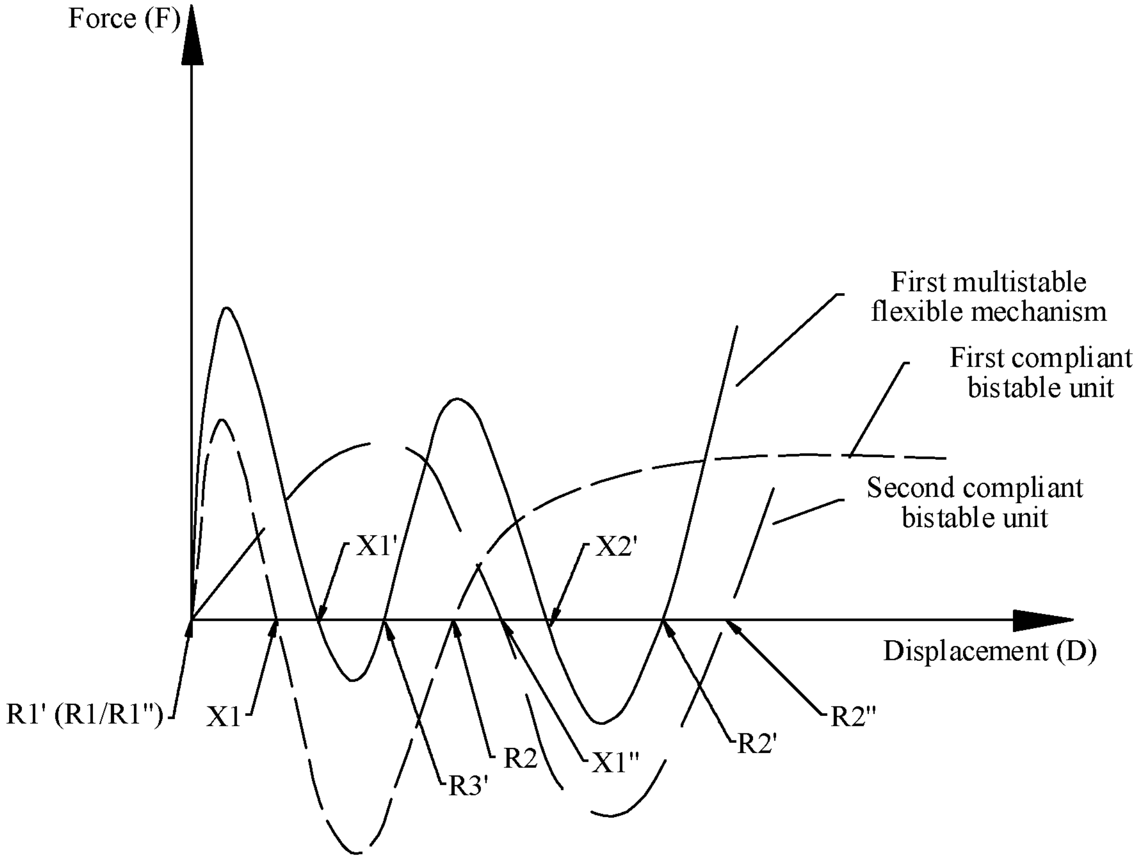
FIG. 14 is a graph of a curve between force on the first multistable flexible mechanism shown in FIG. 8 to FIG. 13 and moving displacement of a connecting block.

Specifically, referring to FIG. 14, FIG. 14 is a graph of a curve between overall force on the first compliant bistable unit 251_e_1 and the second compliant bistable unit 251_e_2 in the first multistable flexible mechanism 251_e_ shown in FIG. 8 to FIG. 13 and moving displacement of a connecting block 251_e_3. A curve between force on the first compliant bistable unit 251_e_1 alone and the moving displacement of the connecting block 251_e_3 and a curve between force on the second compliant bistable unit 251_e_2 alone and the moving displacement of the connecting block 251_e_3 are simultaneously shown in the figure.

As shown in FIG. 14, for the first compliant bistable unit 251_e_1 alone (i.e., the first multistable flexible mechanism 251_e_ does not have the second compliant bistable unit 251_e_2), the first compliant bistable unit 251_e_1 has two stable states, i.e., R1 (i.e., a first stable state) and R2 (i.e., a second stable state), and an unstable state of X1. In this case, the first multistable flexible mechanism 251_e_ is a bistable flexible mechanism.

For the second compliant bistable unit 251_e_2 alone (i.e., the first multistable flexible mechanism 251_e_ does not have the first compliant bistable unit 251_e_1), the second compliant bistable unit 251_e_2 also has two stable states, i.e., R1' (i.e., a first stable state) and R2' (i.e., a second stable state), and an unstable state of X1'. In this case, the first multistable flexible mechanism 251_e_ is a bistable flexible mechanism.

The first compliant beam unit 251_e_11 and the second compliant beam unit 251_e_21 are different in at least one of size, shape, and material. Therefore, as shown in FIG. 14, the curve between the force on the first compliant bistable unit 251_e_1 alone and the moving displacement of the connecting block 251_e_3 and the curve between the force on the second compliant bistable unit 251_e_2 alone and the moving displacement of the connecting block 251_e_3 are different. When the first multistable flexible mechanism 251_e_ has both the first compliant bistable unit 251_e_1 and the second compliant bistable unit 251_e_2, since "the curve between the force on the first compliant bistable unit **251*e*1 alone and the moving displacement of the connecting block 251*e*3 and the curve between the force on the second compliant bistable unit 251*e*2 alone and the moving displacement of the connecting block 251*e*3 are different", a curve between force on the first multistable flexible mechanism 251*e* and the moving displacement of the connecting block 251*e*3 is obtained from superposition of mechanical properties of the first compliant bistable unit 251*e*1 and the second compliant bistable unit 251*e*2. As shown in FIG. 14, due to the superposition of the mechanical properties of the first compliant bistable unit 251*e*1 and the second compliant bistable unit 251*e*2, the first multistable flexible mechanism 251*e*** has three stable states of R1' (i.e., a first stable state), R2' (i.e., a second stable state), and R3' (i.e., a third stable state), and two unstable states of X1' and X2'.

Figure 15:
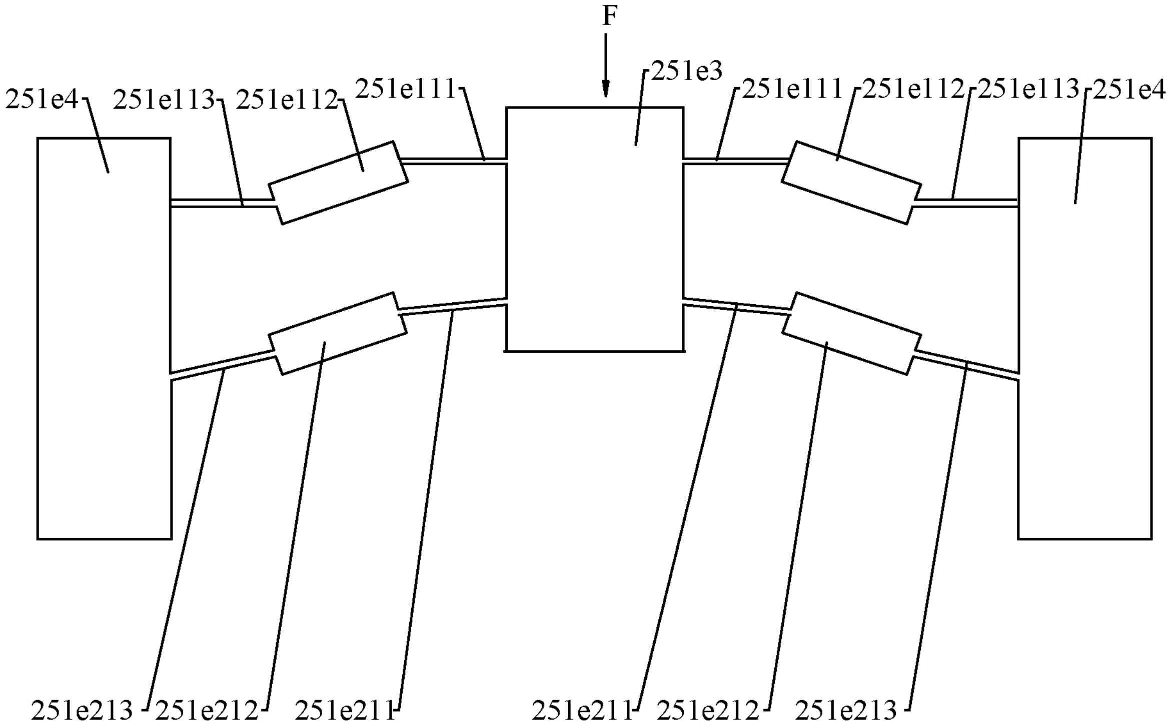
FIG. 15 is a schematic diagram of the first multistable flexible mechanism shown in FIG. 8 to FIG. 13 in a first stable state.
Figure 16:
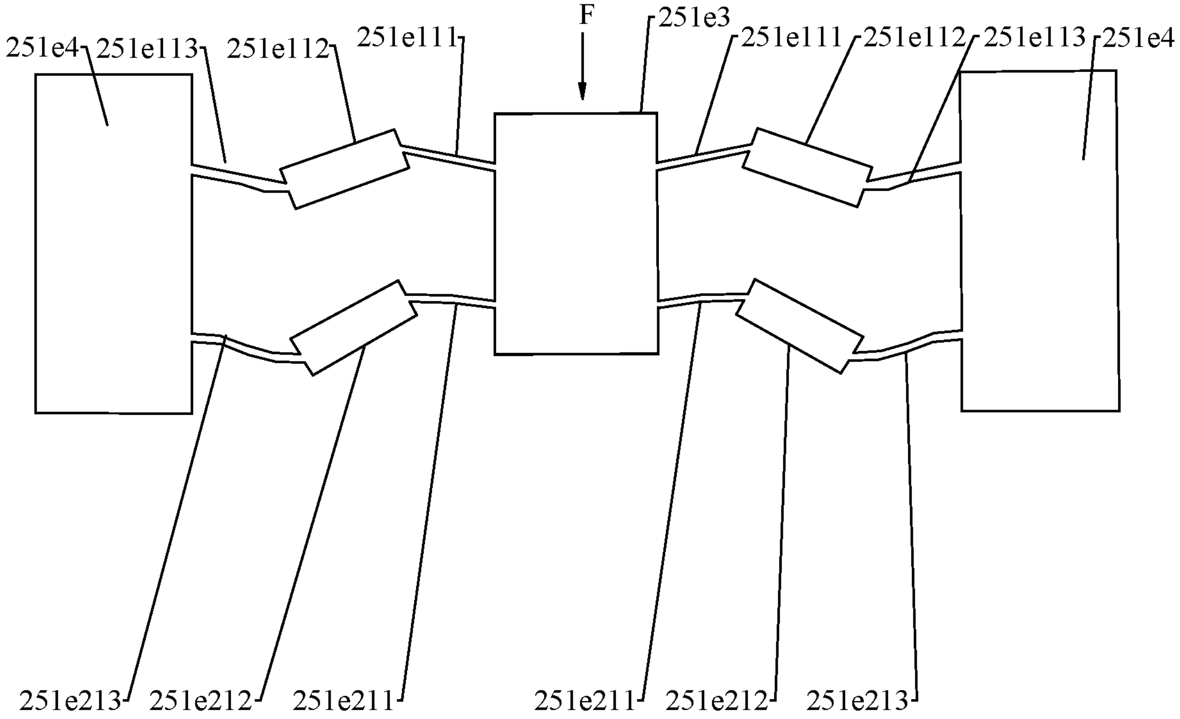
FIG. 16 is a schematic diagram of the first multistable flexible mechanism shown in FIG. 8 to FIG. 13 in a third stable state.
Figure 17:
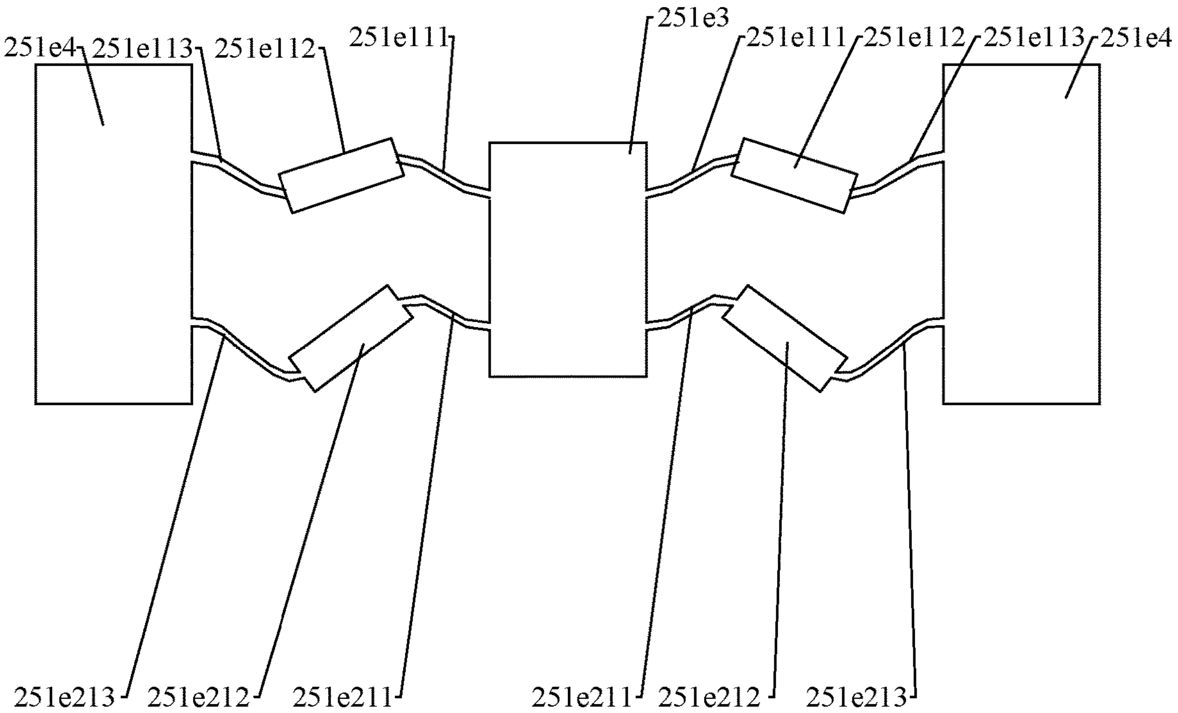
FIG. 17 is a schematic diagram of the first multistable flexible mechanism shown in FIG. 8 to FIG. 13 in a second stable state.

Specifically, referring to FIG. 15 to FIG. 17, FIG. 15 is a schematic diagram of the first multistable flexible mechanism **251*e* shown in FIG. 8 to FIG. 13 in a first stable state. FIG. 17 is a schematic diagram of the first multistable flexible mechanism 251*e* shown in FIG. 8 to FIG. 13 in a second stable state. As shown in FIG. 15, the first multistable flexible mechanism 251*e* is in the first stable state. In this case, the first compliant bistable unit 251*e*1 and the second compliant bistable unit 251*e*2 are in a convex shape as a whole, and the two do not deform. When the force exerted by the user on the first housing 21 causes the first connecting plate 251*a* to rotate with respect to the base 24 to move from the unfolded state to the folded state, as shown in FIG. 16, movement of the connecting block 251*e*3 along an arrow F may drive the first compliant beam 251*e*111, the first flexible beam 251*e*113, the second compliant beam 251*e*211, and the second flexible beam 251*e*213 to deform and drive the first rigid member 251*e*112 and the second rigid member 251*e*212 to rotate, so as to cause the first compliant bistable unit 251*e*1 and the second compliant bistable unit 251*e*2 to deform. Before the connecting block 251*e*3 moves from the first stable state R1' to the unstable state X1' with the highest energy, the entire first multistable flexible mechanism 251*e* continuously stores deformation energy. When the connecting block 251*e*3 moves over the unstable state X1' with the highest energy to the third stable state R3', the first multistable flexible mechanism 251*e* may automatically release the stored deformation energy and output force to push the connecting block 251*e*3 to continue moving until the third stable state R3' (the state as shown in FIG. 16) is reached, so as to be in the intermediate hovering state of the electronic device 100**.

When the force exerted by the user on the first housing 21 continuously causes the first connecting plate **251*a* to rotate with respect to the base 24 to move from the intermediate hovering state to the unfolded state, as shown in FIG. 17, the connecting block 251*e*3 continuously moves along the arrow F and may drive the first compliant beam 251*e*111, the first flexible beam 251*e*113, the second compliant beam 251*e*211, and the second flexible beam 251*e*213 to further deform and drive the first rigid member 251*e*112 and the second rigid member 251*e*212 to further rotate, so as to cause the first compliant bistable unit 251*e*1 and the second compliant bistable unit 251*e*2 to continuously deform. Before the connecting block 251*e*3 moves from the third stable state R3' to the unstable state X2' with the highest energy, the entire first multistable flexible mechanism 251*e* continuously stores deformation energy again. When the connecting block 251*e*3 moves over the unstable state X2' with the highest energy to the second stable state R2', the first multistable flexible mechanism 251*e* may automatically release the stored deformation energy and output force to push the connecting block 251*e*3 to continue moving (in this process, even if the user does not exert force on the first housing 21, the first multistable flexible mechanism 251*e* may also spontaneously push the connecting block 251*e*3 to continue moving under the stored deformation energy) until the second stable state R2' (the state as shown in FIG. 17) is reached, so as to be in the folded state of the electronic device 100**. It may be understood that the motion process from the folded state to the unfolded state is opposite to the above motion process. Details are not described in detail herein.

Based on the above, in this embodiment of this application, the first compliant bistable unit **251*e*1 and the second compliant bistable unit 251*e*2 are designed to be different in at least one of material, size, and shape, so that the first compliant bistable unit 251*e*1 and the second compliant bistable unit 251*e*2 correspond to different force-displacement curves, and the first multistable flexible mechanism 251*e* can have at least three stable states, to enable the electronic device 100** to switch among the unfolded state, the folded state, and the intermediate hovering state.

In the rotary mechanism 23 according to this embodiment of this application, the first multistable flexible mechanism **251*e* including the first compliant bistable unit 251*e*1 and the second compliant bistable unit 251*e*2 is provided, and the first compliant bistable unit 251*e*1 and the second compliant bistable unit 251*e*2 are designed to be different in at least one of material, size, and shape. In this way, the first multistable flexible mechanism 251*e* can have at least three stable states, so as to realize folding, unfolding, and the intermediate hovering state between the folded state and the unfolded state of the electronic device 100. Moreover, the entire first multistable flexible mechanism 251*e* has advantages such as fewer parts, a simple structure, easy assembly, high reliability, no friction and no wear, being conducive to realization of integrated arrangement of the first multistable flexible mechanism 251*e* and the first connecting plate 251*a*, and overall flattening of the first multistable flexible mechanism 251*e* and the first connecting plate 251*a*, which can facilitate the connection between the first multistable flexible mechanism 251*e* and the first connecting plate 251*a* as a whole and the first swing arm 251*d*, simplify the structure of the rotary mechanism 23, and facilitate the thin design of the electronic device 100**.

It may be understood that, when there are a plurality of intermediate hovering states, a variety of different compliant bistable units between the fixed portion **251*e*4 and the connecting block 251*e*3*z* are superposed or a plurality of compliant bistable units form different structural layouts, provided that folding, unfolding, and intermediate hovering of the rotary mechanism 23** are realized by using a multistable flexible mechanism, both of which fall within the scope of protection of this application.

Figure 18:
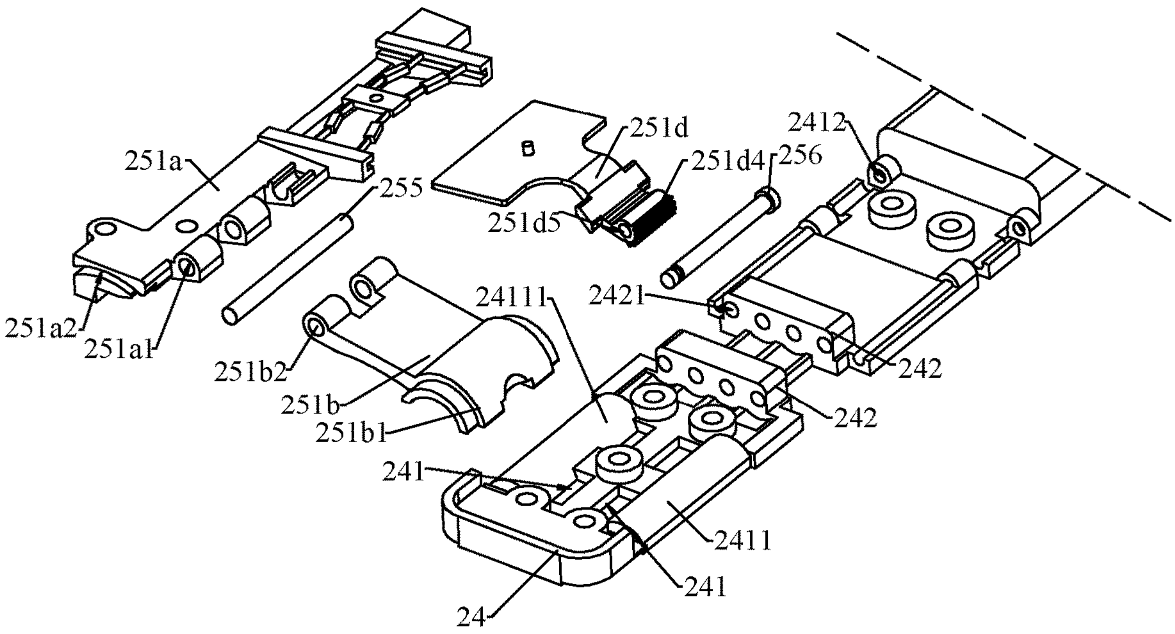
FIG. 18 is a schematic exploded view of a partial structure of the rotary mechanism shown in FIG. 8, in which the rotary mechanism is in the unfolded state.

On the basis of the above embodiment, referring to FIG. 18, FIG. 18 is a schematic exploded view of a partial structure of the rotary mechanism 23 shown in FIG. 8, in which the rotary mechanism 23 is in the unfolded state. The base 24 is provided with a first hinge hole 241 running through the base 24 in a thickness direction of the base 24. An inner wall of the first hinge hole 241 is provided with a first rib 2411. A side surface of the first rib 2411 forms a part of the above supporting surface M4, and a side surface of the first rib 2411 away from the supporting surface M4 forms a first arc surface 24111. An extension path of the first arc surface 24111 may be a major arc (that is, an arc with a central angle greater than 180°), a minor arc (that is, an arc with a central angle less than 180°), or a semi-circular arc (that is, an arc with a central angle equal to 180°), which is not specifically limited herein. In the embodiment shown in FIG. 18, the extension path of the first arc surface 24111 is a minor arc.

The first connector 251*b* is provided with a first arc-shaped rib 251*b*1. An extension path of the first arc-shaped rib 251*b*1 may be a major arc (that is, an arc with a central angle greater than 180°), a minor arc (that is, an arc with a central angle less than 180°), or a semi-circular arc (that is, an arc with a central angle equal to 180°), which is not specifically limited herein. In the embodiment shown in FIG. 18, the extension path of the first arc-shaped rib 251*b*1 is a minor arc. The first arc-shaped rib 251*b*1 may fit and be accommodated in the first hinge hole 241, cooperate with the first arc surface 24111, and can rotate around a center line of the first arc surface 24111 in the first hinge hole 241. Therefore, hinging of the first connector 251*b* to the base 24 is realized. This structure is simple and easy to be implemented.

Still referring to FIG. 18, the first connector 251*b* is further provided with a first shaft hole 251*b*2. The first connecting plate 251*a* is provided with a second shaft hole 251*al*. The rotary assembly 25 further includes a first rotary shaft 255. The first rotary shaft 255 is disposed through the second shaft hole 251*al* and the first shaft hole 251*b*2. Therefore, a rotational connection between the first connecting plate 251*a* and the first connector 251*b* is realized.

Still referring to FIG. 18, the base 24 is provided with a positioning block 242. The positioning block 242 is provided with a first pivot hole 2421, and the first swing arm 251*d* is provided with a second pivot hole 251*d*5. The rotary assembly 25 further includes a first pivot shaft 256. The first pivot shaft 256 is disposed through the first pivot hole 2421 and the second pivot hole 251*d*5, so as to realize a rotatable connection between the first swing arm 251*d* and the base 24.

On the basis of the above embodiment, referring back to FIG. 8 and FIG. 9, the first door panel 26 is hinged to the first connecting plate 251*a*. Moreover, the first connecting plate 251*a* is located on one side of the first door panel 26 away from the supporting surface M5. The first hinge 251*c* and the first connecting plate 251*a* are located on a same side of the base 24. Moreover, the first hinge 251*c* is hinged to one side of the base 24. Besides, when the rotary mechanism 23 switches between the unfolded state and the folded state, the first door panel 26 and the first hinge 251*c* are slidable with respect to each other in a direction perpendicular to the first direction A.

In this way, the first connecting plate 251*a*, the first connector 251*b*, the first door panel 26, the first hinge 251*c*, and the base 24 can constitute a slider-crank mechanism. The force exerted by the user on the first housing 21 may act on the first connecting plate 251*a*, and when the force acting on the first connecting plate 251*a* causes the first connecting plate 251*a* to rotate with respect to the base 24, the first door panel 26 may be driven to rotate with respect to the base 24 under mechanical linkage of the first connecting plate 251*a*, the first connector 251*b*, the first hinge 251*c*, and the like. In addition, due to the sliding fit between the first door panel 26 and the first hinge 251*c*, when the first connecting plate 251*a* drives the first door panel 26 to rotate, the first door panel 26 can slide with respect to the base 24 in a direction perpendicular to the first direction A, thereby driving one end of the first door panel 26 near the base 24 to move in a direction away from the base 24 or close to the base 24. It may be understood that, in another example, alternatively, the rotary assembly 25 may not include the first connector 251*b* and the first hinge 251*c*, provided that the first door 26 can slide with respect to the base 24 in the direction perpendicular to the first direction A when the first connecting plate 251*a* drives the first door panel 26 to rotate. Moreover, since there is a connection relationship between the first door panel 26 and the first connecting plate 251*a* as well as between the first swing arm 251*d* and the first connecting plate 251*a*, linkage between various components can be realized when external force is applied to the first connecting plate 251*a*.

Figure 19:
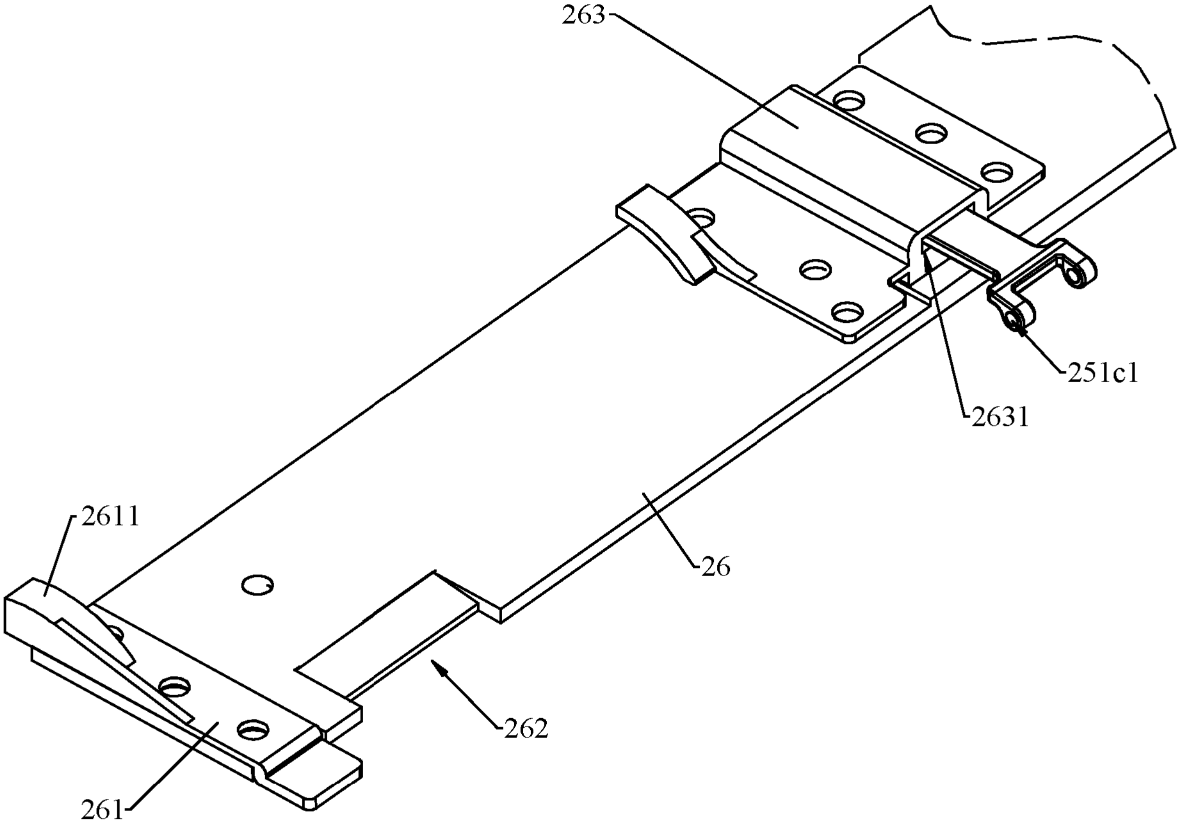
FIG. 19 is a schematic diagram of a partial structure of a first door panel in the rotary mechanism shown in FIG. 8.

Still referring to FIG. 18, an end surface of one end of the first connecting plate 251*a* along the first direction A is provided with a first arc-shaped slot 251*a*2. A center line of the first arc-shaped slot 251*a*2 extends along the first direction A. Still referring to FIG. 19, FIG. 19 is a schematic diagram of a partial structure of the first door panel 26 in the rotary mechanism 23 shown in FIG. 8. An end portion of the first door panel 26 along the first direction A is provided with a connecting portion 261. Specifically, the connecting portion 261 may be fixed to the first door panel 26 in a manner such as threaded connection, riveting, or bonding, or may be integrally formed with the first door panel 26. The connecting portion 261 is provided with a second arc-shaped rib 2611. An extension path of the second arc-shaped rib 2611 may be a major arc (that is, an arc with a central angle greater than 180°), a minor arc (that is, an arc with a central angle less than 180°), or a semi-circular arc (that is, an arc with a central angle equal to 180°), which is not specifically limited herein. In the embodiment shown in FIG. 19, the extension path of the second arc-shaped rib 2611 is a minor arc. The second arc-shaped rib 2611 may fit and be accommodated in the first arc-shaped slot 251*a*2, and can rotate around a center line of the first arc-shaped slot 251*a*2. Therefore, a hinged connection between the first door panel 26 and the first connecting plate 251*a* is realized.

Still referring to FIG. 19, the first door panel 26 is provided with an avoidance notch 262. The avoidance notch 262 is configured to avoid the first connector 251*b*, thereby preventing interference of rotation of the first connector 251*b* with rotation of the first door panel 26, and improving reliability of operation of the rotary mechanism 23.

Figure 20:
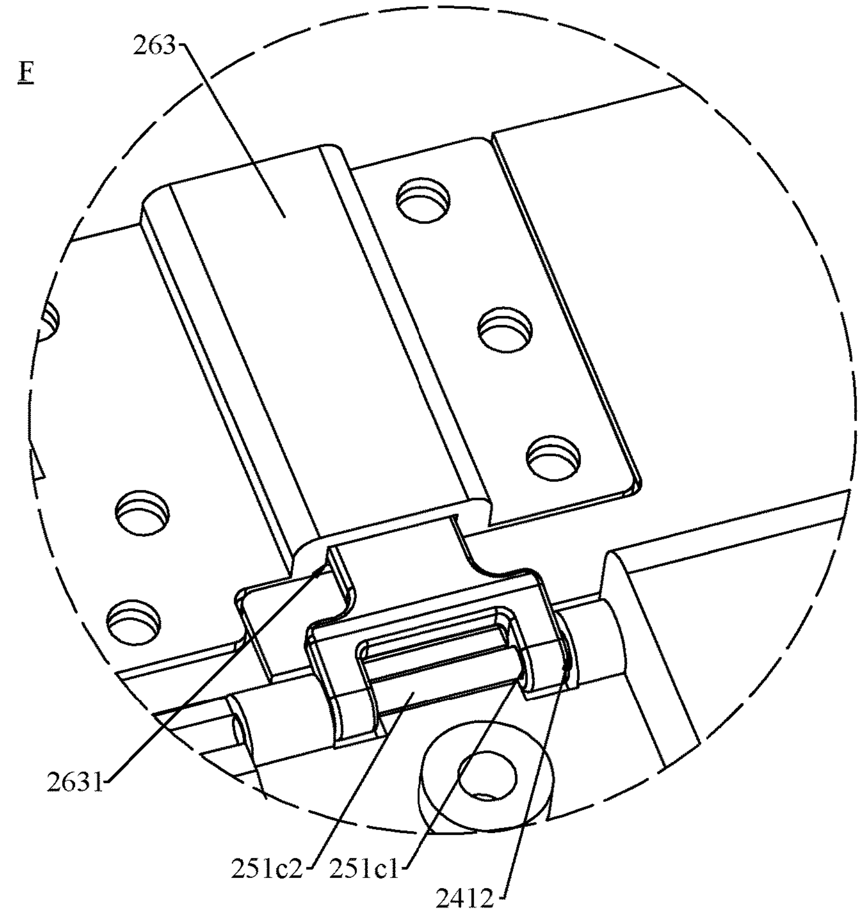
FIG. 20 is an enlarged view of a part circled at F according to the rotary mechanism shown in FIG. 9.

Still referring to FIG. 19 and FIG. 20, FIG. 20 is an enlarged view of a part circled at F according to the rotary mechanism 23 shown in FIG. 9. A sliding block 263 is fixed to a side surface of the first door panel 26 away from the supporting surface M5 of the first door panel 26. A sliding groove 2631 is formed on the sliding block 263. The first hinge 251*c* is inserted into the sliding groove 2631, so as to be in sliding fit with the first door panel 26.

Still referring to FIG. 20, the base 24 is provided with a third shaft hole 2412, and a center line of the third shaft hole 2412 is parallel to that of the first arc-shaped rib 251*bl*. An end portion of the first hinge 251*c* away from the first door panel 26 has a fourth shaft hole 251*c*1, and the rotary mechanism 23 further includes a second pivot shaft 251*c*2. The second pivot shaft 251*c*2 is disposed through the third shaft hole 2412 and the fourth shaft hole 251*c*1. In this way, the hinging of the first hinge 251*c* to the base 24 can be realized. Therefore, the implementation is simple and easy to be implemented, and manufacturing costs are low.

On the basis of the above embodiments, referring back to FIG. 8 to FIG. 10 again, the second connecting plate 252*a* is fixed to the second housing 22. Specifically, the second connecting plate 252*a* is fixed to the second intermediate frame 221. Exemplarily, the second connecting plate 252*a* may be fixed to the second intermediate frame 221 in a manner such as threaded connection, riveting, or bonding, or may be integrally formed with the second intermediate frame 221.

The second connecting plate 252*a* is hinged to the other side of the base 24 (e.g., the other side in the width direction). Specifically, the second connecting plate 252*a* is hinged to the other side of the base 24 by using the second connector 252*b*. In other words, one end of the second connector 252*b* is hinged to the other side of the base 24. The second connector 252*b* extends along the first direction A with respect to a hinge axis of the base 24. The second connecting plate 252*a* is hinged to the other end of the second connector 252*b*, and the second connecting plate 252*a* extends along the first direction A with respect to a hinge axis of the second connector 252*b*.

The second swing arm 252*d* and the second connecting plate 252*a* are located on a same side of the base 24. Moreover, the second swing arm 252*d* is hinged to the other side of the base 24. The second swing arm 252*d* extends along the first direction A with respect to the hinge axis of the base 24. The second swing arm 252*d* and the second connecting plate 252*a* are spaced apart in the first direction A. When the rotary mechanism 23 switches between the unfolded state and the folded state, the second swing arm 252*d* is slidable with respect to the second connecting plate 252*a* in a direction perpendicular to the first direction A.

The second swing arm 252*d*, when sliding with respect to the second connecting plate 252*a* in the direction perpendicular to the first direction A, may slide to a first lock position of the second swing arm 252*d* with respect to the second connecting plate 252*a* and a second lock position of the second swing arm 252*d* with respect to the second connecting plate 252*a*. When the second swing arm 252*d* slides to the first lock position with respect to the second connecting plate 252*a*, the rotary mechanism 23 is in the unfolded state. When the second swing arm 252*d* slides to the second lock position with respect to the second connecting plate 252*a*, the rotary mechanism 23 is in the folded state.

The second multistable flexible mechanism 252*e* is disposed on the second connecting plate 252*a*. Moreover, the second multistable flexible mechanism 252*e* has a first stable state and a second stable state. The second multistable flexible mechanism 252*e* cooperates with the second swing arm 252*d*, and the second multistable flexible mechanism 252*e* switches between the first stable state and the second stable state as the second swing arm 252*d* slides with respect to the second connecting plate 252*a*.

In the folded state of the rotary mechanism 23, the second multistable flexible mechanism 252*e* is in the second stable state, so as to lock the second swing arm 252*d* at the second lock position. In the unfolded state of the rotary mechanism 23, the second multistable flexible mechanism 252*e* is in the first stable state (the state as shown in FIG. 9), so as to lock the second swing arm 252*d* at the first lock position. In other words, in the folded state of the rotary mechanism 23, the second multistable flexible mechanism 252*e* can restrict the sliding of the second swing arm 252*d* with respect to the second connecting plate 252*a*, so as to lock the second swing arm 252*d* at the second lock position. In the unfolded state of the rotary mechanism 23, the second multistable flexible mechanism 252*e* can also restrict the sliding of the second swing arm 252*d* with respect to the second connecting plate 252*a*, so as to lock the second swing arm 252*d* at the first lock position.

In this way, when the second multistable flexible mechanism 252*e* locks the second swing arm 252*d* at the second lock position and no external force is exerted by the user, the second swing arm 252*d* no longer slides along the second connecting plate 252*a*, so that the rotary mechanism 23 can be maintained in the current folded state. When the second multistable flexible mechanism 252*e* locks the second swing arm 252*d* at the first lock position and no external force is exerted by the user, the second swing arm 252*d* no longer slides along the second connecting plate 252*a*, so that the rotary mechanism 23 can be maintained in the current unfolded state. Specifically, structural forms, assembly, and motion manners of the second connecting plate 252*a*, the second connector 252*b*, the second swing arm 252*d*, and the second multistable flexible mechanism 252*e* are respectively the same as those of the first connecting plate 251*a*, the first connector 251*b*, the first swing arm 251*d*, and the first multistable flexible mechanism 251*e*. Details are not described herein.

Still referring to FIG. 9 to FIG. 10, the second hinge 252*c* is hinged to the other side of the base 24. The second door panel 27 is hinged to the second connecting plate 252*a*. Moreover, the second connecting plate 252*a* is located on one side of the second door panel 27 away from the supporting surface M6. When the rotary mechanism 23 switches between the unfolded state and the folded state, the second door panel 27 and the second hinge 252*c* are slidable with respect to each other in a direction perpendicular to the first direction A. In this way, the base 24, the second connecting plate 252*a*, the second hinge 252*c*, the second connector 252*b*, and the second door panel 27 may also constitute a crank-slider mechanism. That is, when external force acts on the second connecting plate 252*a* to cause the second connecting plate 252*a* to rotate with respect to the base 24, the second door panel 27 may also be driven to rotate under mechanical linkage of the second connecting plate 252*a*, the second connector 252*b*, the second hinge 252*c*, and the like. Specifically, in this application, structural forms, assembly, and motion manners of the second hinge 252*c* and the second door panel 27 are respectively the same as those of the first hinge 251*c* and the first door panel 26. Details are not described herein.

Figure 21:
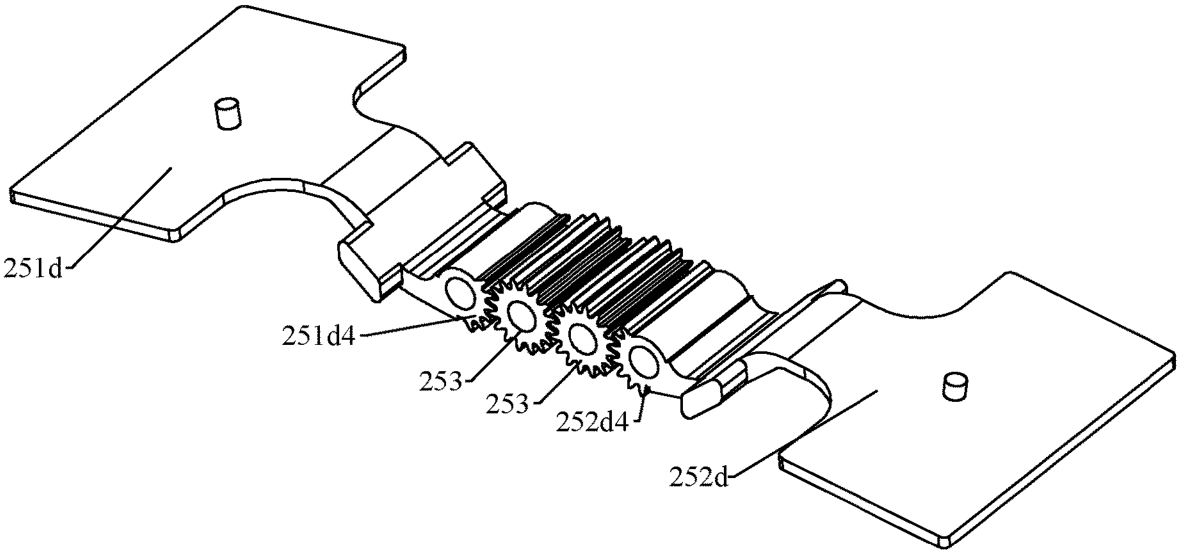
FIG. 21 is a schematic diagram of cooperation among a first swing arm, a second swing arm, and two third gears in the rotary mechanism shown in FIG. 8.

On this basis, referring to FIG. 21, FIG. 21 is a schematic diagram of cooperation among the first swing arm 251*d*, the second swing arm 252*d*, and two third gears 253 in the rotary mechanism 23 shown in FIG. 8. To realize the linkage between the first housing 21 and the second housing 22, an end portion of one end of the first swing arm 251*d* adjacent to the base 24 is configured as a first gear 251*d*4, and an end portion of one end of the second swing arm 252*d* adjacent to the base 24 is configured as a second gear 252*d*4. The first gear 251*d*4 and the second gear 252*d*4 are in meshed cooperation.

Specifically, since the first swing arm 251*d* and the second swing arm 252*d* are located on opposite sides of the base 24, in order not to affect the cooperation between the first swing arm 251*d* and the first multistable flexible mechanism 251*e* on the first connecting plate 251*a* and the cooperation between the second swing arm 252*d* and the second multistable flexible mechanism 252*e*, the first gear 251*d*4 and the second gear 252*d*4 are spaced apart, and two third gears 253 in meshed cooperation are provided between the first gear 251*d*4 and the second gear 252*d*4. The first gear 251*d*4 and the second gear 252*d*4 are in meshed cooperation through the two third gears 253, so as to realize linkage between the first swing arm 251*d* and the second swing arm 252*d*. In this way, when the user exerts force on one of the first housing 21 and the second housing 22, the two housings can be driven to simultaneously move. Each of the third gears 253 is rotatably fixed to the base 24. The third gear 253 and the base 24 cooperate in a same manner as the first swing arm 251*d* and the base 24 cooperate.

The structure of the first multistable flexible mechanism 251*e* provided in other embodiments is described below.

Figure 22:
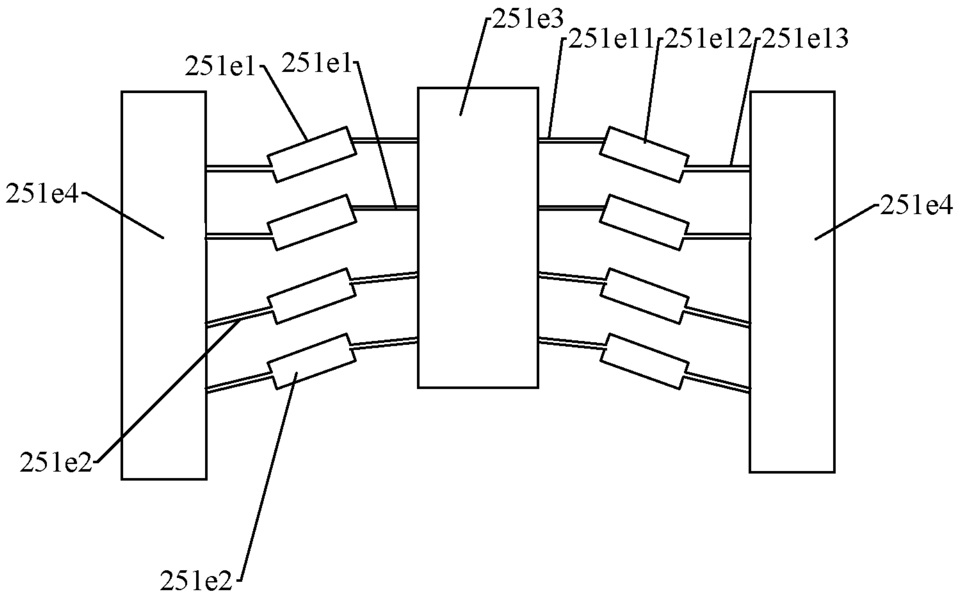
FIG. 22 is a schematic diagram of a second first multistable flexible mechanism according to an embodiment of this application.

Referring to FIG. 22, FIG. 22 is a schematic diagram of a second first multistable flexible mechanism 251*e* according to an embodiment of this application. The first multistable flexible mechanism 251*e* shown in FIG. 22 is different from the first multistable flexible mechanism 251*e* shown in FIG. 8 to FIG. 18 in that: there are a plurality of first compliant bistable units 251*e*1 and a plurality of second compliant bistable units 251*e*2. Moreover, a quantity of the first compliant bistable units 251*e*1 and a quantity of the second compliant bistable units 251*e*2 may be the same or different.

"A plurality of" means two or more. Exemplarily, there are two first compliant bistable units 251*e*1 and two second compliant bistable units 251*e*2. Certainly, it may be understood that, in another example, there may be a plurality of first compliant bistable units 251*e*1 and a second compliant bistable unit 251*e*2, or there may be a first compliant bistable unit 251*e*1 and a plurality of second compliant bistable units 251*e*2, provided that there are a plurality of at least one of the first compliant bistable unit 251*e*1 and the second compliant bistable unit 251*e*2.

In the rotary mechanism 23 according to this embodiment of this application, a plurality of first compliant bistable units 251*e*1 and a plurality of second compliant bistable units 251*e*2 are provided, which is conducive to multiplying driving force used for driving the first swing arm 251*d* to slide, so that the connecting block 251*e*3 can stably move, improving damping feel of the rotary mechanism 23.

Figure 23:
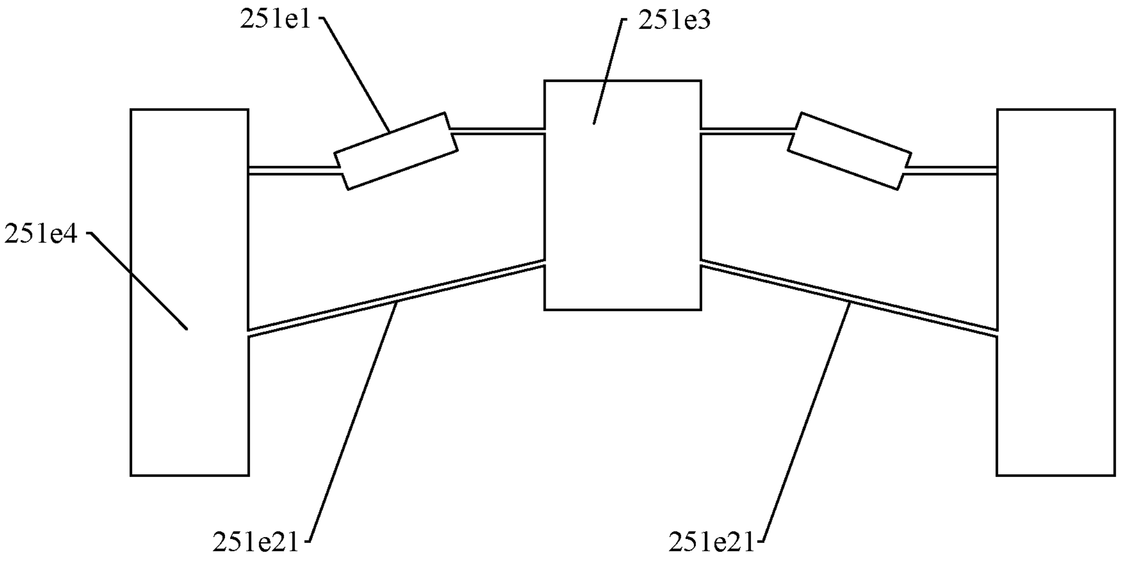
FIG. 23 is a schematic diagram of a third first multistable flexible mechanism according to an embodiment of this application.

Referring to FIG. 23, FIG. 23 is a schematic diagram of a third first multistable flexible mechanism 251*e* according to an embodiment of this application. The first multistable flexible mechanism 251*e* shown in FIG. 23 is different from the first multistable flexible mechanism 251*e* shown in FIG. 8 to FIG. 18 in that: the second compliant beam unit 251*e*21 is in a shape of a sheet with an equal cross-sectional area everywhere. That is, the second compliant beam unit 251*e*21 is a sheet-shaped elastic piece structure with an equal cross-sectional area everywhere. Exemplarily, rigidity of the second compliant beam unit 251*e*21 is equal everywhere. Therefore, the second compliant beam unit 251*e*21 has a simple structure and is easy to be machined and manufactured. Moreover, a shape of the second compliant beam unit 251*e*21 is different from that of the first compliant beam unit 251*e*11. In this way, the entire first multistable flexible mechanism 251*e* can have at least three stable states, so that folding, unfolding, and the intermediate hovering state between the folded state and the unfolded state of the electronic device 100 can be realized. The entire structure is simple, frictionless, and highly reliable.

Figure 24:
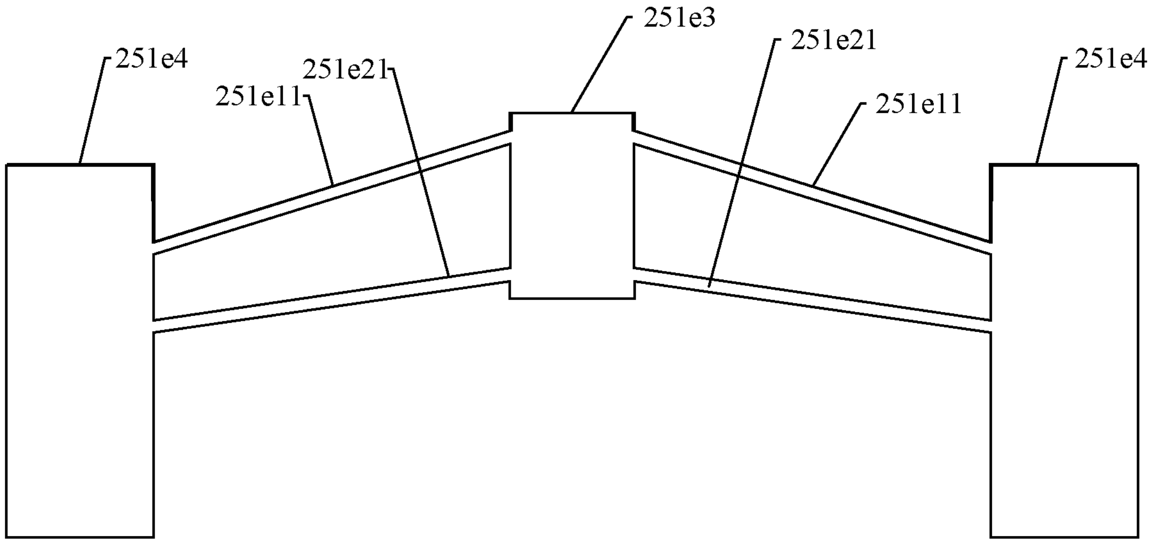
FIG. 24 is a schematic diagram of a fourth first multistable flexible mechanism according to an embodiment of this application.

Referring to FIG. 24, FIG. 24 is a schematic diagram of a fourth first multistable flexible mechanism 251*e* according to an embodiment of this application. The first multistable flexible mechanism 251*e* shown in FIG. 24 is different from the first multistable flexible mechanism 251*e* shown in FIG. 8 to FIG. 18 in that: the first compliant beam unit 251*e*11 is in a shape of a sheet with an equal cross-sectional area everywhere. That is, the first compliant beam unit 251*e*11 is a sheet-shaped elastic piece structure with an equal cross-sectional area everywhere. That is, the second compliant beam unit 251*e*21 is a sheet-shaped elastic piece structure with an equal cross-sectional area everywhere. Exemplarily, rigidity of the first compliant beam unit 251*e*11 is equal everywhere. Therefore, the first compliant beam unit 251*e*11 has a simple structure and is easy to be machined and manufactured. The second compliant beam unit 251*e*21 is in a shape of a sheet with an equal cross-sectional area everywhere. That is, the second compliant beam unit 251*e*21 is a sheet-shaped elastic piece structure with an equal cross-sectional area everywhere. Exemplarily, rigidity of the second compliant beam unit 251*e*21 is equal everywhere. Therefore, the second compliant beam unit 251*e*21 has a simple structure and is easy to be machined and manufactured.

Specifically, a length dimension of the second compliant beam unit 251*e*21 is different from that of the first compliant beam unit 251*e*11. In this way, when the second compliant beam unit 251*e*21 and the first compliant beam unit 251*e*11 are connected to the connecting block 251*e*3 and the fixed portion 251*e*4 respectively, non-parallel arrangement of the two can be realized. In this way, the entire first multistable flexible mechanism 251*e* has at least three stable states, so that folding, unfolding, and intermediate hovering between the folded state and the unfolded state of the electronic device 100 can be realized. The entire structure is simple, frictionless, and highly reliable.

Figure 25:
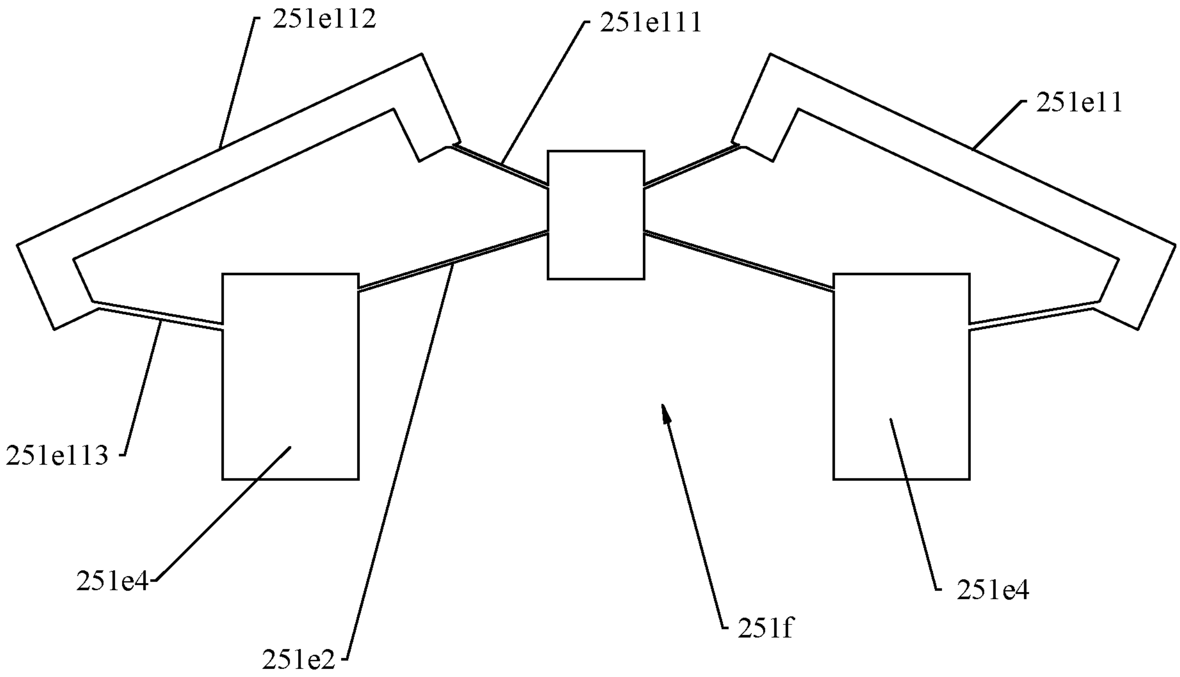
FIG. 25 is a schematic diagram of a fifth first multistable flexible mechanism according to an embodiment of this application.

Referring to FIG. 25, FIG. 25 is a schematic diagram of a fifth first multistable flexible mechanism 251*e* according to an embodiment of this application. The first multistable flexible mechanism 251*e* shown in FIG. 25 is different from the first multistable flexible mechanism 251*e* shown in FIG. 8 to FIG. 18 in that: part of the first multistable flexible mechanism 251*e* is located in the sliding space 251*f*. Specifically, the first rigid member 251*e*112 of each of the first compliant beam units 251*e*11 is located on one side of the corresponding fixed portion 251*e*4 along a moving direction of the connecting block 251*e*3. The first flexible beam 251*e*113 of each of the first compliant beam units 251*e*11 is located on one side of the corresponding fixed portion 251*e*4 away from the other fixed portion 251*e*4, and is connected to the corresponding fixed portion 251*e*4. Moreover, the first rigid member 251*e*112 is U-shaped.

The second compliant beam unit 251*e*21 is in a shape of a sheet with an equal cross-sectional area everywhere. Therefore, the rigidity of the second compliant beam unit 251*e*21 is equal everywhere. Therefore, the second compliant beam unit 251*e*21 has a simple structure and is easy to be machined and manufactured.

Moreover, a shape of the second compliant beam unit 251*e*21 is different from that of the first compliant beam unit 251*e*11. In this way, the entire first multistable flexible mechanism 251*e* has at least three stable states, so that folding, unfolding, and intermediate hovering between the folded state and the unfolded state of the electronic device 100 can be realized. The entire structure is simple, frictionless, and highly reliable.

Figure 26:
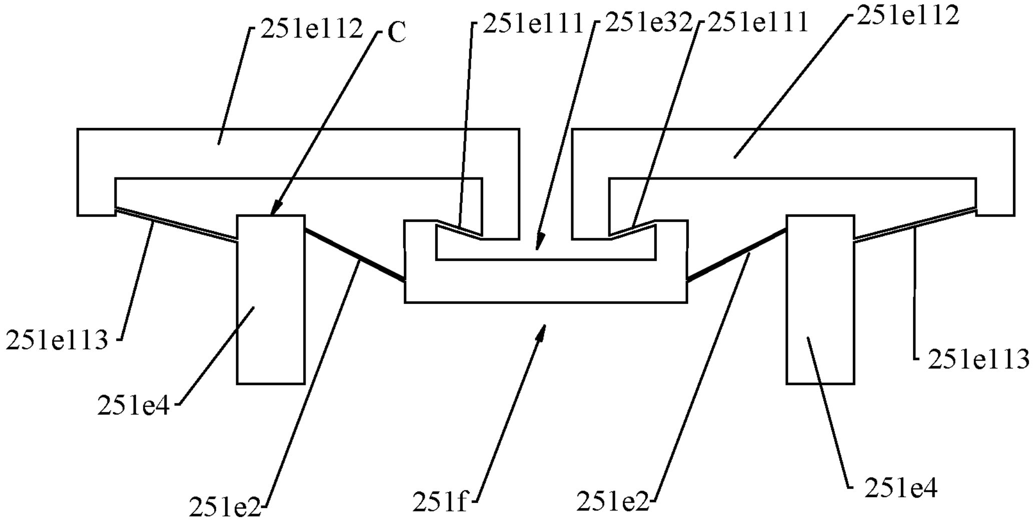
FIG. 26 is a schematic diagram of a sixth first multistable flexible mechanism according to an embodiment of this application.

Referring to FIG. 26, FIG. 26 is a schematic diagram of a sixth first multistable flexible mechanism 251*e* according to an embodiment of this application. The first multistable flexible mechanism 251*e* shown in FIG. 26 is different from the first multistable flexible mechanism 251*e* shown in FIG. 8 to FIG. 18 in that: a groove 251*e*32 is formed on a side surface of the connecting block 251*e*3 in the moving direction of the connecting block 251*e*3. The first compliant beam 251*e*111 of each of the first compliant beam units 251*e*11 is located in the groove 251*e*32 and connected to a groove wall of the groove 251*e*32. The first rigid member 251*e*112 is located on one side of the connecting block 251*e*3 facing a surface provided with the groove 251*e*32. The fixed portion 251*e*4 has a surface C having the same orientation as the surface of the connecting block 251$e$3 provided with the groove 251$e$32, and the first rigid member 251$e$112 is located on one side facing the surface C. Moreover, the first rigid member 251$e$112 is U-shaped. The first flexible beam 251$e$113 of each of the first compliant beam units 251$e$11 is located on one side of the corresponding fixed portion 251$e$4 away from the other fixed portion 251$e$4, and is connected to the corresponding fixed portion 251$e$4.

The second compliant beam unit 251$e$21 is in a shape of a sheet with an equal cross-sectional area everywhere. Therefore, the rigidity of the second compliant beam unit 251$e$21 is equal everywhere. Therefore, the second compliant beam unit 251$e$21 has a simple structure and is easy to be machined and manufactured.

Moreover, a shape of the second compliant beam unit 251$e$21 is different from that of the first compliant beam unit 251$e$11. In this way, the entire first multistable flexible mechanism 251$e$ can have at least three stable states, so that folding, unfolding, and intermediate hovering between the folded state and the unfolded state of the electronic device 100 can be realized. The entire structure is simple, frictionless, and highly reliable.

Figure 27:
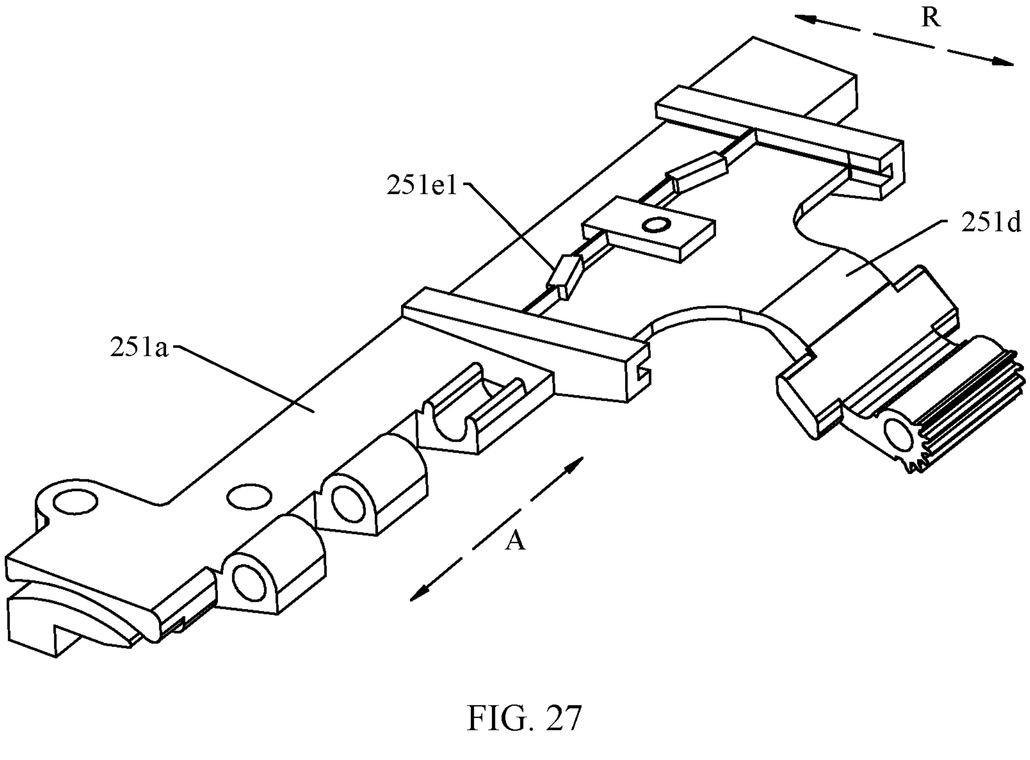
FIG. 27 is a schematic diagram of cooperation of a seventh first multistable flexible mechanism with a first connecting plate and a first swing arm according to an embodiment of this application.

Referring to FIG. 27, FIG. 27 is a schematic diagram of cooperation of a seventh first multistable flexible mechanism 251$e$ with the first connecting plate 251$a$ and the first swing arm 251$d$ according to an embodiment of this application. This example is different from the examples shown in FIG. 8 to FIG. 26 in that: the first multistable flexible mechanism 251$e$ does not include the second compliant bistable unit 251$e$2, but includes the first compliant bistable unit 251$e$2. In this case, the first multistable flexible mechanism 251$e$ is a bistable flexible mechanism. Therefore, the switching of the electronic device 100 between the folded state and the unfolded state is realized.

An operating principle of the first multistable flexible mechanism 251$e$ is described below based on a structure of the first multistable flexible mechanism 251$e$.

Figure 28:
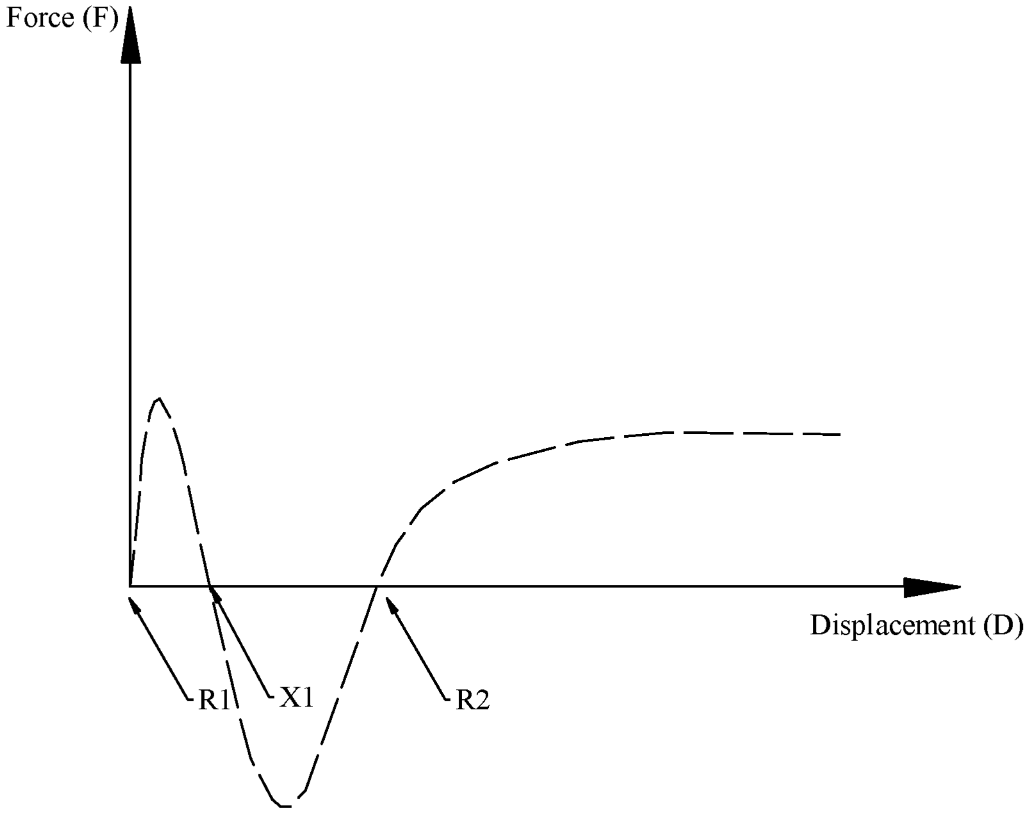
FIG. 28 is a graph of a curve between force on the first multistable flexible mechanism shown in FIG. 27 and the moving displacement of the connecting block.
Figure 29:
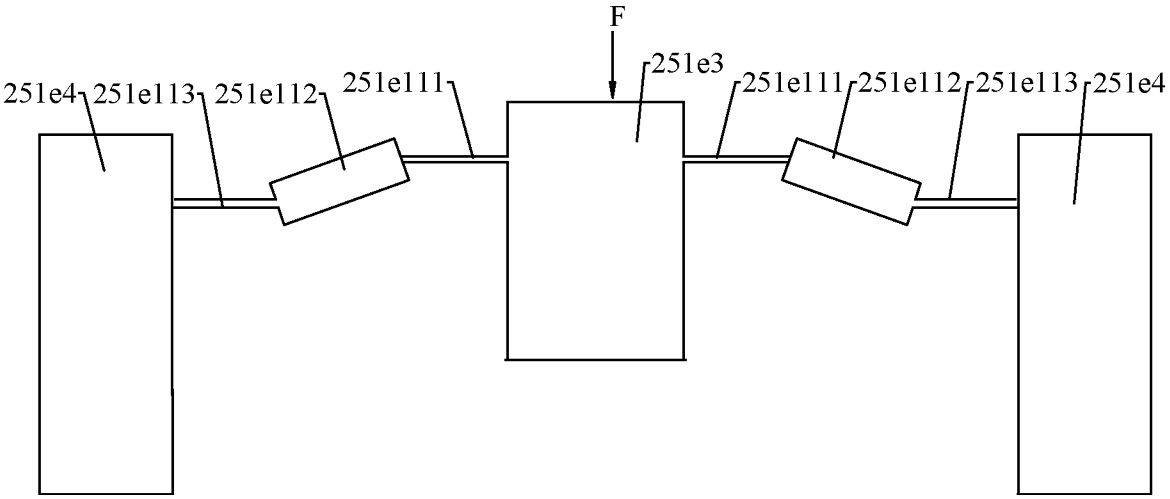
FIG. 29 is a schematic diagram of the first multistable flexible mechanism shown in FIG. 27 in the first stable state.
Figure 30:
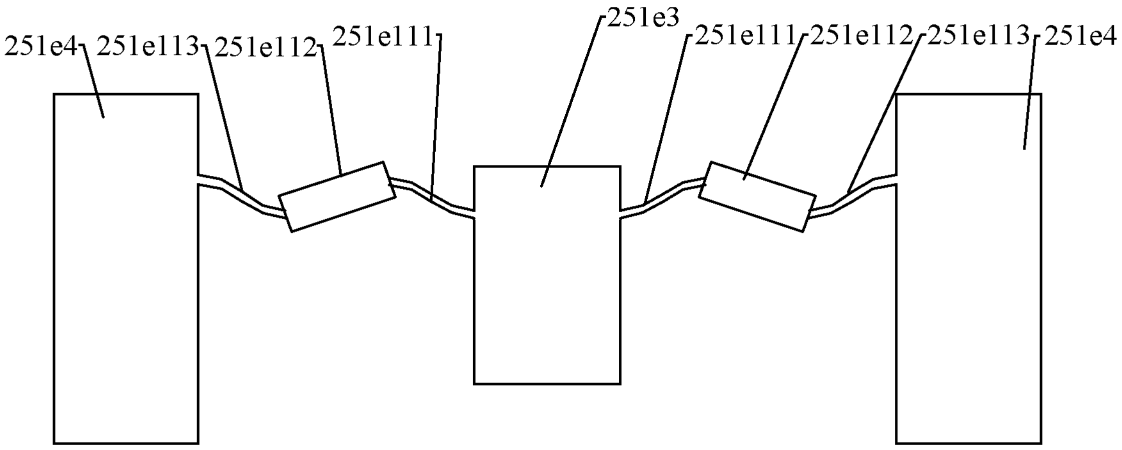
FIG. 30 is a schematic diagram of the first multistable flexible mechanism shown in FIG. 27 in the second stable state.

Referring to FIG. 28, FIG. 28 is a graph of a curve between force applied to the first multistable flexible mechanism 251$e$ shown in FIG. 27 and moving displacement of a connecting block. It can be obtained from FIG. 28 that the first multistable flexible mechanism 251$e$ has two stable states R1 (i.e., a first stable state) and R2 (i.e., a second stable state), and an unstable state X1 with the highest energy. Specifically, referring to FIG. 29 and FIG. 30, FIG. 29 is a schematic diagram of the first multistable flexible mechanism 251$e$ shown in FIG. 27 in the first stable state. FIG. 30 is a schematic diagram of the first multistable flexible mechanism 251$e$ shown in FIG. 27 in the second stable state. When the force exerted by the user on the first housing 21 causes the first connecting plate 251$a$ to rotate with respect to the base 24 to move from the unfolded state to the folded state, movement of the connecting block 251$e$3 along the arrow F may drive the first compliant beam 251$e$111 and the first flexible beam 251$e$113 to deform and drive the first rigid member 251$e$112 to rotate. Before the connecting block 251$e$3 moves from the first stable state R1 to the unstable state X1 with the highest energy, the entire mechanism continuously stores deformation energy. When the connecting block 251$e$3 moves over the unstable state X1 with the highest energy to the second stable state R2, the first compliant bistable unit 251$e$1 may release the stored deformation energy and output force to push the connecting block 251$e$3 to continue moving until the second stable state R2 is reached, so as to be in the folded state of the electronic device 100. It may be understood that the motion process from the folded state to the unfolded state is opposite to the above motion process. Details are not described in detail herein.

In the rotary mechanism 23 according to this embodiment of this application, when the first multistable flexible mechanism 251$e$ includes only the first compliant bistable unit 251$e$1 or the second compliant bistable unit 251$e$2, the entire first multistable flexible mechanism 251$e$ can have two stable states, so as to realize folding and unfolding of the electronic device 100. The entire structure is simple, frictionless, and highly reliable.

Herein, it may be understood that, when the first compliant bistable unit 251$e$1 and the second compliant bistable unit 251$e$2 that are described above are the same, the entire first multistable flexible mechanism 251$e$ exhibits bistability characteristics.

Since the support apparatus 20 provided in the embodiments of this application includes the rotary mechanism 23 according to any one of the foregoing embodiments, the two can solve the same technical problem and achieve the same effect.

Since the electronic device 100 provided in some embodiments of this application includes the above support apparatus 20, the two can solve the same technical problem and achieve the same effect.

In the descriptions of this specification, the specific features, structures, materials, or characteristics may be combined in a proper manner in any one or more of the embodiments or examples.

Finally, it should be noted that: the above embodiments are merely used for describing the technical solutions of this application, but are not intended to limit this application. Although this application is described in detail with reference to the foregoing embodiments, it should be appreciated by a person of ordinary skill in the art that, modifications may still be made to the technical solutions described in the foregoing embodiments, or equivalent replacements may be made to the part of the technical features; and these modifications or replacements will not cause the essence of corresponding technical solutions to depart from the spirit and scope of the technical solutions in the embodiments of this application.

What is claimed is:

1. An electronic device, comprising:

a first housing;

a foldable screen comprising a first portion and a third portion connected with each other; and a rotary mechanism, comprising:

wherein both the base and the first housing have a supporting surface, wherein the supporting surface of the first housing is configured to support and fix the first portion, and wherein the supporting surface of the base is configured to at least support the third portion in an unfolded state;

a first swing arm hinged to one side of the base;

a first connecting plate configured to be fixed to the first housing, wherein the first connecting plate is hinged to the one side of the base, wherein the first connecting plate and the first swing arm are located on a same side of the base, and wherein a hinge axis of the first connecting plate with respect to the base and a hinge axis of the first swing arm with respect to the base both extend along a first direction; and a first multistable flexible mechanism disposed on the first connecting plate, and configured to lock the rotary mechanism in a folded state and the unfolded state.

2. The electronic device of claim 1, wherein the first swing arm slides with respect to the first connecting plate and perpendicular to the first direction when the rotary mechanism switches between the unfolded state and the folded state.

3. The electronic device of claim 2, wherein the first multistable flexible mechanism has a first stable state and a second stable state, and the first multistable flexible mechanism cooperates with the first swing arm to switch between the first stable state and the second stable state, wherein in the unfolded state of the rotary mechanism, the supporting surface of the base and the supporting surface of the first housing are coplanar and have a same orientation, and the first multistable flexible mechanism is in the first stable state, se as to lock the first swing arm at a first locking position of the first swing arm with respect to the first connecting plate, and wherein in the folded state of the rotary mechanism, the supporting surface of the first housing is perpendicular to the supporting surface of the base, and the first multistable flexible mechanism is in the second stable state to lock the first swing arm at a second locking position of the first swing arm with respect to the first connecting plate.

4. The electronic device of claim 3, wherein the first multistable flexible mechanism comprises a first compliant bistable unit comprising two first compliant beam units arranged in the first direction and symmetrically disposed in the first direction, wherein first end portions of the two first compliant beam units that are adjacent to each other are respectively fixed with respect to the first swing arm, and second end portions of the two first compliant beam units that are away from each other are respectively fixed with respect to the first connecting plate, and wherein a length dimension of an extension trajectory of each of the first compliant beam units is greater than a vertical distance between the first end portion and the second end portion of the first compliant beam unit in the first direction.

5. The electronic device of claim 4, wherein the first compliant beam unit comprises:
- a first compliant beam, comprising:
  - a first end portion that is fixed with respect to the first swing arm; and
  - a second end portion;
- a first flexible beam, comprising:
  - a first end portion that is fixed with respect to the first connecting plate; and
  - a second end portion; and
- a first rigid member connected between the second end portion of the first compliant beam and the second end portion of the first flexible beam,
- wherein the first rigid member is more rigid than each of the first compliant beam and the first flexible beam.

6. The electronic device of claim 5, wherein a cross-sectional area of the first rigid member is greater than a cross-sectional area of the first compliant beam, and the cross-sectional area of the first rigid member is greater than a cross-sectional area of the first flexible beam.

7. The electronic device of claim 5, wherein both the first compliant beam and the first flexible beam are sheet-shaped.

8. The electronic device of claim 4, wherein the first compliant beam unit is in a shape of a sheet with a same cross-sectional area in a longitudinal direction.

9. The electronic device of claim 4, wherein the rotary mechanism has an intermediate hovering state on a switching path of the rotary mechanism between the unfolded state and the folded state, and wherein the first multistable flexible mechanism further has a third stable state on a switching path of the first multistable flexible mechanism between the first stable state and the second stable state, and in the intermediate hovering state of the rotary mechanism, the first multistable flexible mechanism is in the third stable state to lock the first swing arm at a third locking position of the first swing arm with respect to the first connecting plate, the third locking position being on a switching path of the first swing arm between the first locking position and the second locking position.

10. The electronic device of claim 9, wherein the first multistable flexible mechanism further comprises a second compliant bistable unit comprising two second compliant beam units, wherein the second compliant bistable unit and the first compliant bistable unit are arranged in a sliding direction of the first swing arm with respect to the first connecting plate, wherein the two second compliant beam units are arranged in the first direction, wherein the two second compliant beam units are symmetrically disposed with respect to a symmetry line of the two first compliant beam units, wherein first end portions of the two second compliant beam units that are adjacent to each other are respectively fixed with respect to the first swing arm, wherein second end portions of the two second compliant beam units are respectively fixed with respect to the first connecting plate, wherein a length dimension of an extension trajectory of each of the second compliant beam units is greater than a vertical distance between the first end portion and the second end portion of the second compliant beam unit in the first direction, and wherein at least one of a material, a shape, and a size of the second compliant beam unit is different from that of the first compliant beam unit.

11. The electronic device of claim 10, wherein the second compliant beam unit comprises:
- a second compliant beam, comprising:
  - a first end portion that is fixed with respect to the first swing arm; and
  - a second end portion;
- a second flexible beam, comprising:
  - a first end portion that is fixed with respect to the first connecting plate; and
  - a second end portion; and
- a second rigid member connected between the second end portion of the second compliant beam and the second end portion of the second flexible beam,
- wherein the second rigid member is more rigid than each of the second compliant beam and the second flexible beam.

12. The electronic device of claim 11, wherein a cross-sectional area of the second rigid member is greater than a cross-sectional area of the second compliant beam, and the cross-sectional area of the second rigid member is greater than a cross-sectional area of the second flexible beam.

13. The electronic device of claim 11, wherein both the second compliant beam and the second flexible beam are sheet-shaped.

14. The electronic device of claim 11, wherein the first compliant beam unit comprises:
- a first compliant beam, comprising:
  - a first end portion that is fixed with respect to the first swing arm; and
  - a second end portion;
- a first flexible beam, comprising:
  - a first end portion that is fixed with respect to the first connecting plate; and
  - a second end portion; and
- a first rigid member connected between the second end portion of the first compliant beam and the second end portion of the first flexible beam, wherein the first rigid member is more rigid than each of the first compliant beam and the first flexible beam, and wherein a size of the first compliant beam is different from that of the second compliant beam, a size of the first flexible beam is different from that of the second flexible beam, the first compliant beam is not parallel to the second compliant beam, the first flexible beam is not parallel to the second flexible beam, or a combination thereof.

15. The electronic device of claim 10, wherein the second compliant beam unit is in a shape of a sheet with a same cross-sectional area in a longitudinal direction.

16. The electronic device of claim 15, wherein the first compliant beam unit is in a shape of a sheet with a same cross-sectional area in a longitudinal direction, and wherein a length dimension of the second compliant beam unit is different from that of the first compliant beam unit.

17. The electronic device of claim 16, wherein the two first compliant beam units of the first compliant bistable unit are respectively located on two sides of the connecting block in the first direction.

18. The electronic device of claim 4, wherein the first multistable flexible mechanism comprises a connecting block fixed to the first swing arm, wherein the two first compliant beam units of the first compliant bistable unit are symmetrically disposed with respect to a central axis of the connecting block extending in the sliding direction of the first swing arm, and wherein the first end portions of the two first compliant beam units are fixedly connected to the connecting block.

19. The electronic device claim 4, wherein the first multistable flexible mechanism comprises two fixed portions oppositely disposed in the first direction and respectively fixed to the first connecting plate to define a sliding space with the first connecting plate, wherein a portion of the first swing arm and at least a portion of the first compliant bistable unit are both located in the sliding space, wherein the two first compliant beam units of the first compliant bistable unit are in one-to-one correspondence to the two fixed portions, and wherein each of the first compliant beam units are connected with the first connecting plate through the corresponding fixed portion.

20. The electronic device claim 1, wherein the foldable screen further comprises a second portion connected to one side of the third portion away from the first portion, wherein the electronic device further comprises a second housing having a supporting surface configured to support and fix the second portion, and wherein the rotary mechanism further comprises:

a second swing arm hinged to the other side of the base;

a second connecting plate configured to be fixed to the second housing, wherein the second connecting plate and the second swing arm are located on a same side of the base and hinged to the other side of the base, wherein a hinge axis of the second connecting plate with respect to the base and a hinge axis of the second swing arm with respect to the base both extend along the first direction, and wherein the second swing arm slides with respect to the second connecting plate and perpendicular to the first direction when the rotary mechanism switches between the unfolded state and the folded state; and a second multistable flexible mechanism disposed on the second connecting plate and having a first stable state and a second stable state, wherein the second multistable flexible mechanism cooperates with the second swing arm to switch between the first stable state and the second stable state, wherein in the unfolded state of the rotary mechanism, the supporting surface of the base and the supporting surface of the first housing are coplanar and have a same orientation, and the second multistable flexible mechanism is in the first stable state to lock the second swing arm at a first lock position of the second swing arm with respect to the second connecting plate, and wherein in the folded state of the rotary mechanism, the supporting surface of the second housing is perpendicular to the supporting surface of the base, and the second multistable flexible mechanism is in the second stable state to lock the second swing arm at a second lock position of the second swing arm with respect to the second connecting plate.

* * * * *